(12) United States Patent
Morgan et al.

(10) Patent No.: US 10,318,674 B2
(45) Date of Patent: Jun. 11, 2019

(54) COMPARISON AND SELECTION OF EXPERIMENT DESIGNS

(71) Applicant: SAS Institute Inc., Cary, NC (US)

(72) Inventors: Joseph Albert Morgan, Raleigh, NC (US); Bradley Allen Jones, Cary, NC (US); Ryan Adam Lekivetz, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/690,705

(22) Filed: Aug. 30, 2017

(65) Prior Publication Data

US 2018/0060466 A1 Mar. 1, 2018

Related U.S. Application Data

(60) Provisional application No. 62/381,303, filed on Aug. 30, 2016, provisional application No. 62/381,290, filed on Aug. 30, 2016.

(51) Int. Cl.
| | |
|---|---|
| *G06F 17/27* | (2006.01) |
| *G06F 17/50* | (2006.01) |
| *G06T 11/20* | (2006.01) |
| *G06F 3/0482* | (2013.01) |

(52) U.S. Cl.
CPC ........ *G06F 17/5009* (2013.01); *G06F 3/0482* (2013.01); *G06F 17/2795* (2013.01); *G06F 2217/04* (2013.01); *G06F 2217/14* (2013.01); *G06F 2217/16* (2013.01); *G06T 11/206* (2013.01)

(58) Field of Classification Search
None
See application file for complete search history.

(56) References Cited

U.S. PATENT DOCUMENTS

| | | |
|---|---|---|
| 6,977,269 B1 | 12/2005 | Saunders et al. |
| 7,451,122 B2 | 11/2008 | Dietrich et al. |
| 8,065,132 B2 | 11/2011 | Chen et al. |
| 8,306,788 B2 | 11/2012 | Chen et al. |

(Continued)

OTHER PUBLICATIONS

Proust, Design of Experiments Guide, 2012, SAS, pp. 1-346 (Year: 2012).*

(Continued)

*Primary Examiner* — Aniss Chad
*Assistant Examiner* — Bernard E Cothran

(57) ABSTRACT

An apparatus may include a processor caused to: receive indications of first and second experiment designs to be compared; for each factor of the model of the first experiment design, identify a matching factor of the model of the second experiment design based on factor type, wherein the factor type is selected from the group consisting of a categorical factor and a continuous factor; for each categorical factor of the model of the first experiment design, identify a matching factor of the model of the second experiment design additionally based on quantity of levels of each factor; for each term of the model of the first experiment design, identify a matching term of the model of the second experiment design based on an order of each term; and present, on a display, the identified matches between the terms and between the responses of the first and second experiment designs.

30 Claims, 37 Drawing Sheets

(56) References Cited

U.S. PATENT DOCUMENTS

| | | | |
|---|---|---|---|
| 2004/0015793 | A1 | 1/2004 | Saxena et al. |
| 2008/0168092 | A1 | 7/2008 | Boggs et al. |
| 2009/0083680 | A1* | 3/2009 | McConaghy ....... G06F 17/5063 716/103 |
| 2009/0125270 | A1 | 5/2009 | O'Shea et al. |
| 2009/0313308 | A1 | 12/2009 | Green et al. |
| 2011/0178789 | A1* | 7/2011 | Miranda ............. G06F 17/5036 703/16 |
| 2011/0224946 | A1* | 9/2011 | Brayman ............ G06F 11/3419 702/176 |
| 2012/0059641 | A1 | 3/2012 | Castellini et al. |
| 2012/0079379 | A1* | 3/2012 | Hathaway ............. G06Q 10/06 715/709 |
| 2015/0081596 | A1 | 3/2015 | Maaseidvaag et al. |
| 2016/0063423 | A1 | 3/2016 | Rao et al. |

OTHER PUBLICATIONS

Montevechi et al., Applicaiton of Design of Experimentation on the Simulation of a Process in an Automotive Industry, 2007, IEEE, pp. 1601-1609 (Year: 2007).*

Anderson-Cook, et al., "Response surface design evaluation and comparison", Journal of Statistical Planning and Inference, Apr. 12, 2008, 14 pages.

Jones, Bradley, "Discussion of Response surface design evaluation and comparison", Journal of Statistical Planning and Inference, 2009, 3 pages.

Parker, Peter A., "Discussion of Response surface design evaluation and comparison", Journal of Statistical Planning and Inference, 2009, 3 pages.

Khuri, Andre I., "Discussion of Response surface design evaluation and comparison", Journal of Statistical Planning and Inference, 2009, 4 pages.

Borkowski, John J., "Discussion of Response surface design evaluation and comparison", Journal of Statistical Planning and Inference, 2009, 3 pages.

Piepel, Greg F., "Discussion of Response surface design evaluation and comparison", Journal of Statistical Planning and Inference, 2009, 4 pages.

Goos, Peter, "Discussion of Response surface design evaluation and comparison", Journal of Statistical Planning and Inference, 2009, 3 pages.

Lucas, James M., "Discussion of Response surface design evaluation and comparison", Journal of Statistical Planning and Inference, 2009, 2 pages.

Atkinson, Anthony C., "Discussion of Response surface design evaluation and comparison", Journal of Statistical Planning and Inference, 2009, 7 pages.

Robinson, Timothy J., "Discussion of Response surface design evaluation and comparison", Journal of Statistical Planning and Inference, 2009, 2 pages.

Anderson-Cook et al., Rejoinder for "Discussion of Response surface design evaluation and comparison", Journal of Statistical Planning and Inference, 2009, 3 pages Journal of Statistical Planning and Inference, 2009, 4 pages.

"Custom Design Options", SAS Institute, retrieved from <http://www.jmp.com/support/help/Custom_Design_Options.shtml>, Jun. 28, 2017, 8 pages (author unknown).

* cited by examiner

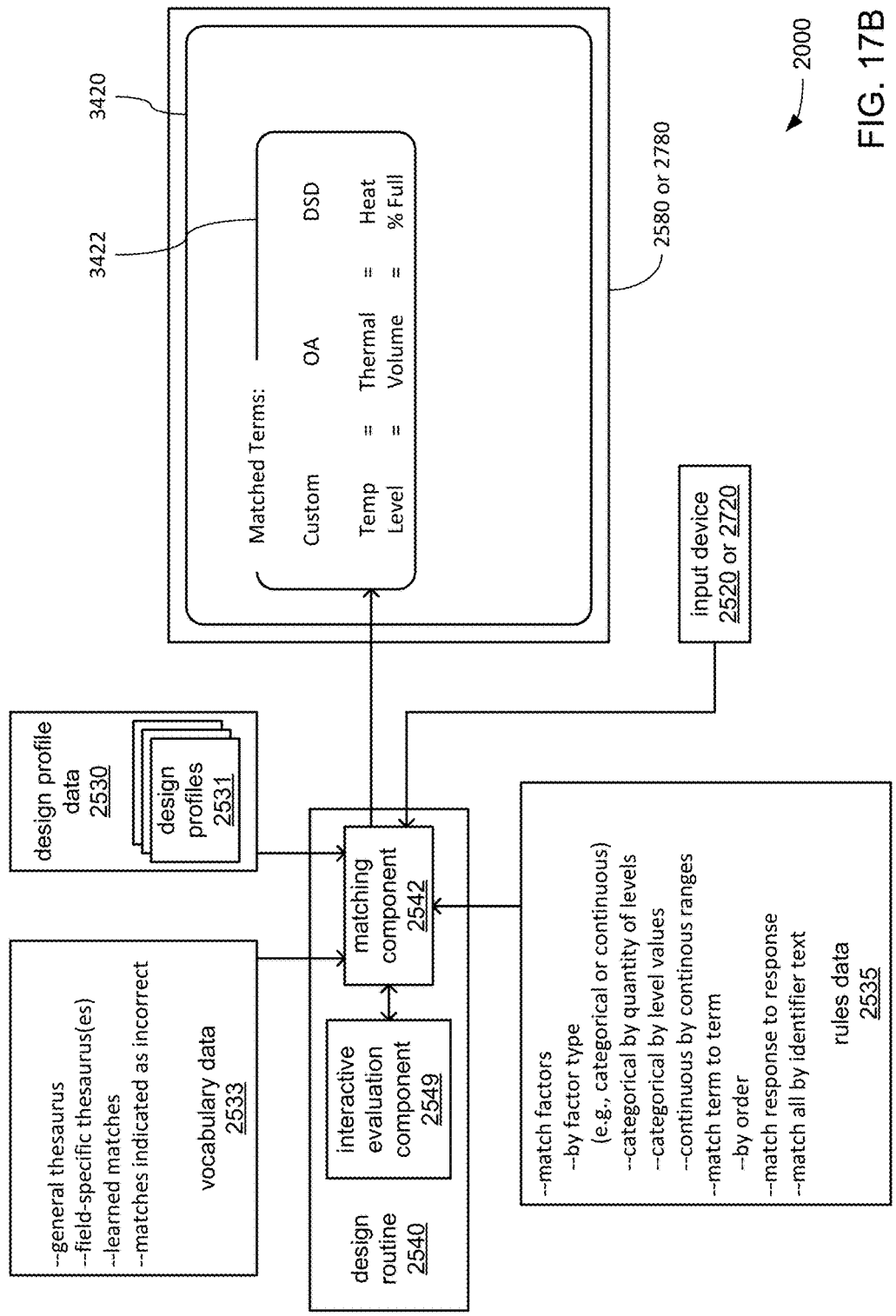

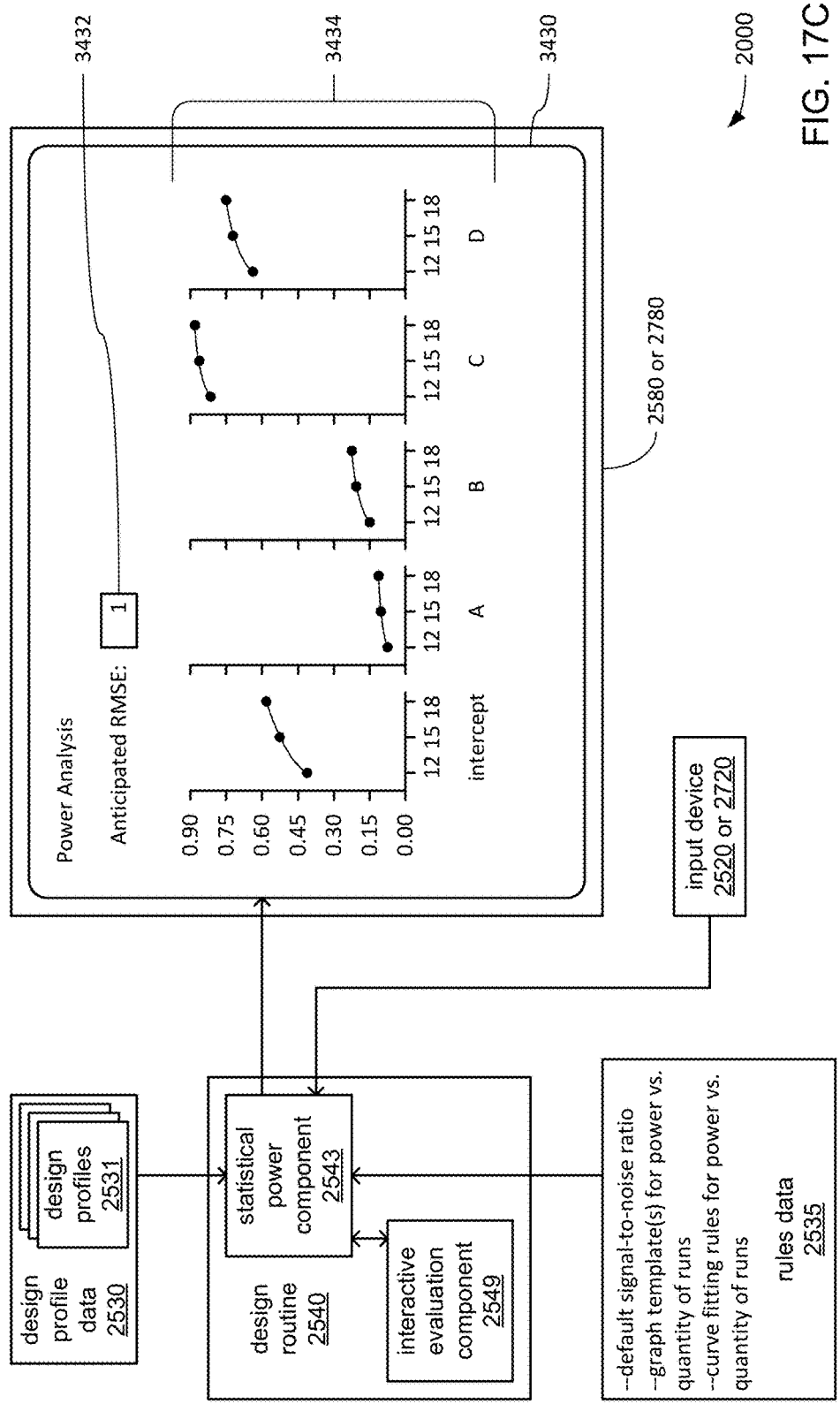

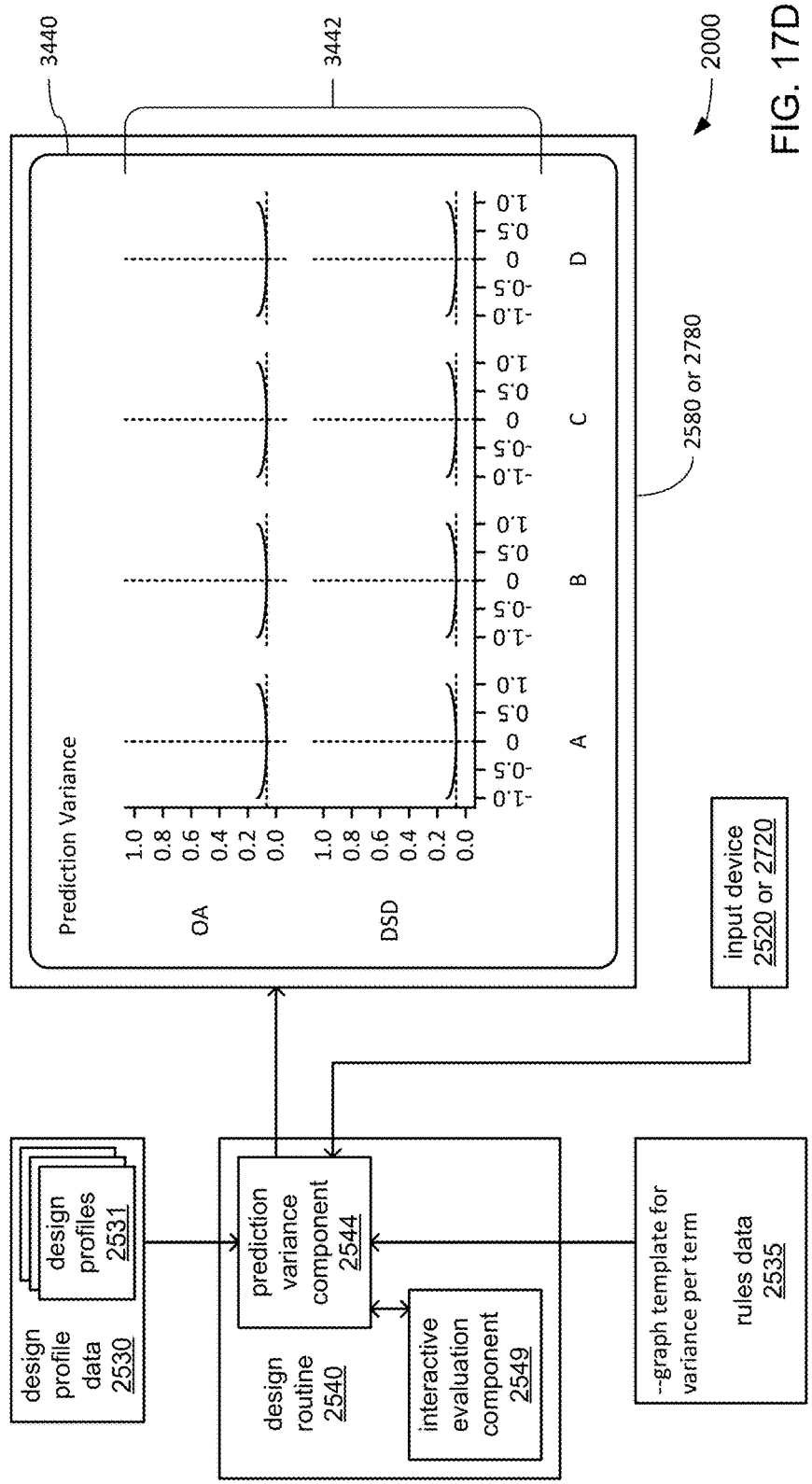

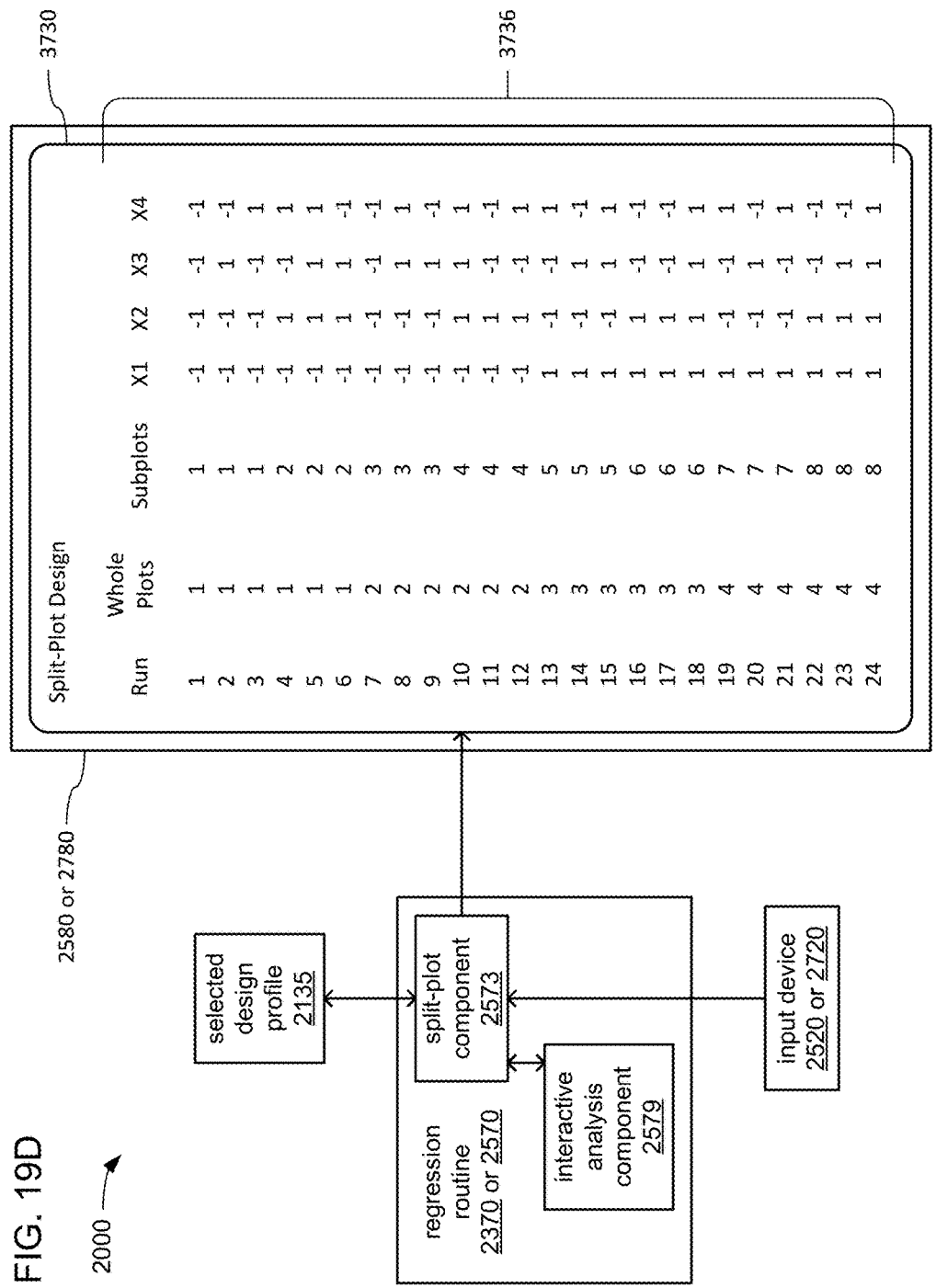

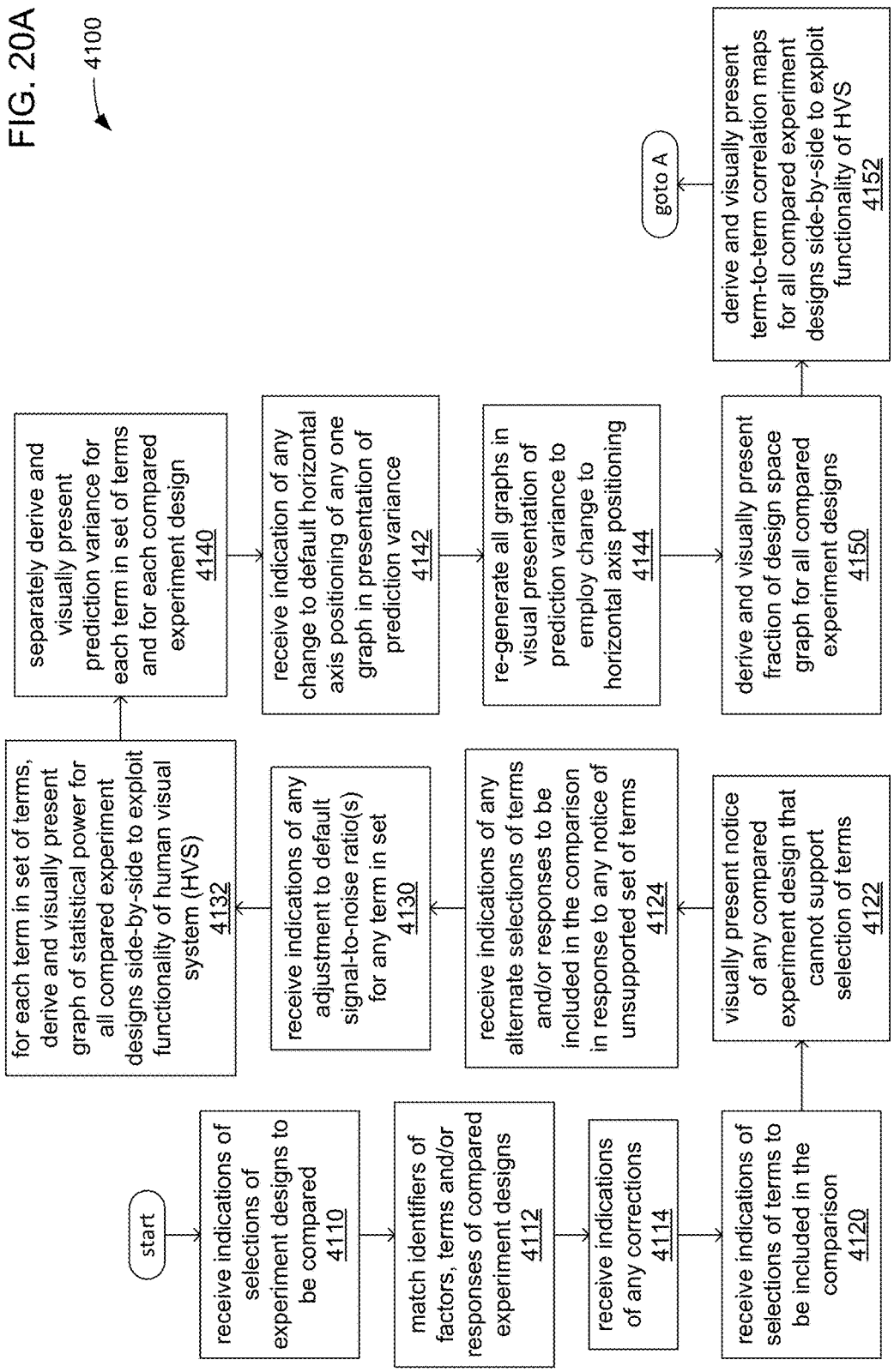

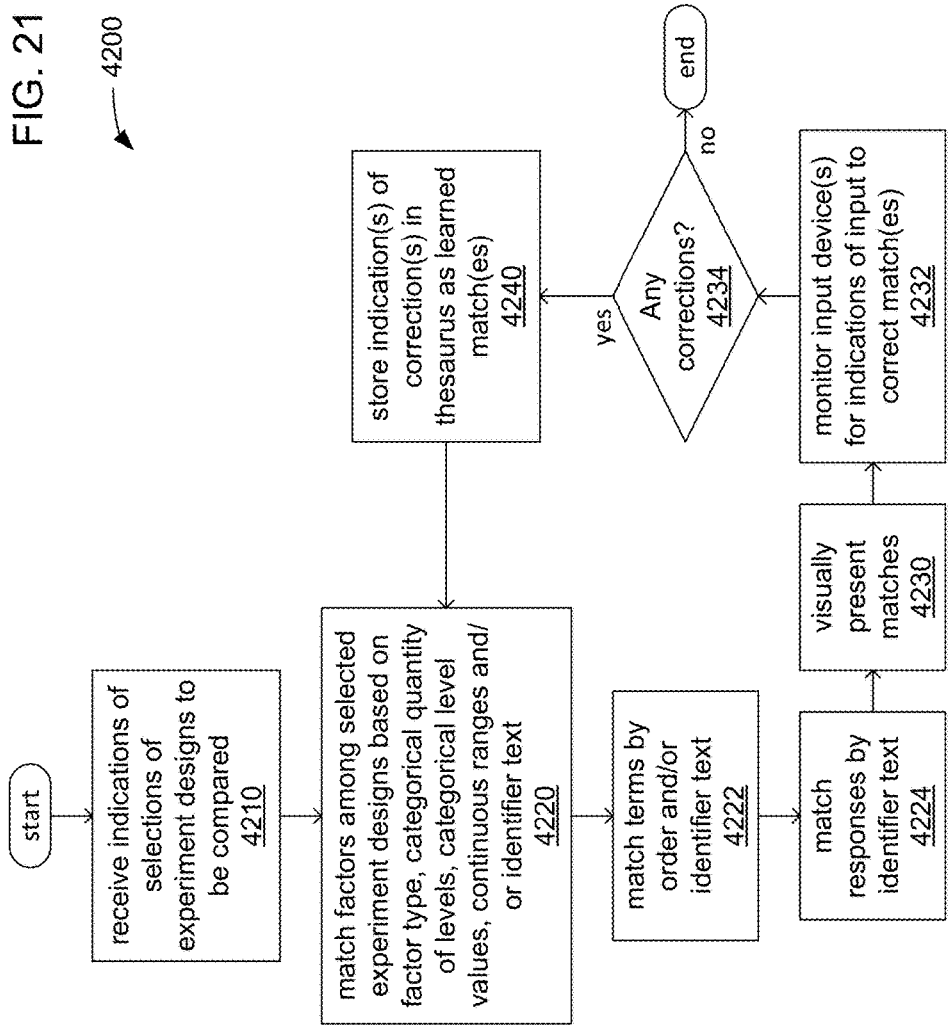

COMPARISON AND SELECTION OF EXPERIMENT DESIGNS

CROSS-REFERENCE TO RELATED APPLICATIONS

This application claims the benefit of priority under 35 U.S.C. § 119(e) to U.S. Provisional Application Ser. No. 62/381,290 filed Aug. 30, 2016, and U.S. Provisional Application Ser. No. 62/381,303 also filed Aug. 30, 2016, the entirety of each of which is incorporated herein by reference.

BACKGROUND

It has become increasingly commonplace to use experiment designs as a tool to derive models of complex systems in an effort to identify inputs (commonly referred to as "factors") that explain observed outputs (commonly referred to as "responses"), especially where there is a need to change undesired responses. However, the derivation of a model that provides an understanding of a complex system that is sufficient to explain a linkage between particular factors and particular responses is often a time-consuming task, since each particular type of model is typically closely associated with a particular type of experiment design. Thus, it is often necessary to suffer through a wasteful trial-and-error process in which best efforts to select a type of model that is believed to be capable of providing such a sufficient understanding of a system leads to a choice of experiment design that is later found to be undesirably ineffective in illuminating a linkage between particular factors and particular responses. Thus, there may be multiple iterations of selection of a type of model followed by the revelation of the need to make another selection only after an expenditure of considerable time to perform the associated type of experiment design.

Even after the identification of a type of model and associated type of experiment design that at least appears to be sufficiently capable of illuminating a linkage between particular factors and responses, additional considerable time may be consumed in iteratively deriving coefficients of the model and/or other parameters of the associated experiment design to derive a sufficiently useful model. Also, practical limitations of cost, availability of materials and/or available time may impose the need to perform the associated experiment design in a less than technically ideal manner, and such impositions may need to be taken into account in deriving the model.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus may include a processor and a storage to store instructions that, when executed by the processor, cause the processor to perform operations including receive, from an input device communicatively coupled to the processor, indications of selection of a plurality of experiment designs to be compared, wherein: each experiment design of the plurality of experiment designs specifies a quantity of runs of a test to perform a designed experiment; each experiment design is associated with a model of a system under evaluation; the model associated with each experiment design comprises multiple terms as inputs to the model; each term comprises at least one factor of multiple factors that are each an input to the system; each factor of the multiple factors is identified by a factor identifier; and each term of the multiple terms is identified by a term identifier comprising text. For each factor of the multiple factors of the model associated with a first experiment design of the plurality of designs, the processor may be further caused to identify a matching factor of the multiple factors of the model associated with a second experiment design of the plurality of designs based on a factor type of each factor, wherein the factor type is selected from the group consisting of a categorical factor and a continuous factor. For each categorical factor of the multiple factors of the model associated with the first experiment design, the processor may be further caused to identify a matching factor of the multiple factors of the model associated with the second experiment design additionally based on quantity of levels of each factor. For each term of the multiple terms of the model associated with the first experiment design, the processor may be further caused to identify a matching term of the multiple terms of the model associated with the second experiment design based on an order of each term. The processor may be further caused to present, on a display communicatively coupled to the processor, the identified matches between the multiple terms of the first and second experiment designs and the identified matches between the multiple responses of the first and second experiment designs.

The order of each term of the first and second experiment designs may be selected from a group consisting of a first order main effect term, a second order term, and a third order term. The processor may be caused to perform operations including: monitor the input device to enable reception of input that indicates a correction to the identified matches between the multiple terms of the first and second experiment designs; analyze the indicated correction to determine whether the indicated correction specifies a match between terms of dissimilar order; and in response to a determination that the indicated correction specifies a match between terms of dissimilar order, present an indication of incorrect input on the display.

The processor may be caused to perform operations including identify a match between a categorical factor of the model associated with the first experiment design and a categorical factor of the model associated with the second experiment design additionally based on matches between the levels. The processor may be caused to perform operations including identify a match between a continuous factor of the model associated with the first experiment design and a continuous factor of the model associated with the second experiment design additionally based on minimum and maximum values of continuous ranges of numerical values. The processor may be caused to perform operations including: monitor the input device to enable reception of input that indicates a correction to the identified matches between the multiple terms of the first and second experiment designs; analyze the indicated correction to determine whether the indicated correction entails a match between factors of dissimilar factor type; and in response to a determination that the indicated correction entails a match between factors of dissimilar factors type, present an indication of incorrect input on the display. The processor may be caused to perform operations including, for each factor of the multiple factors of the model associated with the first experiment design, identify a matching factor of the multiple factors of the model associated with the second experiment design additionally based on the text of the factor identifier of each factor, and vocabulary data comprising a thesaurus of matches among words based on meanings associated with the words.

The processor may be caused to perform operations including, for each term of the multiple terms of the model associated with the first experiment design, identify a matching term of the multiple terms of the model associated with the second experiment design additionally based on the text of the term identifier of each term, and vocabulary data comprising a thesaurus of matches among words based on meanings associated with the words. The processor may be caused to perform operations including monitor the input device to enable reception of input that indicates a correction to the identified matches between the multiple terms of the first and second experiment designs. In response to a receipt, from the input device, of input indicating a correction to the identified matches between the multiple terms of the first and second experiment designs, perform operations including: store within the vocabulary data and as an exception to a match among words of the thesaurus, an indication of at least one match between texts specified by the indicated correction; enact the indicated correction; and present, on the display, the identified matches between the multiple terms of the first and second experiment designs and the identified matches between the multiple responses of the first and second experiment designs after enactment of the indicated correction.

The model associated with each experiment design may include multiple responses as outputs of the model; each response of the multiple responses may be identified by a response identifier; and the processor may be caused to perform operations including, for each response of the multiple responses of the model associated with the first experiment design, identify a matching response of the multiple responses of the model associated with the second experiment design additionally based on the text of the response identifier of each response, and vocabulary data comprising a thesaurus of matches among words based on meanings associated with the words.

The processor may be caused to perform operations including: receive, from the input device, indications of a selection of a term matched between the first and second experiment designs to add to a set of terms to be included in the comparison between the first and second experiment designs; and analyze the models associated with the first and second experiment designs to determine whether the addition of the indicated selected term to the set of terms causes the set of terms to become unsupportable by either of the first and second experiment designs. In response to a determination that the addition of the indicated selected term to the set of terms causes the set of terms to become unsupportable by either of the first and second experiment designs, the processor may be caused to perform operations including present an indication of ineligible input on the display, and remove the indicated selected term from the set of terms to cause the set of terms to become supportable by both of the first and second experiment designs.

A computer-program product tangibly embodied in a non-transitory machine-readable storage medium, the computer-program product including instructions that may be operable to cause a processor to perform operations including receive, from an input device communicatively coupled to the processor, indications of selection of a plurality of experiment designs to be compared, wherein: each experiment design of the plurality of experiment designs specifies a quantity of runs of a test to perform a designed experiment; each experiment design is associated with a model of a system under evaluation; the model associated with each experiment design comprises multiple terms as inputs to the model; each term comprises at least one factor of multiple factors that are each an input to the system; each factor of the multiple factors is identified by a factor identifier; and each term of the multiple terms is identified by a term identifier comprising text. For each factor of the multiple factors of the model associated with a first experiment design of the plurality of designs, the processor may be caused to identify a matching factor of the multiple factors of the model associated with a second experiment design of the plurality of designs based on a factor type of each factor, wherein the factor type is selected from the group consisting of a categorical factor and a continuous factor. For each categorical factor of the multiple factors of the model associated with the first experiment design, the processor may be caused to identify a matching factor of the multiple factors of the model associated with the second experiment design additionally based on quantity of levels of each factor. For each term of the multiple terms of the model associated with the first experiment design, the processor may be caused to identify a matching term of the multiple terms of the model associated with the second experiment design based on an order of each term. The processor may be caused to present, on a display communicatively coupled to the processor, the identified matches between the multiple terms of the first and second experiment designs and the identified matches between the multiple responses of the first and second experiment designs.

The order of each term of the first and second experiment designs may be selected from a group consisting of a first order main effect term, a second order term, and a third order term. The processor may be caused to perform operations including: monitor the input device to enable reception of input that indicates a correction to the identified matches between the multiple terms of the first and second experiment designs; analyze the indicated correction to determine whether the indicated correction specifies a match between terms of dissimilar order; and in response to a determination that the indicated correction specifies a match between terms of dissimilar order, present an indication of incorrect input on the display.

The processor may be caused to perform operations including identify a match between a categorical factor of the model associated with the first experiment design and a categorical factor of the model associated with the second experiment design additionally based on matches between the levels. The processor may be caused to perform operations including identify a match between a continuous factor of the model associated with the first experiment design and a continuous factor of the model associated with the second experiment design additionally based on minimum and maximum values of continuous ranges of numerical values. The processor may be caused to perform operations including: monitor the input device to enable reception of input that indicates a correction to the identified matches between the multiple terms of the first and second experiment designs; analyze the indicated correction to determine whether the indicated correction entails a match between factors of dissimilar factor type; and in response to a determination that the indicated correction entails a match between factors of dissimilar factor type, present an indication of incorrect input on the display. The processor may be caused to perform operations including, for each factor of the multiple factors of the model associated with the first experiment design, identify a matching factor of the multiple factors of the model associated with the second experiment design additionally based on the text of the factor identifier of each factor, and vocabulary data comprising a thesaurus of matches among words based on meanings associated with the words.

The processor may be caused to perform operations including, for each term of the multiple terms of the model associated with the first experiment design, identify a matching term of the multiple terms of the model associated with the second experiment design additionally based on the text of the term identifier of each term, and vocabulary data comprising a thesaurus of matches among words based on meanings associated with the words. The processor may be caused to perform operations including monitor the input device to enable reception of input that indicates a correction to the identified matches between the multiple terms of the first and second experiment designs. In response to a receipt, from the input device, of input indicating a correction to the identified matches between the multiple terms of the first and second experiment designs, the processor may be caused to perform operations including store within the vocabulary data and as an exception to a match among words of the thesaurus, an indication of at least one match between texts specified by the indicated correction; enact the indicated correction; and present, on the display, the identified matches between the multiple terms of the first and second experiment designs and the identified matches between the multiple responses of the first and second experiment designs after enactment of the indicated correction.

The model associated with each experiment design comprises multiple responses as outputs of the model; each response of the multiple responses may be identified by a response identifier; and the processor may be caused to perform operations including, for each response of the multiple responses of the model associated with the first experiment design, identify a matching response of the multiple responses of the model associated with the second experiment design additionally based on the text of the response identifier of each response, and vocabulary data comprising a thesaurus of matches among words based on meanings associated with the words.

The processor may be caused to perform operations including: for each experiment design of the plurality of experiment designs, derive a statistical power for each term of the set of terms; for each term of the set of terms, generate a graph of statistical power versus quantity of runs that includes a plot of the term for each experiment design of the plurality of experiment designs; for each graph of statistical power versus quantity of runs, fit a curve to the plots therein; and present the graphs of statistical power versus quantity of runs generated for all of the terms of the set of terms at adjacent locations on the display.

A computer-implemented method may include receiving, at a coordinating device from an input device, indications of selection of a plurality of experiment designs to be compared, wherein: each experiment design of the plurality of experiment designs specifies a quantity of runs of a test to perform a designed experiment; each experiment design is associated with a model of a system under evaluation; the model associated with each experiment design comprises multiple terms as inputs to the model; each term comprises at least one factor of multiple factors that are each an input to the system; each factor of the multiple factors is identified by a factor identifier; and each term of the multiple terms is identified by a term identifier comprising text. The method may further include, for each factor of the multiple factors of the model associated with a first experiment design of the plurality of designs, identifying a matching factor of the multiple factors of the model associated with a second experiment design of the plurality of designs based on a factor type of each factor, wherein the factor type is selected from the group consisting of a categorical factor and a continuous factor. The method may further include, for each categorical factor of the multiple factors of the model associated with the first experiment design, identify a matching factor of the multiple factors of the model associated with the second experiment design additionally based on quantity of levels of each factor. The method may further include, for each term of the multiple terms of the model associated with the first experiment design, identifying a matching term of the multiple terms of the model associated with the second experiment design based on an order of each term. The method may further include presenting, on a display communicatively coupled to the coordinating device, the identified matches between the multiple terms of the first and second experiment designs and the identified matches between the multiple responses of the first and second experiment designs.

The order of each term of the first and second experiment designs may be selected from a group consisting of a first order main effect term, a second order term, and a third order term. The method may include: monitoring the input device to enable reception of input that indicates a correction to the identified matches between the multiple terms of the first and second experiment designs; analyzing the indicated correction to determine whether the indicated correction specifies a match between terms of dissimilar order; and in response to a determination that the indicated correction specifies a match between terms of dissimilar order, presenting an indication of incorrect input on the display.

The method may include identifying a match between a categorical factor of the model associated with the first experiment design and a categorical factor of the model associated with the second experiment design additionally based on matches between the levels. The method may include identifying a match between a continuous factor of the model associated with the first experiment design and a continuous factor of the model associated with the second experiment design additionally based on minimum and maximum values of continuous ranges of numerical values. The method may include monitoring the input device to enable reception of input that indicates a correction to the identified matches between the multiple terms of the first and second experiment designs; analyzing the indicated correction to determine whether the indicated correction entails a match between factors of dissimilar factor type; and in response to a determination that the indicated correction entails a match between factors of dissimilar factor type, presenting an indication of incorrect input on the display. The method may include for each factor of the multiple factors of the model associated with the first experiment design, identifying a matching factor of the multiple factors of the model associated with the second experiment design additionally based on the text of the factor identifier of each factor, and vocabulary data comprising a thesaurus of matches among words based on meanings associated with the words.

The method may include, for each term of the multiple terms of the model associated with the first experiment design, identifying a matching term of the multiple terms of the model associated with the second experiment design additionally based on the text of the term identifier of each term, and vocabulary data comprising a thesaurus of matches among words based on meanings associated with the words. The method may include monitoring the input device to enable reception of input that indicates a correction to the identified matches between the multiple terms of the first and second experiment designs. The method may include, in response to a receipt, from the input device, of input indicating a correction to the identified matches between the multiple terms of the first and second experiment designs, performing operations including: storing within the vocabulary data and as an exception to a match among words of the thesaurus, an indication of at least one match between texts specified by the indicated correction; enacting the indicated correction; and presenting, on the display, the identified matches between the multiple terms of the first and second experiment designs and the identified matches between the multiple responses of the first and second experiment designs after enactment of the indicated correction.

The model associated with each experiment design may include multiple responses as outputs of the model, and each response of the multiple responses may include identified by a response identifier. The method may include, for each factor of the multiple factors of the model associated with the first experiment design, identifying a matching response of the multiple responses of the model associated with the second experiment design additionally based on the text of the response identifier of each response, and vocabulary data comprising a thesaurus of matches among words based on meanings associated with the words.

The method may include, for each experiment design of the plurality of experiment designs, generating a graph of all terms of the set of terms along a horizontal axis versus all terms of the set of terms along a vertical axis, wherein a degree of correlation of the pair of terms associated with each intersection within the graph is visually indicated; and the visual indication of degree of correlation is selected from a group consisting of: a color; a degree of gray shading; and a pattern. The method may include presenting, on the display, the graphs generated for all of the terms of the experiment designs of the plurality of experiment designs at adjacent locations on the display.

An apparatus may include a processor and a storage to store instructions that, when executed by the processor, cause the processor to perform operations including receive, from an input device communicatively coupled to the processor, indications of selection of a set of experiment designs to be compared, wherein: each experiment design of the set of experiment designs is associated with a model of a system under evaluation; each experiment design specifies a quantity of runs of a test to perform to analyze the system; and the model associated with each experiment design comprises multiple terms as inputs to the model and multiple responses as outputs of the model. The processor may be further caused to receive, from the input device, indications of selection of a set of terms to be included in the comparison, wherein each term of the set of terms is included in the multiple terms of the model associated with each experiment design of the set of experiment designs. For each experiment design of the set of experiment designs, the processor may be further caused to generate a corresponding term correlation graph of a set of term correlation graphs, wherein: the correlation graph comprises a horizontal axis along which the set of terms are arranged, and a vertical axis along which the set of terms are arranged; at each intersection of a term along the horizontal axis and a term along the vertical axis within the graph, a degree of correlation between the term along the horizontal axis and the term along the vertical axis is indicated with a visual indicator selected from a set of visual indicators; the visual indicators of the set of visual indicators are assigned an order that corresponds to a continuous range of degree of correlation; and the continuous range of degree of correlation is divided into a set of contiguous sub-ranges, and each visual indicator corresponds to one of the sub-ranges. The processor may be further caused to present at least two correlation graphs of the set of correlation graphs at adjacent locations on a display communicatively coupled to the processor.

The processor may be caused to perform operations including monitor the input device to enable reception of input that indicates a change to the set of terms; and in response to receipt of input from the input device to add a term to the set of terms, analyze the model associated with each experiment design of the set of experiment designs to determine whether the addition of the term to the set of terms causes the set of terms to become unsupportable by any experiment design of the set of experiment design. In response to a determination that the addition of the term to the set of terms causes the set of terms to become unsupportable by any experiment design of the set of experiment designs, the processor may be caused to perform operations including present an indication of ineligible input on the display, and remove the term from the set of terms to cause the set of terms to become supportable by each experiment design of the set of experiment designs. The processor may be caused, for each experiment design of the set of experiment designs, to perform operations including: derive a covariance of each pair of terms able to be generated from among the set of terms, and derive the degree of correlation of each pair of terms from the covariance derived for the pair of terms and from a standard deviation of each term of the pair of terms.

The processor may be caused to perform operations including: generate the horizontal axes of at least two term correlation graphs of the set of term correlation graphs to have an identical horizontal orientation; generate the vertical axes of the at least two term correlation graphs of the set of term correlation graphs to have an identical vertical orientation; and arrange the terms of the set of terms in an identical order along the horizontal axes and along the vertical axes of the at least two term correlation graphs of the set of term correlation graphs, such that all of the intersections at which a term of the set of terms is correlated to itself are arranged along a diagonal line that has an identical position and orientation within the at least two term correlation graphs of the set of term correlation graphs.

The terms of the set of terms may be arranged along the horizontal and vertical axes of the at least two correlation graphs to group the terms of the set of terms based on order. The order of each term of the set of terms may be selected from a group consisting of: a first order main effect term; a second order term; and a third order term. A visual difference that indicates differing degrees of correlation among the visual indicators of the set of visual indicators may be selected from a group consisting of different colors, different degrees of gray shading, and different visual patterns.

The processor may be caused to perform operations including: monitor the input device to enable reception of input that indicates a change to the set of terms; and in response to receipt of input that indicates a change to the set of terms to add or remove a specified term, perform operations including enact the change to the set of terms to add or remove the specified term, and repeat the generation of the set of term correlation graphs based on the set of terms after enactment of the change to the set of terms. The processor is caused to perform operations including: for each experiment design of the set of experiment designs, derive a statistical power for each term of the set of terms; for each term of the set of terms, generate a graph of statistical power versus quantity of runs that includes a plot of the term for each experiment design of the set of experiment designs; for each graph of statistical power versus quantity of runs, fit a curve to the plots therein; and present the graphs of statistical power versus quantity of runs generated for all of the terms of the set of terms at adjacent locations on the display.

The processor may be caused to perform operations including: for each term of the multiple terms of the model associated with a first experiment design of the set of experiment designs, identify a matching term of the multiple terms of the model associated with a second experiment design of the set of experiment designs based on an order of each term, text of a term identifier of each term, and vocabulary data comprising a thesaurus of matches among words based on meanings associated with the words; and present, on the display, the identified matches between the multiple terms of the models associated with the first and second experiment designs. The processor may be caused to perform operations including monitor the input device to enable reception of input that indicates a change to the set of terms. In response to a receipt of input from the input device indicating a correction to the identified matches between the multiple terms of the models associated with the first and second experiment designs, the processor may be caused to perform operations including: store within the vocabulary data and as an exception to a match among words of the thesaurus, an indication of at least one match between texts specified by the indicated correction; enact the indicated correction; and present, on the display, the identified matches between the multiple terms of the models associated with the first and second experiment designs.

A computer-program product tangibly embodied in a non-transitory machine-readable storage medium, the computer-program product including instructions that may be operable to cause a processor to perform operations including receive, from an input device communicatively coupled to the processor, indications of selection of a set of experiment designs to be compared, wherein: each experiment design of the set of experiment designs is associated with a model of a system under evaluation; each experiment design specifies a quantity of runs of a test to perform to analyze the system; and the model associated with each experiment design comprises multiple terms as inputs to the model and multiple responses as outputs of the model. The processor may be further caused to receive, from the input device, indications of selection of a set of terms to be included in the comparison, wherein each term of the set of terms is included in the multiple terms of the model associated with each experiment design of the set of experiment designs. The processor may be further caused to, for each experiment design of the set of experiment designs, generate a corresponding term correlation graph of a set of term correlation graphs, wherein: the correlation graph comprises a horizontal axis along which the set of terms are arranged, and a vertical axis along which the set of terms are arranged; at each intersection of a term along the horizontal axis and a term along the vertical axis within the graph, a degree of correlation between the term along the horizontal axis and the term along the vertical axis is indicated with a visual indicator selected from a set of visual indicators; the visual indicators of the set of visual indicators are assigned an order that corresponds to a continuous range of degree of correlation; and the continuous range of degree of correlation is divided into a set of contiguous sub-ranges, and each visual indicator corresponds to one of the sub-ranges. The processor may be further caused to present at least two correlation graphs of the set of correlation graphs at adjacent locations on a display communicatively coupled to the processor.

The processor may be caused to perform operations including: monitor the input device to enable reception of input that indicates a change to the set of terms; and in response to receipt of input from the input device to add a term to the set of terms, analyze the model associated with each experiment design of the set of experiment designs to determine whether the addition of the term to the set of terms causes the set of terms to become unsupportable by any experiment design of the set of experiment designs. The processor may be further caused to, in response to a determination that the addition of the term to the set of terms causes the set of terms to become unsupportable by any experiment design of the set of experiment designs, perform operations including: present an indication of ineligible input on the display; and remove the term from the set of terms to cause the set of terms to become supportable by each experiment design of the set of experiment designs. The processor may be caused, for each experiment design of the set of experiment designs, to perform operations including: derive a covariance of each pair of terms able to be generated from among the set of terms; and derive the degree of correlation of each pair of terms from the covariance derived for the pair of terms and from a standard deviation of each term of the pair of terms.

The processor may be caused to perform operations including: generate the horizontal axes of at least two term correlation graphs of the set of term correlation graphs to have an identical horizontal orientation; generate the vertical axes of the at least two term correlation graphs of the set of term correlation graphs to have an identical vertical orientation; and arrange the terms of the set of terms in an identical order along the horizontal axes and along the vertical axes of the at least two term correlation graphs of the set of term correlation graphs, such that all of the intersections at which a term of the set of terms is correlated to itself are arranged along a diagonal line that has an identical position and orientation within the at least two term correlation graphs of the set of term correlation graphs. The terms of the set of terms may be arranged along the horizontal and vertical axes of the at least two correlation graphs to group the terms of the set of terms based on order. The order of each term of the set of terms may be selected from a group consisting of a first order main effect term, a second order term, and a third order term. A visual difference that indicates differing degrees of correlation among the visual indicators of the set of visual indicators may be selected from a group consisting of different colors, different degrees of gray shading, and different visual patterns.

The processor is caused to perform operations including: monitor the input device to enable reception of input that indicates a change to the set of terms; and in response to receipt of input that indicates a change to the set of terms to add or remove a specified term, perform operations including enact the change to the set of terms to add or remove the specified term, and repeat the generation of the set of term correlation graphs based on the set of terms after enactment of the change to the set of terms. The processor may be caused to perform operations including: for each experiment design of the set of experiment designs, derive a statistical power for each term of the set of terms; for each term of the set of terms, generate a graph of statistical power versus quantity of runs that includes a plot of the term for each experiment design of the set of experiment designs; for each graph of statistical power versus quantity of runs, fit a curve to the plots therein; and present the graphs of statistical power versus quantity of runs generated for all of the terms of the set of terms at adjacent locations on the display.

The processor may be caused to perform operations including: for each term of the multiple terms of the model associated with a first experiment design of the set of experiment designs, identify a matching term of the multiple terms of the model associated with a second experiment design of the set of experiment designs based on an order of each term, text of a term identifier of each term, and vocabulary data comprising a thesaurus of matches among words based on meanings associated with the words; and present, on the display, the identified matches between the multiple terms of the models associated with the first and second experiment designs. The processor may caused to perform operations including monitor the input device to enable reception of input that indicates a change to the set of terms. In response to a receipt of input from the input device indicating a correction to the identified matches between the multiple terms of the models associated with the first and second experiment designs, the processor may be caused to perform operations including: store within the vocabulary data and as an exception to a match among words of the thesaurus, an indication of at least one match between texts specified by the indicated correction; enact the indicated correction; and present, on the display, the identified matches between the multiple terms of the models associated with the first and second experiment designs.

A computer-implemented method may include receiving, at a coordinating device from an input device, indications of selection of a set of experiment designs to be compared, wherein: each experiment design of the set of experiment designs is associated with a model of a system under evaluation; each experiment design specifies a quantity of runs of a test to perform to analyze the system; and the model associated with each experiment design comprises multiple terms as inputs to the model and multiple responses as outputs of the model. The method may further include receiving, from the input device, indications of selection of a set of terms to be included in the comparison, wherein each term of the set of terms is included in the multiple terms of the model associated with each experiment design of the set of experiment designs. The method may further include, for each experiment design of the set of experiment designs, generating a corresponding term correlation graph of a set of term correlation graphs, wherein: the correlation graph comprises a horizontal axis along which the set of terms are arranged, and a vertical axis along which the set of terms are arranged; at each intersection of a term along the horizontal axis and a term along the vertical axis within the graph, a degree of correlation between the term along the horizontal axis and the term along the vertical axis is indicated with a visual indicator selected from a set of visual indicators; the visual indicators of the set of visual indicators are assigned an order that corresponds to a continuous range of degree of correlation; and the continuous range of degree of correlation is divided into a set of contiguous sub-ranges, and each visual indicator corresponds to one of the sub-ranges. The method may further include presenting at least two correlation graphs of the set of correlation graphs at adjacent locations on a display communicatively coupled to the coordinating device.

The method may include: monitoring the input device to enable reception of input that indicates a change to the set of terms; and in response to receipt of input from the input device to add a term to the set of terms, analyzing the model associated with each experiment design of the set of experiment designs to determine whether the addition of the term to the set of terms causes the set of terms to become unsupportable by any experiment design of the set of experiment designs. The method may include, in response to a determination that the addition of the term to the set of terms causes the set of terms to become unsupportable by any experiment design of the set of experiment designs, performing operations including presenting an indication of ineligible input on the display, and removing the term from the set of terms to cause the set of terms to become supportable by each experiment design of the set of experiment designs. The method may include, for each experiment design of the set of experiment designs, performing operations including deriving a covariance of each pair of terms able to be generated from among the set of terms, and deriving the degree of correlation of each pair of terms from the covariance derived for the pair of terms and from a standard deviation of each term of the pair of terms.

The method may include: generating the horizontal axes of at least two term correlation graphs of the set of term correlation graphs to have an identical horizontal orientation; generating the vertical axes of the at least two term correlation graphs of the set of term correlation graphs to have an identical vertical orientation; and arranging the terms of the set of terms in an identical order along the horizontal axes and along the vertical axes of the at least two term correlation graphs of the set of term correlation graphs, such that all of the intersections at which a term of the set of terms is correlated to itself are arranged along a diagonal line that has an identical position and orientation within the at least two term correlation graphs of the set of term correlation graphs. The terms of the set of terms may be arranged along the horizontal and vertical axes of the at least two correlation graphs to group the terms of the set of terms based on order. The order of each term of the set of terms may be selected from a group consisting of a first order main effect term, a second order term, and a third order term. A visual difference that indicates differing degrees of correlation among the visual indicators of the set of visual indicators may be selected from a group consisting of different colors, different degrees of gray shading, and different visual patterns.

The method may include monitoring the input device to enable reception of input that indicates a change to the set of terms. The method may include, in response to receipt of input that indicates a change to the set of terms to add or remove a specified term, performing operations including enacting the change to the set of terms to add or remove the specified term; and repeating the generation of the set of term correlation graphs based on the set of terms after enactment of the change to the set of terms. The method may include: for each experiment design of the set of experiment designs, deriving a statistical power for each term of the set of terms; for each term of the set of terms, generating a graph of statistical power versus quantity of runs that includes a plot of the term for each experiment design of the set of experiment designs; for each graph of statistical power versus quantity of runs, fitting a curve to the plots therein; and presenting the graphs of statistical power versus quantity of runs generated for all of the terms of the set of terms at adjacent locations on the display.

The method may include, for each term of the multiple terms of the model associated with a first experiment design of the set of experiment designs, identifying a matching term of the multiple terms of the model associated with a second experiment design of the set of experiment designs based on an order of each term, text of a term identifier of each term, and vocabulary data comprising a thesaurus of matches among words based on meanings associated with the words; and presenting, on the display, the identified matches between the multiple terms of the models associated with the first and second experiment designs. The method may include monitoring the input device to enable reception of input that indicates a change to the set of terms. The method may include, in response to a receipt of input from the input device indicating a correction to the identified matches between the multiple terms of the models associated with the first and second experiment designs, performing operations including: storing within the vocabulary data and as an exception to a match among words of the thesaurus, an indication of at least one match between texts specified by the indicated correction; enacting the indicated correction; and presenting, on the display, the identified matches between the multiple terms of the models associated with the first and second experiment designs.

An apparatus may include a processor and a storage to store instructions that, when executed by the processor, cause the processor to perform operations including receive, from an input device communicatively coupled to the processor, an indication of selection of an experiment design for regression analysis, wherein: the experiment design specifies a quantity of runs of a test to perform a designed experiment; the experiment design is associated with a model of a system under evaluation; the model comprises multiple terms as inputs to the model; each term comprises at least one factor of multiple factors that are each an input to the system; the experiment design specifies an initial value of a coefficient for each term; the experiment design specifies a set of levels for each factor; and the experiment design specifies a single initial degree of difficulty in varying levels and a single initial degree of random error that are applicable to all factors. The processor may be further caused to: receive, from the input device, an indication of selection of a type of distribution for a simulation of random data to employ as values of the multiple factors during the regression analysis; receive, from the input device, an indication of selection of a number of iterations of the simulation of random data to perform during the regression analysis; generate first executable instructions in a pre-selected programming language to be executable by the processor to perform the regression analysis with the selected number of iterations of simulation of the random data and with the selected type of distribution; generate a human readable form of a portion of the first executable instructions that includes the coefficients and terms in mathematical notation, and that specifies the selected number of iterations and the selected type of distribution for the simulation of random data; and present, on a display communicatively coupled to the processor, the human readable form of the portion of the first executable instructions.

The processor may be caused to perform operations including monitor the input device to enable reception of input of a command to perform the regression analysis. In response to reception of the command, the processor is caused to perform operations including: execute, by the processor, the first executable instructions to perform the regression analysis, wherein the performance of the regression analysis comprises generation of the selected number of iterations of the random data with the selected type of distribution; and present, on the display, results of the regression analysis based on the first executable instructions.

For each term, the results of the regression analysis may include a derived value of the coefficient to replace the initial value based on the simulated random data. For each term, the results of the regression analysis may include an indication of statistical power based on the initial degree of random error represented by the simulated random data generated for the term. The processor may be caused to perform operations including: monitor the input device to enable reception of input that indicates a separate degree of random error to be represented by the simulated random data to be generated for at least one specified factor of the multiple factors; generate second executable instructions in the pre-selected programming language to be executable by the processor to perform the regression analysis with the selected number of iterations of simulation of the random data and with the selected type of distribution, wherein the separate degree of random error is applied to the at least one specified factor; execute, by the processor, the second executable instructions to perform the regression analysis, wherein the performance of the regression analysis comprises generation of the selected number of iterations of the random data with the selected type of distribution; and present, on the display, results of the regression analysis based on the second executable instructions.

The processor may be caused to perform operations including: receive, from the input device, an indication of selection of one factor of the multiple factors as a whole plot factor; receive, from the input device, an indication of a separate degree of difficulty in varying levels that is applicable to the whole plot factor; generate second executable instructions in the pre-selected programming language that to be executable by the processor to perform the regression analysis with the selected number of iterations of simulation of the random data and with the selected type of distribution, wherein the runs are organized to minimize the varying of levels of the whole plot factor; generate a human readable form of a portion of the second executable instructions that includes the coefficients and terms in mathematical notation, and that specifies the selected number of iterations and the selected type of distribution for the simulation of random data; and present, on a display communicatively coupled to the processor, the human readable form of the portion of the second executable instructions. The selection of the whole plot factor may define the experiment design as a split-plot design; the human readable form of the portion of the second executable instructions may explicitly present a separate expression of each level of the whole plot factor; and each separate expression of a level of the whole plot factor may be accompanied by a separate expression of simulation of random data for the multiple factors other than the whole plot factor. The processor may be caused to perform operations including: receive, from the input device, an indication of selection of another factor of the multiple factors as a subplot factor; receive, from the input device, an indication of another separate degree of difficulty in varying levels that is applicable to the subplot factor; and generate the second executable instructions in the pre-selected programming language to be executable by the processor to perform the regression analysis with the selected number of iterations of simulation of the random data and with the selected type of distribution, wherein the runs are organized to minimize transitions between levels of the whole plot factor and to minimize transitions between levels of the subplot factor. The selection of the whole plot factor and of the subplot factor may define the experiment design as a split-split-plot design; the human readable form of the portion of the second executable instructions may explicitly present a separate expression of each combination of a level of the whole plot factor and a level of the subplot factor; and each separate expression of a combination of a level of the whole plot factor and a level of the subplot factor may be accompanied by a separate expression of simulation of random data for the multiple factors other than the whole plot factor and the subplot factor.

The mathematical notation may include at least one separator of expressions within the human readable form of the portion of the first executable instructions selected from the group consisting of a pair of parenthesis, a pair of brackets, and a vinculum.

A computer-program product tangibly embodied in a non-transitory machine-readable storage medium, the computer-program product including instructions that may be operable to cause a processor to perform operations including receive, from an input device communicatively coupled to the processor, an indication of selection of an experiment design for regression analysis, wherein: the experiment design specifies a quantity of runs of a test to perform a designed experiment; the experiment design is associated with a model of a system under evaluation; the model comprises multiple terms as inputs to the model; each term comprises at least one factor of multiple factors that are each an input to the system; the experiment design specifies an initial value of a coefficient for each term; the experiment design specifies a set of levels for each factor; and the experiment design specifies a single initial degree of difficulty in varying levels and a single initial degree of random error that are applicable to all factors. The processor may be further caused to perform operations including: receive, from the input device, an indication of selection of a type of distribution for a simulation of random data to employ as values of the multiple factors during the regression analysis; receive, from the input device, an indication of selection of a number of iterations of the simulation of random data to perform during the regression analysis; generate first executable instructions in a pre-selected programming language to be executable by the processor to perform the regression analysis with the selected number of iterations of simulation of the random data and with the selected type of distribution; generate a human readable form of a portion of the first executable instructions that includes the coefficients and terms in mathematical notation, and that specifies the selected number of iterations and the selected type of distribution for the simulation of random data; and present, on a display communicatively coupled to the processor, the human readable form of the portion of the first executable instructions.

The processor may be caused to perform operations including monitor the input device to enable reception of input of a command to perform the regression analysis. In response to reception of the command, the processor may be caused to perform operations including: execute, by the processor, the first executable instructions to perform the regression analysis, wherein the performance of the regression analysis comprises generation of the selected number of iterations of the random data with the selected type of distribution; and present, on the display, results of the regression analysis based on the first executable instructions. For each term, the results of the regression analysis may include a derived value of the coefficient to replace the initial value based on the simulated random data. For each term, the results of the regression analysis may include an indication of statistical power based on the initial degree of random error represented by the simulated random data generated for the term. The processor may be caused to perform operations including: monitor the input device to enable reception of input that indicates a separate degree of random error to be represented by the simulated random data to be generated for at least one specified factor of the multiple factors; generate second executable instructions in the pre-selected programming language to be executable by the processor to perform the regression analysis with the selected number of iterations of simulation of the random data and with the selected type of distribution, wherein the separate degree of random error is applied to the at least one specified factor; execute, by the processor, the second executable instructions to perform the regression analysis, wherein the performance of the regression analysis comprises generation of the selected number of iterations of the random data with the selected type of distribution; and present, on the display, results of the regression analysis based on the second executable instructions.

The processor may be caused to perform operations including: receive, from the input device, an indication of selection of one factor of the multiple factors as a whole plot factor; receive, from the input device, an indication of a separate degree of difficulty in varying levels that is applicable to the whole plot factor; generate second executable instructions in the pre-selected programming language that to be executable by the processor to perform the regression analysis with the selected number of iterations of simulation of the random data and with the selected type of distribution, wherein the runs are organized to minimize the varying of levels of the whole plot factor; generate a human readable form of a portion of the second executable instructions that includes the coefficients and terms in mathematical notation, and that specifies the selected number of iterations and the selected type of distribution for the simulation of random data; and present, on a display communicatively coupled to the processor, the human readable form of the portion of the second executable instructions. The selection of the whole plot factor defines the experiment design as a split-plot design; the human readable form of the portion of the second executable instructions explicitly presents a separate expression of each level of the whole plot factor; and each separate expression of a level of the whole plot factor is accompanied by a separate expression of simulation of random data for the multiple factors other than the whole plot factor. The processor may be caused to perform operations including: receive, from the input device, an indication of selection of another factor of the multiple factors as a subplot factor; receive, from the input device, an indication of another separate degree of difficulty in varying levels that is applicable to the subplot factor; and generate the second executable instructions in the pre-selected programming language to be executable by the processor to perform the regression analysis with the selected number of iterations of simulation of the random data and with the selected type of distribution, wherein the runs are organized to minimize transitions between levels of the whole plot factor and to minimize transitions between levels of the subplot factor. The selection of the whole plot factor and of the subplot factor may define the experiment design as a split-split-plot design; the human readable form of the portion of the second executable instructions may explicitly present a separate expression of each combination of a level of the whole plot factor and a level of the subplot factor; and each separate expression of a combination of a level of the whole plot factor and a level of the subplot factor may be accompanied by a separate expression of simulation of random data for the multiple factors other than the whole plot factor and the subplot factor.

The mathematical notation may include at least one separator of expressions within the human readable form of the portion of the first executable instructions selected from the group consisting of a pair of parenthesis, a pair of brackets, and a vinculum.

A computer-implemented method may include receiving, at a processor and from an input device communicatively coupled to the processor, an indication of selection of an experiment design for regression analysis, wherein: the experiment design specifies a quantity of runs of a test to perform a designed experiment; the experiment design is associated with a model of a system under evaluation; the model comprises multiple terms as inputs to the model; each term comprises at least one factor of multiple factors that are each an input to the system; the experiment design specifies an initial value of a coefficient for each term; the experiment design specifies a set of levels for each factor; and the experiment design specifies a single initial degree of difficulty in varying levels and a single initial degree of random error that are applicable to all factors. The method may further include: receiving, at the processor and from the input device, an indication of selection of a type of distribution for a simulation of random data to employ as values of the multiple factors during the regression analysis; receiving, at the processor and from the input device, an indication of selection of a number of iterations of the simulation of random data to perform during the regression analysis; generating, by the processor, first executable instructions in a pre-selected programming language to be executable by the processor to perform the regression analysis with the selected number of iterations of simulation of the random data and with the selected type of distribution; generating a human readable form of a portion of the first executable instructions that includes the coefficients and terms in mathematical notation, and that specifies the selected number of iterations and the selected type of distribution for the simulation of random data; and presenting, on a display communicatively coupled to the processor, the human readable form of the portion of the first executable instructions.

The method may include monitoring the input device to enable reception of input of a command to perform the regression analysis. In response to reception of the command, the method may include performing operations including: executing, by the processor, the first executable instructions to perform the regression analysis, wherein performing the regression analysis comprises generating, by the processor, of the selected number of iterations of the random data with the selected type of distribution; and presenting, on the display, results of the regression analysis based on the first executable instructions. For each term, the results of the regression analysis comprise a derived value of the coefficient to replace the initial value based on the simulated random data. For each term, the results of the regression analysis comprise an indication of statistical power based on the initial degree of random error represented by the simulated random data generated for the term. The method may include: monitoring the input device to enable reception of input that indicates a separate degree of random error to be represented by the simulated random data to be generated for at least one specified factor of the multiple factors; generating, by the processor, second executable instructions in the pre-selected programming language to be executable by the processor to perform the regression analysis with the selected number of iterations of simulation of the random data and with the selected type of distribution, wherein the separate degree of random error is applied to the at least one specified factor; executing, by the processor, the second executable instructions to perform the regression analysis, wherein the performance of the regression analysis comprises generation of the selected number of iterations of the random data with the selected type of distribution; and presenting, on the display, results of the regression analysis based on the second executable instructions.

The method may include: receiving, at the processor and from the input device, an indication of selection of one factor of the multiple factors as a whole plot factor; receiving, at the processor and from the input device, an indication of a separate degree of difficulty in varying levels that is applicable to the whole plot factor; generating, by the processor, second executable instructions in the pre-selected programming language that to be executable by the processor to perform the regression analysis with the selected number of iterations of simulation of the random data and with the selected type of distribution, wherein the runs are organized to minimize the varying of levels of the whole plot factor; generating a human readable form of a portion of the second executable instructions that includes the coefficients and terms in mathematical notation, and that specifies the selected number of iterations and the selected type of distribution for the simulation of random data; and presenting, on a display communicatively coupled to the processor, the human readable form of the portion of the second executable instructions. The method may include: the selection of the whole plot factor defines the experiment design as a split-plot design; the human readable form of the portion of the second executable instructions explicitly presents a separate expression of each level of the whole plot factor; and each separate expression of a level of the whole plot factor is accompanied by a separate expression of simulation of random data for the multiple factors other than the whole plot factor. The method may include: receiving, at the processor and from the input device, an indication of selection of another factor of the multiple factors as a subplot factor; receiving, at the processor and from the input device, an indication of another separate degree of difficulty in varying levels that is applicable to the subplot factor; and generating, by the processor, the second executable instructions in the pre-selected programming language to be executable by the processor to perform the regression analysis with the selected number of iterations of simulation of the random data and with the selected type of distribution, wherein the runs are organized to minimize transitions between levels of the whole plot factor and to minimize transitions between levels of the subplot factor. The selection of the whole plot factor and of the subplot factor may define the experiment design as a split-split-plot design; the human readable form of the portion of the second executable instructions may explicitly present a separate expression of each combination of a level of the whole plot factor and a level of the subplot factor; and each separate expression of a combination of a level of the whole plot factor and a level of the subplot factor may be accompanied by a separate expression of simulation of random data for the multiple factors other than the whole plot factor and the subplot factor.

The mathematical notation may include at least one separator of expressions within the human readable form of the portion of the first executable instructions selected from the group consisting of a pair of parenthesis, a pair of brackets, and a vinculum.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 17A, 17B, 17C, 17D, 17E and 17F, together, illustrate additional details of the guidance of selection of an experiment design of FIG. 16.

FIGS. 19A, 19B, 19C, 19D and 19E, together, illustrate additional details of the guidance of performance of a regression analysis of FIG. 18.

FIGS. 20A and 20B, together, illustrate an example embodiment of a logic flow of guiding generation, selection and performances of regression analyses with experiment designs.

FIG. 21 illustrates an example embodiment of a logic flow of matching factors among experiment designs in the guidance of selection of an experiment design of FIGS. 20A-B.

DETAILED DESCRIPTION

Figure 1:
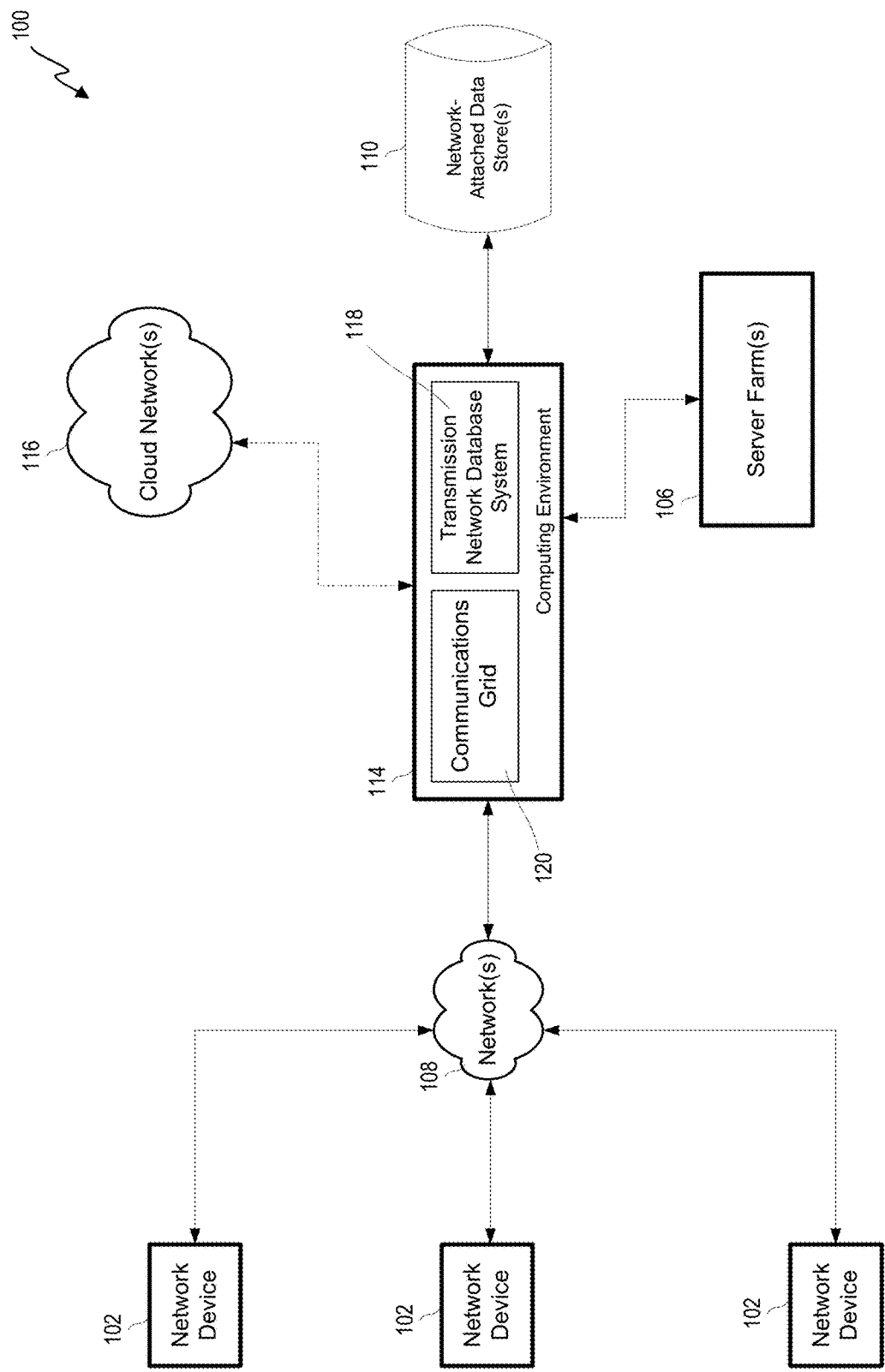
FIG. 1 illustrates a block diagram that provides an illustration of the hardware components of a computing system, according to some embodiments of the present technology.

Various embodiments described herein are generally directed to techniques for analyzing and comparing aspects of multiple experiment designs to enable the selection of an experiment design to be performed to develop an understanding of a linkage between particular factors and responses of a system being studied. Various embodiments described herein are also generally directed to techniques for using of simulated data in regression analyses to derive parameters of a model associated with a particular experiment design. More precisely, a set of analytical tools and an associated graphical user interface (GUI) are provided to derive and present comparisons and characterizations of multiple experiment designs to enable selection and refinement of an experiment design for use in developing an understanding of a linkage between particular factors and responses of a studied system, as well as developing an understanding of changes that may be made to one or more particular factors to bring about a desired change in one or more responses. Such tools may automatically identify matches between features of multiple experiment designs that are selected for comparison. Such tools and associated GUI may generate and present visualizations of various aspects of multiple experiment designs in a manner that advantageously utilizes features of the human visual system (HVS) to aid in recognizing salient aspects of experiment designs. Such tools and associated GUI may also automatically generate and present a more readily understandable visualization of the manner in which simulated data may be generated and employed in a regression analysis to refine aspects of a model associated with a selected experiment design. In various embodiments, parameters of the selected experiment design may be provided to a distributed processing system, either to perform such regression analysis or to perform the selected experiment design.

The variety of studied systems to which these techniques may be applied may include any of a wide variety of systems, including and not limited to, chemical processes, sub-atomic particle interactions, biomechanical and/or biochemical systems, geological systems, meteorological systems, manufacturing systems, electrical and/or optical networks, group egress behaviors in response to fire emergencies in public spaces, etc. The impetus to apply these techniques may be the observation of undesired responses of a studied system leading to a desire to identify the one or more factors of the studied system that are linked to those undesired responses. Alternatively or additionally, the impetus may include the desire to derive changes to make to the identified factors that may bring about more desirable responses from the studied system. However, as will be familiar to those skilled in the art, such systems are typically highly complex such that they defy efforts at understanding or addressing undesirable responses through intuitive ad hoc trial-and-error experimentation. By way of example, there may be too many factors and/or responses to consider, such that the quantity of observation data may be too large to make such unsystematic experimentation practical.

In a distributed processing system that may be employed to select and/or analyze an experiment design, one or more data devices may store a data set made up of observation data representing captured values of factors and corresponding responses of a studied system. In some embodiments, the one or more data devices may be co-located with and/or directly coupled to the studied system to capture such observation data (e.g., located at a facility to capture observation data from a chemical or manufacturing process that is performed there). In such embodiments, the one or more data devices may incorporate measuring device(s) that may directly capture observation data to thereby generate the stored data set. In other embodiments, the one or more data devices may be storage devices employed to store the data set and/or other information related to the studied system and/or to experiment designs that may be used in developing an understanding of the studied system. In such other embodiments, the one or more data devices may recurringly receive and aggregate observation data that may be captured and transmitted to the one or more data devices by one or more remotely located measuring devices (e.g., measuring devices distributed among medical facilities to capture biomechanical or biochemical data of patients undergoing treatment in a medical study).

A coordinating device of the distributed processing system may provide a GUI by which an operator may manually input parameters that define an experiment design and associated model. More specifically, the coordinating device may provide a menu-based and/or step-wise guided GUI that enables an operator to specify aspects of an experiment design and associated model, including and not limited to, factors, ranges of values of continuous factors, levels of categorical factors, terms based on the factors, responses, identifiers given to factors and responses, initial coefficients, initial degree(s) of error, a quantity of runs, input values for the factors for use during the runs, etc. As will be explained in greater detail, such a manually entered experiment design and associated model may be based on a set of constraints that are desired to be imposed on the performance of an experiment design, and may be employed as a reference against which one or more other experiment designs may be compared as part of enabling the selection of an experiment design to be performed.

The coordinating device may provide another GUI by which an operator may be presented with comparisons of aspects of two or more experiment designs to guide the operator in the selection of an experiment design to be performed. The operator may be visually guided, via the GUI, through providing various parameters for use in performing the comparisons, including and not limited to, selections of two or more experiment designs to be compared, corrections to one or more automatically derived matches between factors and/or terms of the compared experiment designs, selections of terms and/or responses to be included in the comparisons, signal-to-noise ratios that the selected terms are expected to be subject to, and/or degree(s) of error that the selected terms are expected to be subject to.

During and/or following the provision of such parameters, the operator may be visually presented, via the GUI, with various graphs and/or other visualizations depicting comparisons between aspects of each of the compared experiment designs. In so doing, graphs and/or other visualizations depicting corresponding aspects of different ones of the compared experiment designs may be presented at adjacent locations on a display in a manner that advantageously utilizes features of the HVS to enable speedy recognition of degrees of similarity therebetween. More specifically, such graphs and/or other visualizations may be positioned adjacent to each other in a horizontal side-by-side manner that utilizes the generally horizontal binocular placement of the eyes that imparts the typical "landscape" orientation to the field of view (FOV) of the HVS. Such visual presentations may be interactive in nature such that depicted numerical values in such visual presentations are dynamically re-derived in response to each new input by an operator to select, specify and/or change a parameter.

The coordinating device may provide still another GUI by which an operator may be presented with aspects of the manner in which simulated data may be randomly generated during regression analysis to determine one or more aspects of the model associated with the selected experiment design, such as coefficients and/or statistical power. The operator may be visually guided, via the GUI, through providing various parameters for use in the regression analysis, including and not limited to, values for one or more coefficients and/or changes thereto, degree(s) of difficulty in varying levels of one or more factors, degree(s) of error that one or more terms are expected to be subject to and/or changes thereto, selection of a type of distribution of simulated data to be randomly generated, and/or a number of iterations to perform of the regression analysis and accompanying generation of simulated data.

During and/or following the provision of such parameters, the coordinating device may generate and/or repeatedly regenerate instructions that are executable by one or more processors and/or processor cores to perform the regression analysis and accompanying generation of simulated data. Following such generation or regeneration, the operator may be visually presented, via the GUI, with a human readable form of a portion of the executable instructions that includes the presentation of the model in the form of a formula that includes the coefficients and terms, as well as human readable expressions of aspects of randomly generating the simulated data. In situations in which different degrees of difficulty in varying the levels of one or more factors have been specified, such that a split-plot or split-split-plot configuration is thereby specified, the visually presented formula may include portions separated by bracketing that separately specify the factors for which the varying the levels is more difficult, as well as explicit expressions of the manner in which the varying of levels for those factors are to be minimized (such that the quantity of transitions between levels are minimized for those factors) during generation of the simulated data.

In some embodiments, the GUI may be visually presented on a display incorporated into or otherwise connected to the coordinating device. Also, one or more input devices, such as a keyboard and/or pointing device, may be monitored for receive inputs from an operator in response to prompting by the GUI, where the one or more input devices may also be incorporated into or otherwise connected to the coordinating device. However, in other embodiments, the display and/or the one or more input devices may be incorporated into and/or otherwise connected to a separate viewing device of the distributed system.

In some embodiments, the distributed processing system may incorporate a grid of node devices among which the specified iterations of performances of the regression analysis and associated generation of simulated data may be distributed. More precisely, the coordinating device may distribute the executable instructions for performing the regression analysis, including the random generation of simulated data, among such a grid of node devices. The coordinating device may then coordinate an at least partially parallel performance of the iterations of the regression analysis by the grid of node devices, and aggregate the results thereof. In other embodiments, the coordinating device may, itself, incorporate one or more processors and/or processor cores among which the executable instructions for performing the regression analysis, including the random generation of simulated data, may be distributed. Following such distribution, the coordinating device may then coordinate an at least partially parallel performance of the iterations of the regression analysis by those processors and/or processor cores.

In some embodiments, following the performance of the regression analysis and accompanying generation of simulated data, the distributed processing system may directly perform the selected experiment design. As previously discussed, it may be that the one or more data devices may be co-located with the studied system. In some of such embodiments, the one or more data devices may control the studied system, and therefore, may be capable of actually performing the selected experiment design by directly varying factors and capturing the resulting responses. In some of such embodiments, the coordinating device may transmit a design profile and/or other information to the one or more data devices as part of enabling the one or more data devices to perform the experiment design with the studied system.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
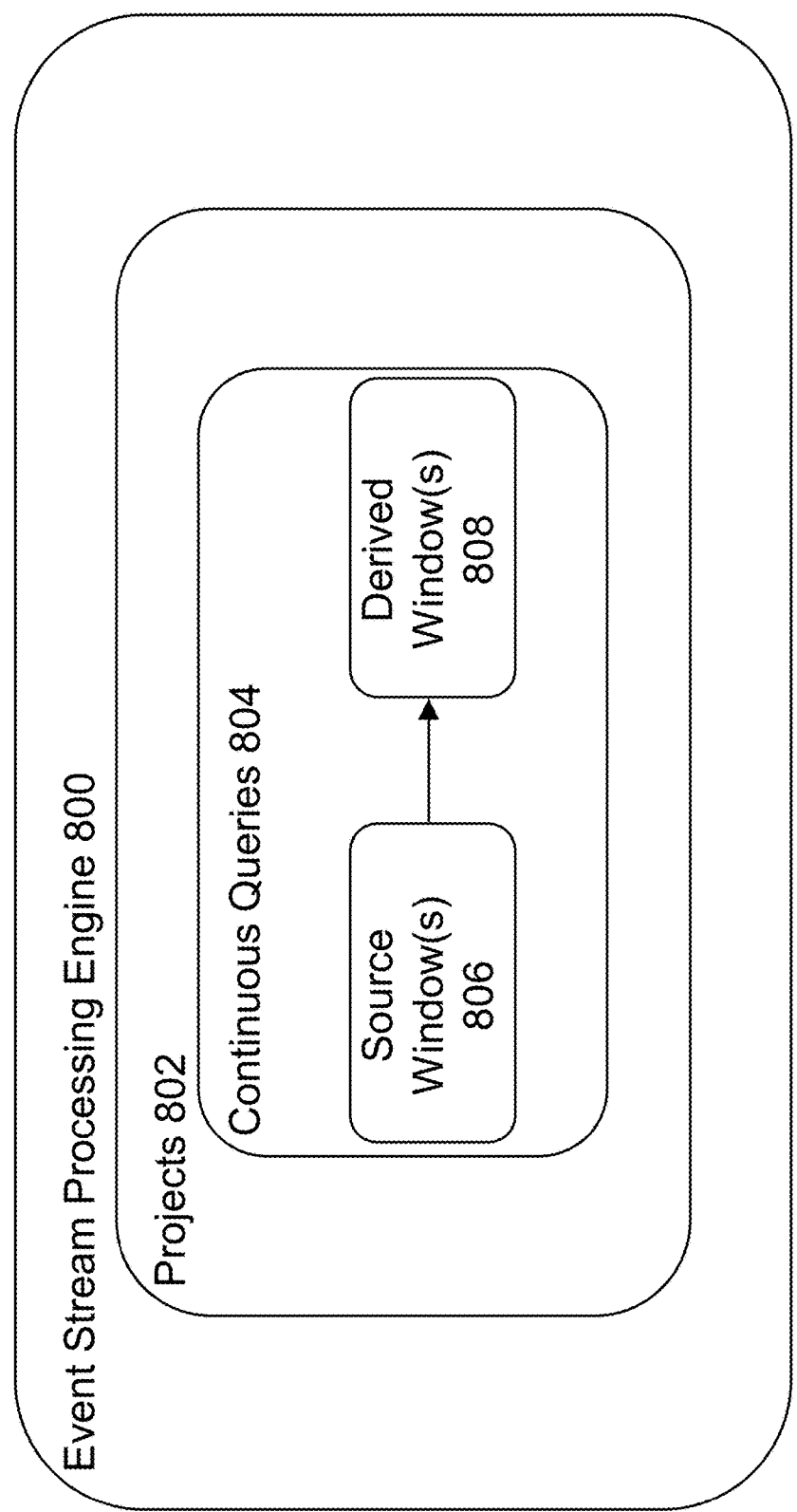
FIG. 8 illustrates a block diagram including components of an Event Stream Processing Engine (ESPE), according to embodiments of the present technology.
Figure 9:
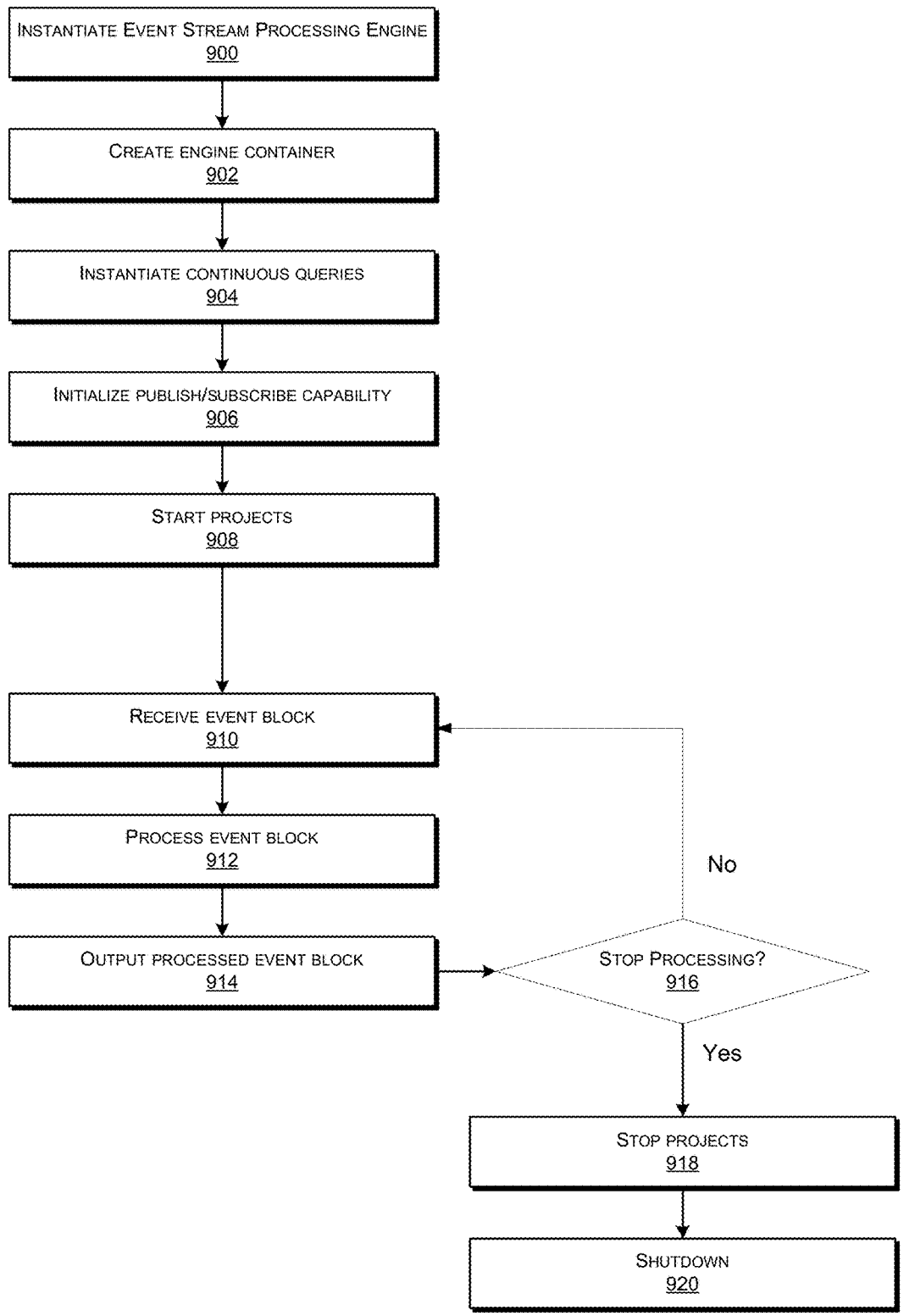
FIG. 9 illustrates a flow chart showing an example process including operations performed by an event stream processing engine, according to some embodiments of the present technology.
Figure 10:
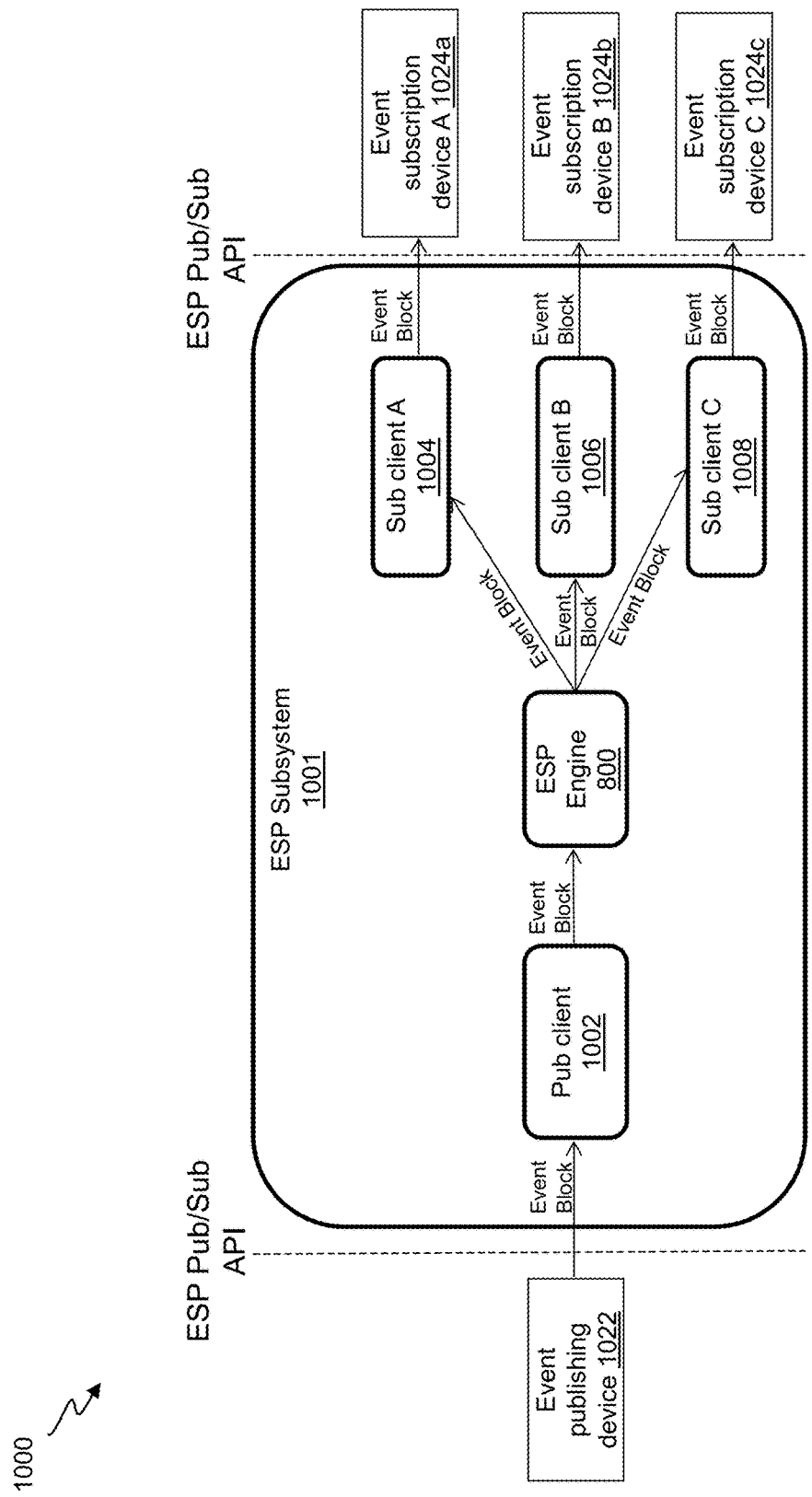
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
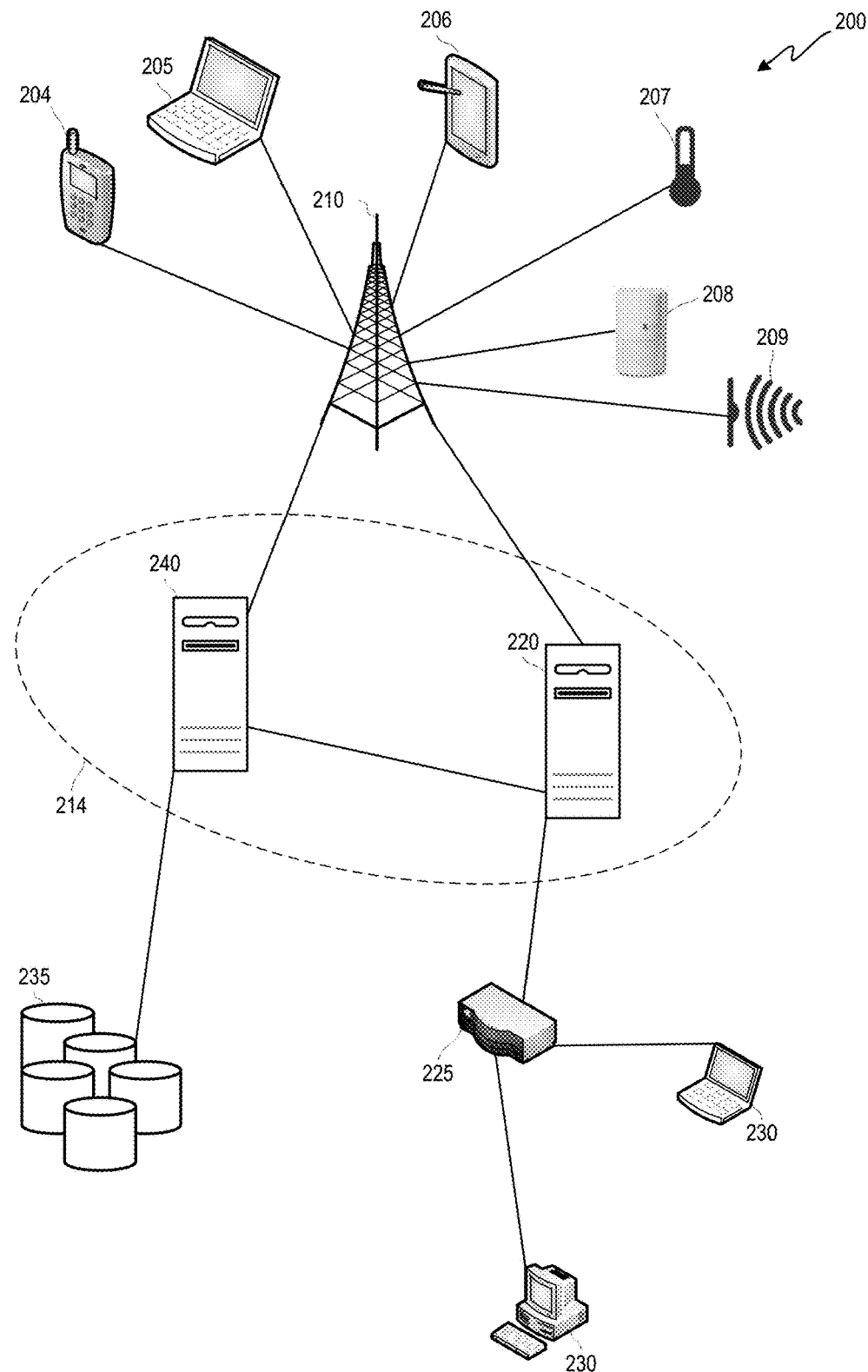
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
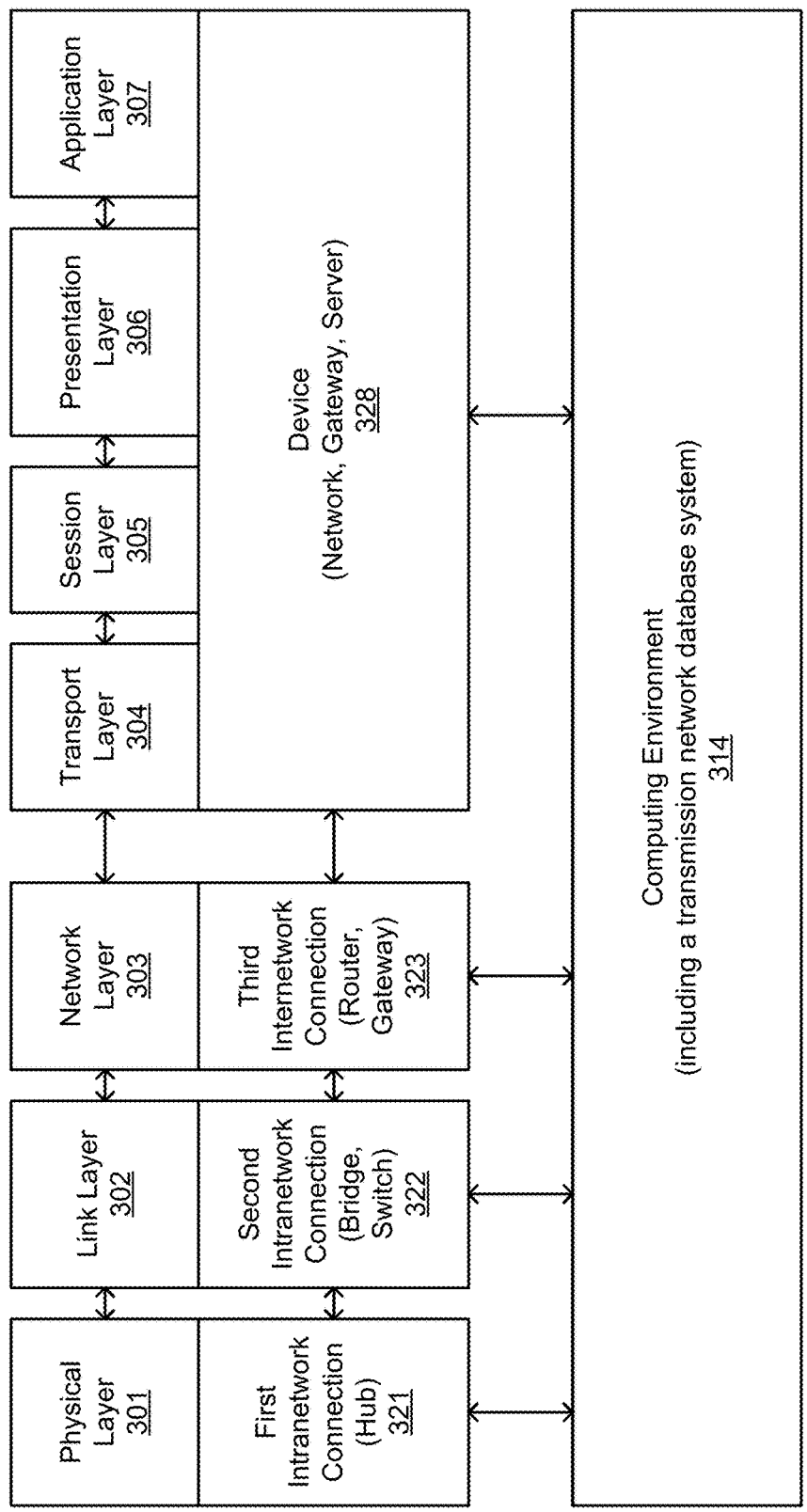
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
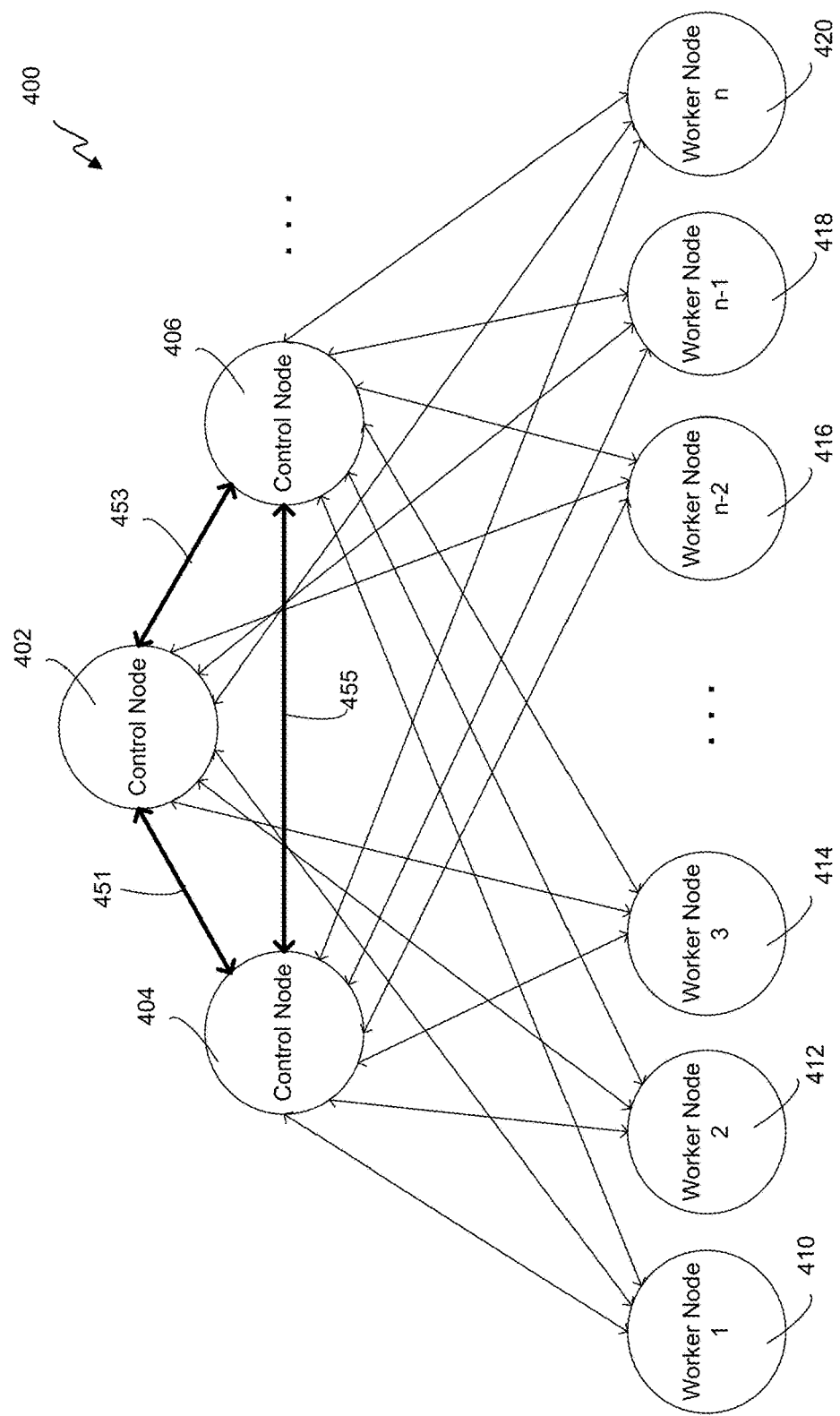
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
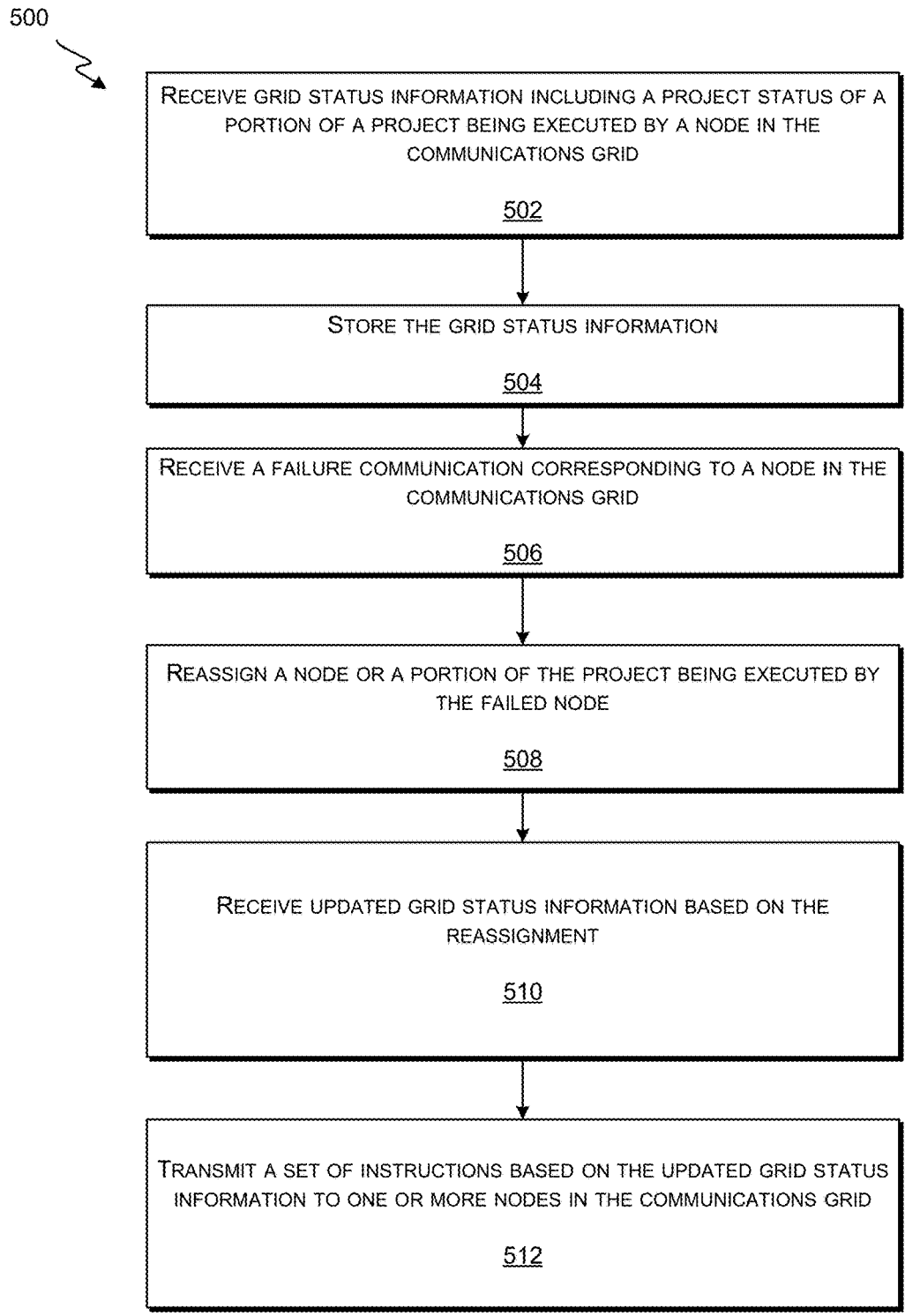
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
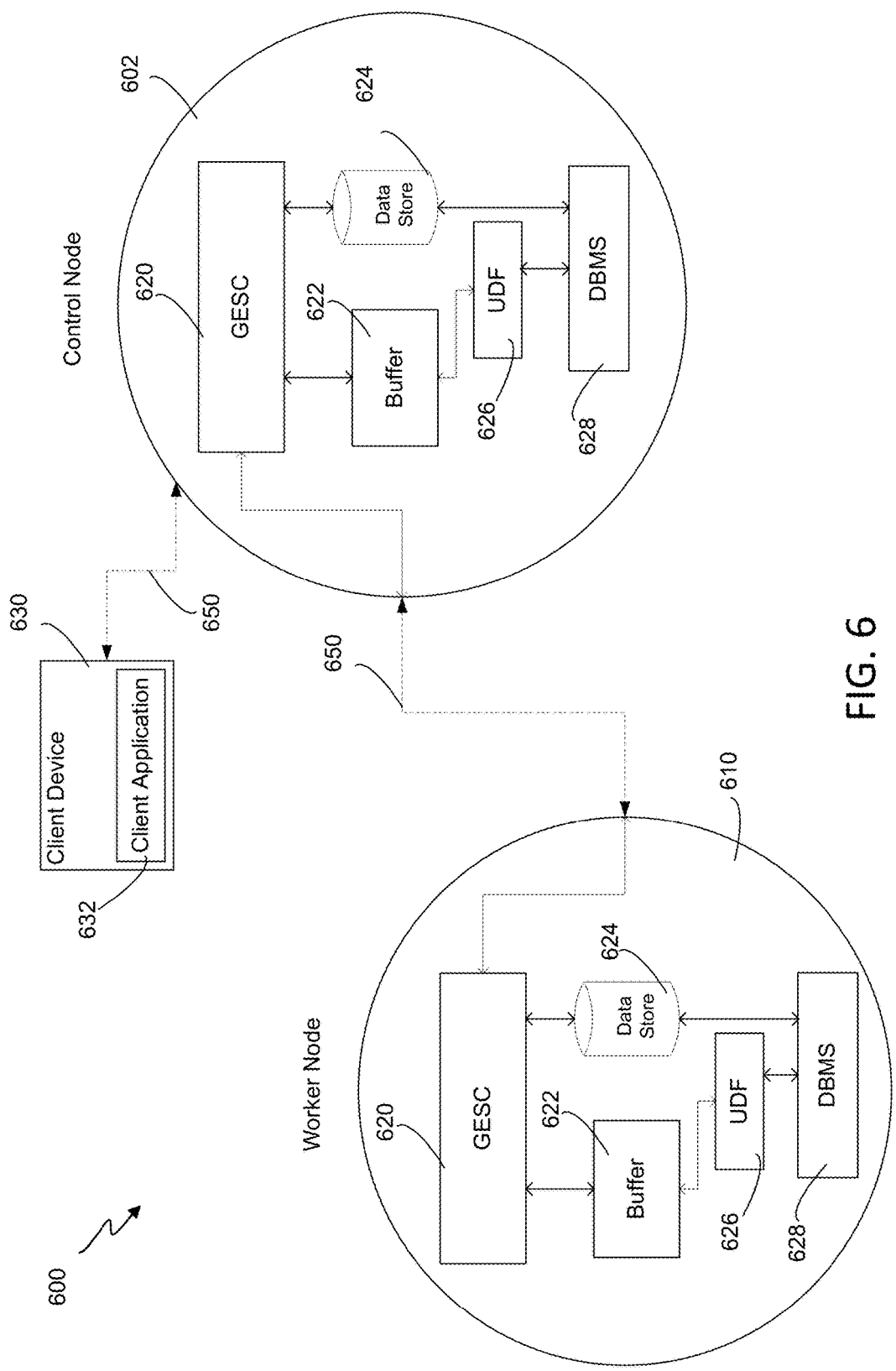
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
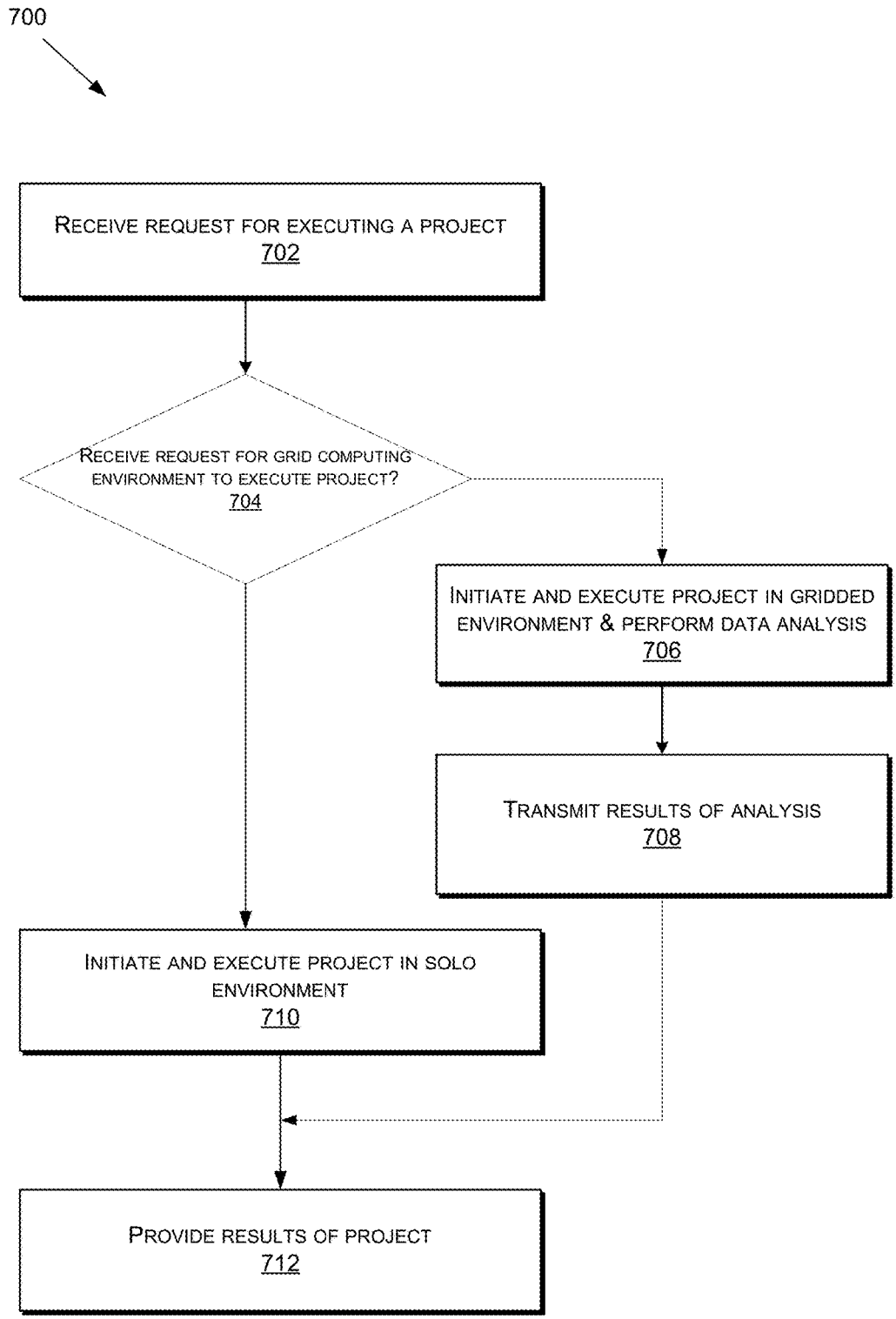
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
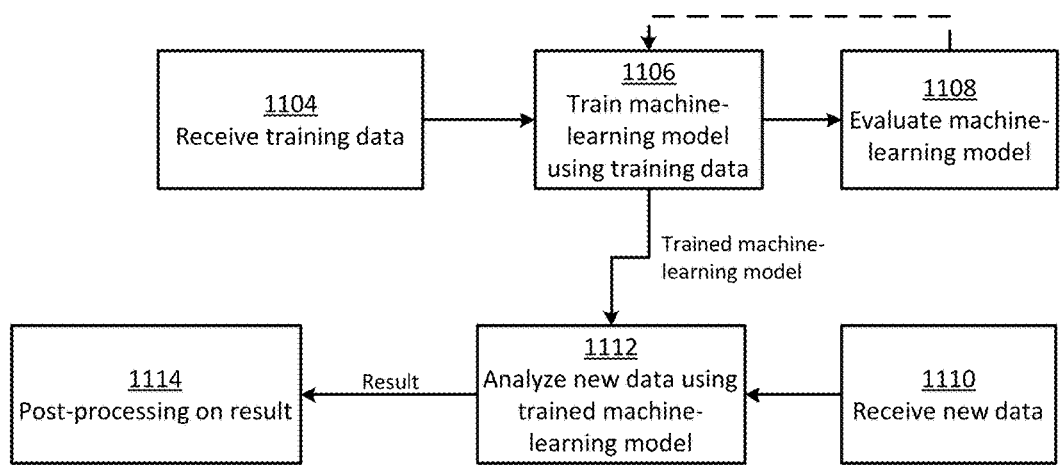
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
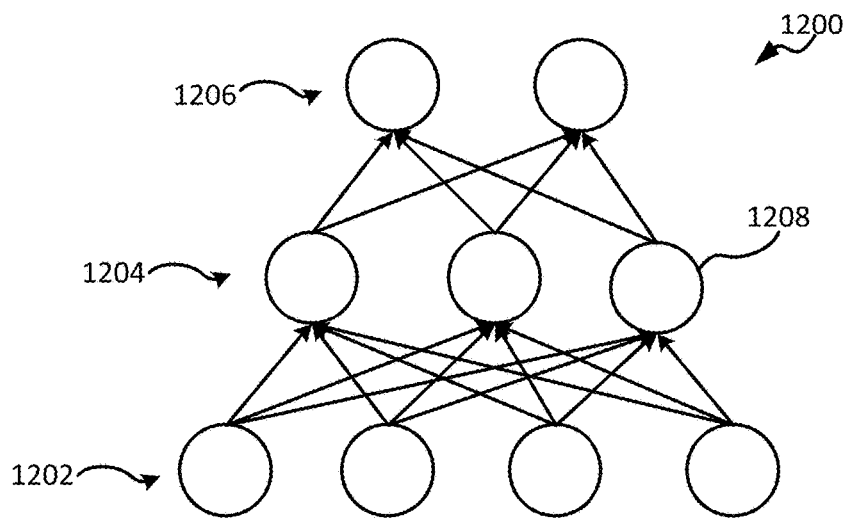
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13A:
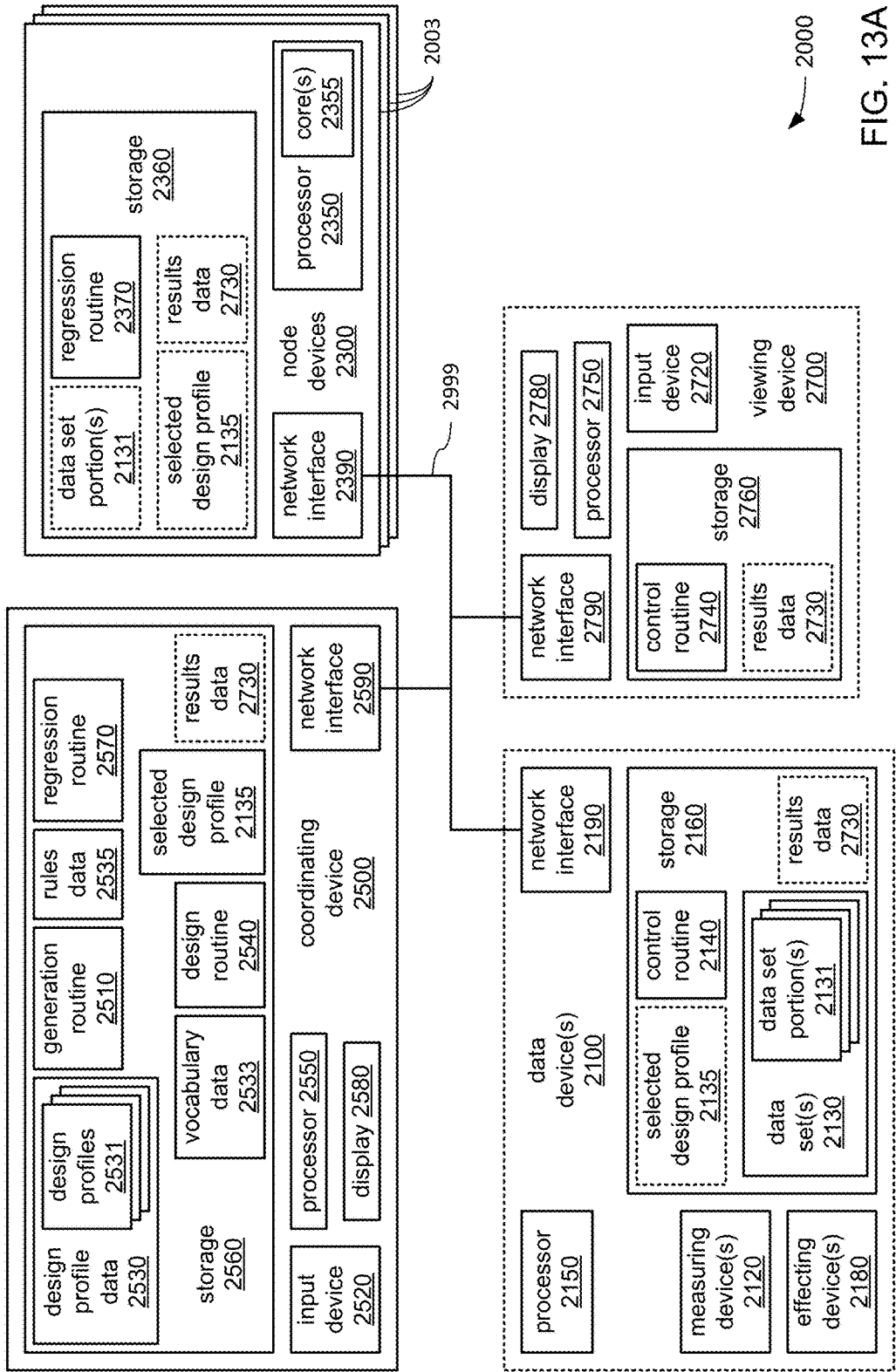
FIGS. 13A and 13B each illustrate an example embodiment of a distributed processing system.
Figure 13B:
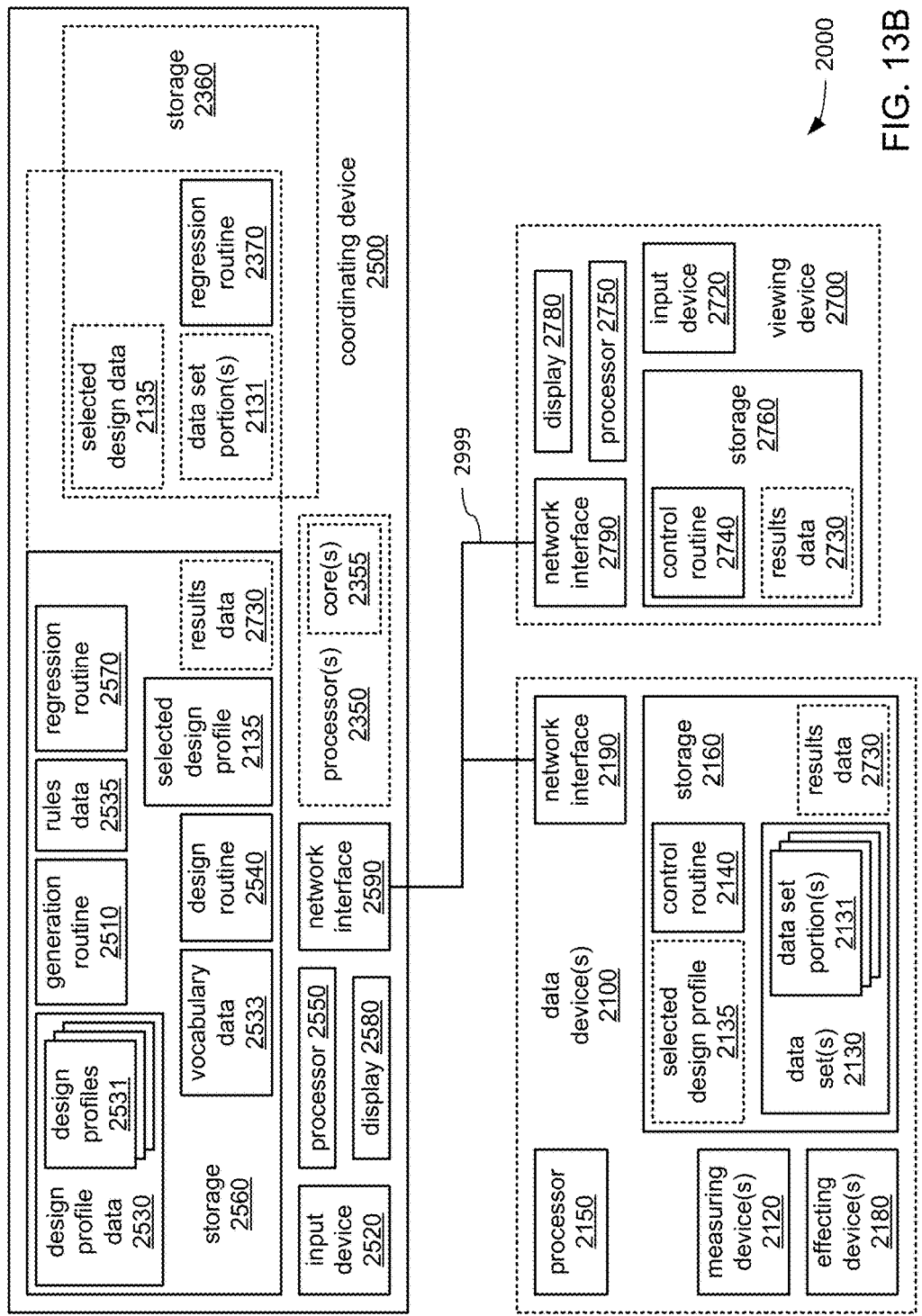

FIG. 13A illustrates a block diagram of an example embodiment of a distributed processing system 2000 incorporating one or more data devices 2100, one or more node devices 2300 that form of a device grid 2003, a coordinating device 2500 and/or a viewing device 2700 coupled by a network 2999. FIG. 13B illustrates a block diagram of an alternate example embodiment of the distributed processing system 2000 in which the coordinating device 2500 may perform the functions of the device grid 2003. In both of the embodiments of FIGS. 13A and 13B, the coordinating device 2500 may provide a graphical user interface (GUI) by which an operator may be guided through comparing multiple experiment designs, selecting an experiment design from among the compared experiment designs, performing a regression analysis of the selected experiment design, and/or performing the selected experiment design. In various embodiments, the provision of the GUI may be directly by the coordinating device 2500 or through the viewing device 2700. In various embodiments, the regression analysis may be performed by the device grid 2003 or multiple processors and/or processor cores of the coordinating device 2500. In some embodiments, the one or more data devices may directly perform the selected experiment design with the studied system.

In support of such operations, the devices 2100, 2300, 2500 and/or 2700 may exchange one or more design profiles and/or other data concerning one or more experiment designs via the network 2999. In various embodiments, the network 2999 may be a single network that may extend within a single building or other relatively limited area, a combination of connected networks that may extend a considerable distance, and/or may include the Internet.

Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

In various embodiments, each of the data devices 2100 may incorporate one or more of a processor 2150, a storage 2160, measuring device(s) 2120, effecting device(s) 2180, and a network interface 2190 to couple each of the data devices 2100 to the network 2999. The storage 2160 may store a control routine 2140, one or more data sets 2130, a selected design profile 2135, and/or results data 2730. The control routine 2140 may incorporate a sequence of instructions operative on the processor 2150 of each of the data devices 2100 to implement logic to perform various functions, at least partially in parallel with the processors 2150 of others of the data devices 2100. In executing the control routine 2140, the processor 2150 of each of the data devices 2100 may operate the network interface 2190 thereof to receive items of observation data captured by other devices (not shown) via the network 2999, and may store such items of observation data as one or more of the data sets 2130. Such other devices may include sensors or other forms of measuring device that monitor an aspect of a system under study, and may each transmit captured items of observation data to the one or more data devices 2100 for aggregation and/or storage. Alternatively or additionally, the processor 2150 of each of the data devices 2100 may operate one or more of the measuring devices 2120 that may be incorporated into one or more of the data devices 2100 to more directly capture such items of observation data, and may store such items of observation data as one or more of the data sets 2130.

Each of the measuring devices 2120 that may be incorporated into the one or more data devices 2100, and/or each remote device from which the one or more data devices 2100 may receive captured observation data via the network 2999, may be any of a variety of types of sensor or other data collecting device. Such sensors or other data collection devices may include, and are not limited to, any of a variety of physical and/or chemical sensors that measure aspects of a manufacturing or chemical process; any of a variety of electrical and/or optical energy sensors that measure aspects of transmission and/or reception of electrical and/or optical signals; any of a variety of manual input devices that accept manually entered observations made by personnel; etc. In embodiments in which the one or more data devices 2100 are involved in controlling the studied system such that the one or more data devices 2100 may incorporate one or more of the effecting devices 2180, each of the effecting devices 2180 may be any of a variety of types of controllable output device by which the one or more data devices 2100 may control one or more factors of the studied system. Such controllable output devices may include, and are not limited to, robotic end effectors to manipulate objects (e.g., grips, motors, solenoids, etc.), pumps and/or valves to selectively introduce chemical compounds, electrical and/or optical signal output devices, heaters and/or coolers, vibratory and/or acoustic output devices, radio frequency and/or magnetic emission devices, etc.

Each of the one or more data sets 2130 may include any of a wide variety of types of observation data concerning a studied system, including and not limited to, times, dates and/or locations of operation or use of the studied system; indications of aspects about the studied system that may differentiate the particular studied system from other similar studied systems; and/or captured observations of factors that are inputs to the studied system and responses that are outputs of the studied system. Each of the data sets 2130 may be divided into multiple data set portions 2131 that may each include captured observation data that may be so divided by times, dates and/or locations at which the items of observation data therein were captured. Alternatively or additionally, each of the data sets 2130 may be divided into multiple data set portions 2131 based on random samples taken of items of observation data therefrom to provide smaller, yet statistically representative, portions of each of the data sets 2130 that may be used in as an input to the guidance provided by the coordinating device 2500 in selecting an experiment design and/or in performing a regression test of a selected experiment design. The studied system may be any of a variety of systems, including and not limited to, chemical processes, sub-atomic particle interactions, biomechanical and/or biochemical systems, geological systems, meteorological systems, manufacturing systems, electrical and/or optical networks, group egress behaviors in response to fire emergencies in public spaces, etc. The impetus to apply these techniques may be the observation of undesired responses of a studied system leading to a desire to identify the one or more factors of the studied system that are linked to those undesired responses. Alternatively or additionally, the impetus may include the desire to derive changes to make to the identified factors that may bring about more desirable responses from the studied system.

Each data set 2130 may be stored as one or more data files, and/or as one or more instances of at least one other type of data structure, in a distributed manner among multiple ones of the data devices 2100. Such distributed storage of a data set 2130 may be carried out to provide redundancy in its storage as a protection against data loss arising from a malfunction or other events associated with one or more of the data devices 2100. Alternatively or additionally, in embodiments in which a data set 2130 is of considerably large size, such distributed storage of a data set 2130 may be carried out to improve the speed and efficiency with which it is able to be accessed and/or exchanged with other devices, including with the coordination device 2500 and/or the multiple node devices 2300 of the node device grid 2003. Indeed, a data set 2130 may be sufficiently large that there may be no single storage device available that has sufficient storage and/or throughput capacity.

In various embodiments, the viewing device 2700 incorporates one or more of a processor 2750, a storage 2760, an input device 2720, a display 2780, and a network interface 2790 to couple the viewing device 2700 to the network 2999. The storage 2760 may store one or both of a control routine 2740 and the results data 2730. The control routine 2740 may incorporate a sequence of instructions operative on the processor 2750 to implement logic to perform various functions. The processor 2750 may be caused by its execution of the control routine 2740 to operate the input device 2720, the display 2780 and/or the network interface 2790 in a manner that causes the viewing device 2700 to enable the coordinating device to remote provide the GUI. Alternatively or additionally, the processor 2780 may be caused to operate the network interface 2790 to receive the results data 2730 providing results of a regression analysis of a selected experiment design, may be caused to generate a visualization based on the results data 2730, and/or may be caused to operate the display 2780 to present the visualization on the display 2780.

Turning more specifically to FIG. 13A, each of the node devices 2300 may incorporate one or more of a processor 2350, a storage 2360 and a network interface 2390 to couple each of the node devices 2300 to the network 2999. The processor 2350 of each of the node devices 2300 may incorporate one or more processing cores 2355. The storage 2360 may store one or more of a regression routine 2370, the selected design profile 2135, data set portion(s) 2131 and/or the results data 2730. Within each of the multiple node devices 2300, the regression routine 2370 may incorporate a sequence of instructions operative on the processor 2350 to implement logic to perform various functions. The processor 2350 of each of the node devices 2300 may be caused by its execution of the regression routine 2370 to operate the network interface 2390 to receive the selected design profile 2135 from the coordinating device 2500 and/or to receive at least one of the data set portions 2131 from the one or more data devices 2100. The processor 2350 of each of the node devices 2300 may then employ the observation data of the studied system within the at least one data set portion 2131 and/or the information about a selected experiment design within the selected design profile 2135 to perform a regression analysis with the selected experiment design under the control of the coordinating device 2500. In so doing, the processor 2350 of one or more of the node devices 2300 may generate at least a portion of the results data 2730 providing an indication of the results of the regression analysis, and may operate the network interface 2390 to transmit the results data 2730 to the coordinating device 2500 and/or the viewing device 2700.

In various embodiments, the coordinating device 2500 may incorporate a processor 2550, a storage 2560, an input device 2520, a display 2580, and a network interface 2590 to couple the coordinating device 2500 to the network 2999. The storage 2560 may store one or more of a generation routine 2510, a design routine 2540, a regression routine 2570, design profile data 2530 that includes one or more design profiles 2531, the selected design profile 2135, vocabulary data 2533, rules data 2535 and the results data 2730. Each of the generation routine 2510, the design routine 2540 and the regression routine 2570 may incorporate a sequence of instructions operative on the processor 2550 to implement logic to perform various functions.

In executing the generation routine 2510, the processor 2550 may be caused to operate the input device 2520 and/or the display 2580 to locally provide a GUI to guide an operator through providing parameters to define an experiment design and associated model, and to store indications of that definition as one of the design profiles 2531 within the design profile data 2530. Alternatively, the processor 2550 may be caused by the generation routine 2510 to operate the network interface 2590 to remotely provide such a GUI through the network 2999 and another device, such as the viewing device 2700. Also, in executing the design routine 2540, the processor 2550 may be caused to similarly provide another GUI, either locally or remotely, to guide an operator through providing parameters to perform various comparisons between two or more experiment designs, and thereby guide the operator through the consideration of various aspects of the compared experiment designs in selecting an experiment design to be performed. Further, in executing the regression routine 2570, the processor 2550 may be caused to provide still another GUI, either locally or remotely, to guide an operator through providing parameters to control aspects of the performance of a regression analysis with the selected experiment design. In so doing, the processor 2550 may be caused to operate the network interface 2590 to distribute and coordinate the performance of the regression analysis among the multiple node devices 2300 through the distribution of the selected design profile 2135 thereamong, and may be caused to further operate the network interface 2590 to receive the results data 2730 indicating the results of the regression analysis.

Turning more specifically to FIG. 13B, as an alternative to the multiple node devices 2300 of the embodiment of the distributed processing system 2000 of FIG. 13A, an alternate embodiment of the coordinating device 2500 in the embodiment of the distributed processing system 2000 of FIG. 13B may additionally incorporate one or more of the processors 2350, and/or may incorporate the storage 2360. The storage 2360 may store one or more of the regression routine 2370, the selected design profile 2135 and the data set portion(s) 2131. In this alternate embodiment of the coordinating device 2500, each of the one or more processors 2350 may be a graphics processing unit (GPU) incorporating a relatively large quantity of the processing cores 2355 to take the place of the node device grid 2003 in the embodiment of the distributed processing system 2000 of FIG. 13A.

As will be familiar to those skilled in the art, there is an increasingly commonplace trend toward replacing grids of numerous separate computing devices with a single computing device equipped with a relatively small number of GPUs (e.g., under a dozen) to utilize the considerably higher degree of parallelism supported by their internal architectures, including what may be support for dozens, hundreds, thousands, or still greater quantities of threads of execution. Over time, the characteristics of the operations that need to be performed to more quickly render graphical images of ever high resolutions and color depths have encouraged the development of GPUs that incorporate numerous processing cores that each have relatively limited instruction sets, but which are able to perform those limited instructions in parallel across a relatively large number of threads. It has been found that, where at least a portion of an analysis is amenable to being performed using GPU(s), a considerable increase in speed of performance of such analyses and/or the elimination of the need for a whole grid of separate computing devices may be realized by doing so. Thus, the processor 2550 of the coordinating device may distribute the selected design data 2135 and/or coordinate the provision of the one or more data set portions 2131 to one or more of the storages 2360 for access by the one or more processors 2350 to enable such a widely parallel performance of the regression analysis of a selected experiment design.

Figure 14:
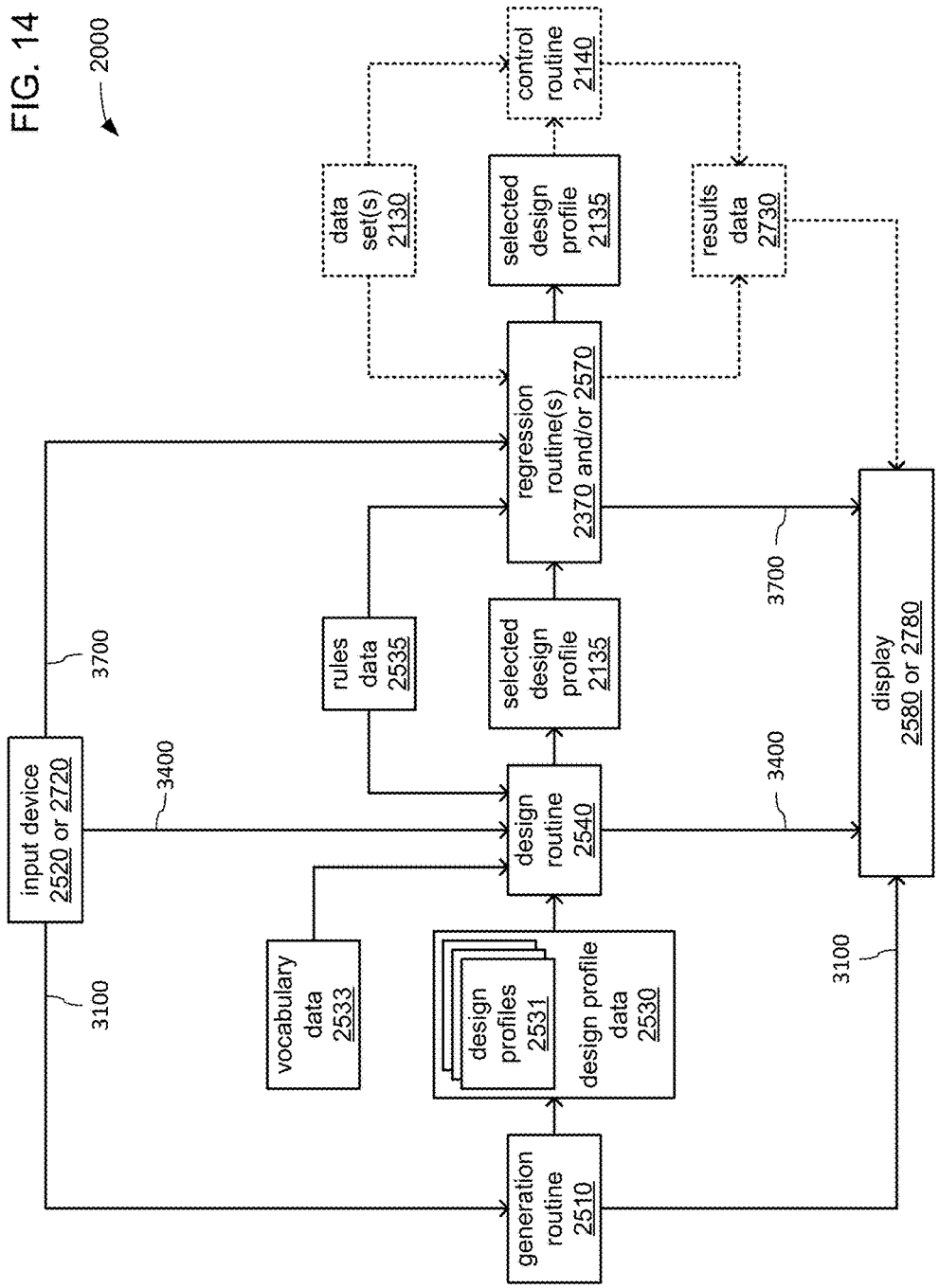
FIG. 14 illustrates an example of guiding generation, selection and performances of regression analyses with experiment designs by the distributed processing system.

FIG. 14 illustrates an example of performing a combination of generating one or more experiment designs, selecting from among multiple compared experiment designs, performing a regression analysis with a selected experiment design, and/or performing the selected experiment design. More specifically, FIG. 14 illustrates aspects of the manner in which the routines 2510, 2540, 2570 and/or 2370 may be executed cooperatively within embodiments of the distributed processing system 2000 of either of FIG. 13A or 13B to provide a series of GUIs 3100, 3400 and 3700 to visually guide the selection of an experiment design for use in testing aspects of a studied system.

As recognizable to those skilled in the art, each of the control routine 2140, the regression routine 2370, the generation routine 2510, the design routine 2540 and the regression routines 2570, including the components of which each may be composed, are selected to be operative on whatever type of processor or processors that are selected to implement applicable ones of the processors 2150, 2350 and/or 2550. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for execution by the processors 2150, 2350 and/or 2550. Where one or more device drivers are included, those device drivers may provide support for any of a variety of other components, whether hardware or software components, of the data devices 2100, the node devices 2300 and/or the coordinating device 2500.

As has been discussed, in executing the generation routine 2510, the processor 2550 of the coordinating device 2500 may be caused, either locally through the input device 2520 and/or the display 2580 of the coordinating device 2500, or remotely through the input device 2720 and/or the display 2780 of the viewing device 2700, to provide a GUI 3100 to guide an operator through providing parameters to define an experiment design and associated model. The processor 2550 may then be caused to store add the definition of that experiment design and associated model as one of the design profiles 2531 of the design profile data 2530 stored within the storage 2560 of the coordinating device 2500.

In executing the design routine 2540, the processor 2550 of the coordinating device 2500 may also be caused, either locally or remotely through the viewing device 2700, to similarly provide another GUI 3400 to guide an operator through selecting one or more of the experiment designs defined in corresponding ones of the design profiles 2531 to be compared. As will be explained in greater detail, following the selection of two or more experiment designs to be so compared, the processor 2550 may be caused to perform an automated matching between factors and/or terms between the experiment designs to be compared based on characteristics of the factors and/or the terms, and/or additionally based on the texts of identifiers assigned to each of the factors and/or terms. In so doing, the processor 2550 may be caused to employ various matching rules retrieved from the rules data 2535 and/or indications of known synonyms retrieved from the vocabulary data 2533.

Also in providing the GUI 3400, the processor 2550 may be caused to guide the operator through providing parameters for the performance of the comparison, thereby guiding the operator through the consideration of various aspects of the compared experiment designs in selecting an experiment design to be subjected to regression analysis and/or performed. In so doing, the processor 2550 may be caused to employ various templates retrieved from the rules data 2535 to generate and visually present various sets of graphs of corresponding aspects of the compared designs. One or more of the sets of graphs may advantageously exploit various features of the HVS to improve the ease and/or speed with which similarities and/or differences among the compared designs are able to be recognized, thereby speeding the selection of one of the compared designs.

In executing the regression routine 2570, the processor 2550 of the coordinating device 2500 may be caused, either locally or remotely through the viewing device 2700, to similarly provide still another GUI 3700 to guide an operator through providing parameters to control aspects of the performance of a regression analysis with the selected experiment design. In so doing, the processor 2550 may be caused to generate a sequence of instructions that are executable by the processors 2550 and/or 2350 perform the regression analysis, and may include such a sequence of instructions in the selected design profile 2135. In so doing, the processor 2550 may be caused to employ various templates retrieved from the rules data 2535 to generate and visually present a human readable portion of the executable instructions for performing the regression analysis.

The processor 2550 may then be caused to operate the network interface 2590 to distribute the selected design profile 2135 and coordinate the performance of the regression analysis among the multiple node devices 2300, and may be caused to further operate the network interface 2590 to receive the results data 2730 indicating the results of the regression analysis. Alternatively, the processor 2550 may be caused to distribute the selected design profile 2135 and coordinate the performance of the regression analysis among multiple processing cores 2355 of one or more processors 2350 incorporated within the coordinating device 2300. The one or more processors 2350, either within the node devices 2300 or within the coordinating device 2500 may then be caused by their execution of the regression routine 2370 to perform the regression analysis using simulated data and/or one or more of the data set portions 2131.

Following performance of the regression analysis, the processor 2550 may be further caused to coordinate the presentation of the results data 2730 to the operator. Alternatively or additionally, the processor 2550 may be further caused to operate the network interface 2590 to transmit the selected design profile 2135 to the one or more data devices 2100 as part of coordinating the performance of the selected experiment design by the one or more data devices 2100 in embodiments in which the one or more data devices 2100 are capable of controlling the studied system. In such embodiments, each of the processors 2150 may be caused by execution of the control routine 2140 to vary one or more factors of the studied system in accordance with the experiment design, as indicated in the selected design profile 2135, such that the one or more processors 2150 of the one or more data devices 2100 may actually perform the test(s) of the experiment design.

Figure 15:
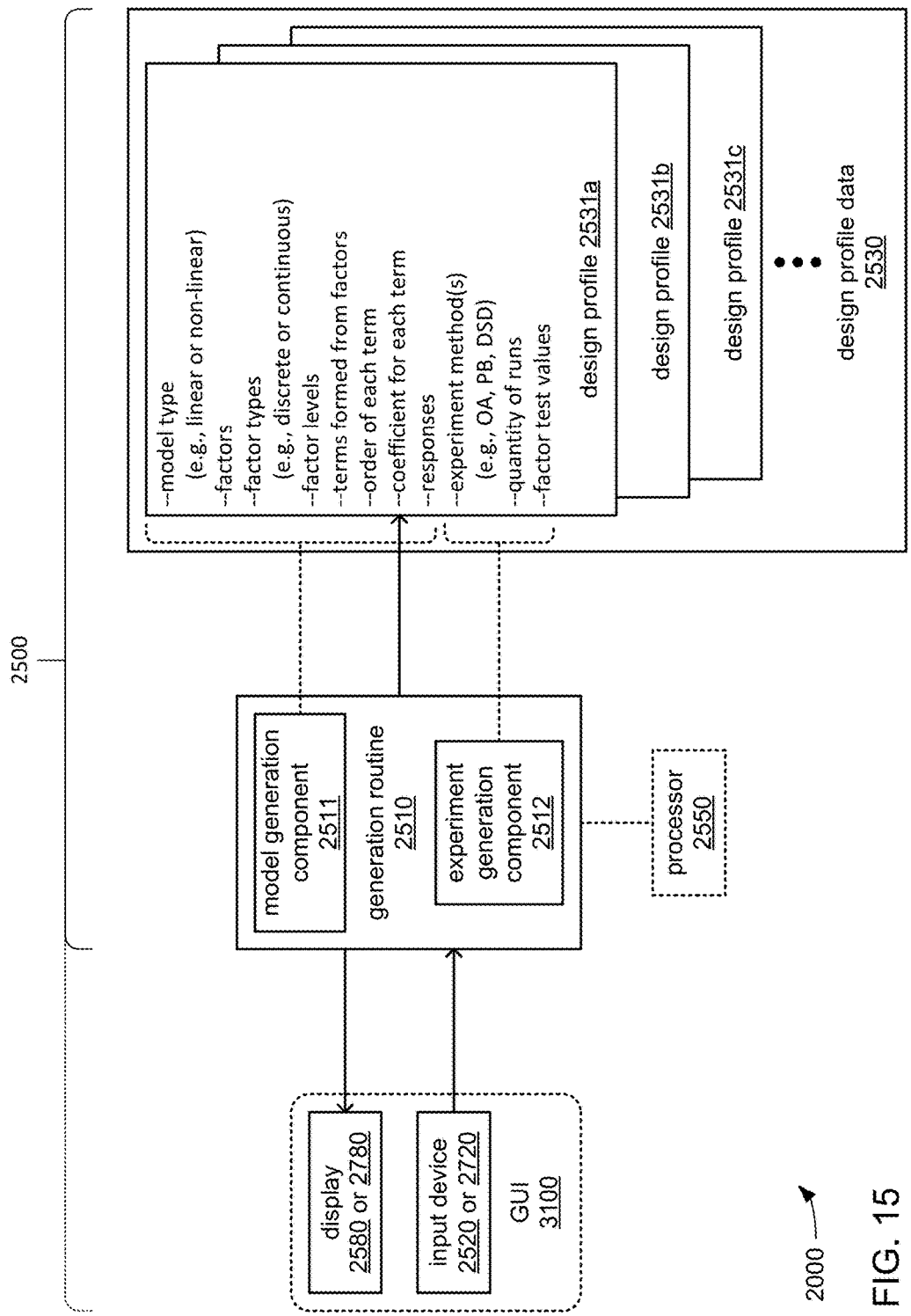
FIG. 15 illustrates an example of guiding the generation of an experiment design for inclusion in a set of experiment designs.

FIG. 15 depicts aspects of an example of the provision of the GUI 3100 to guide the generation of an experiment design and associated model for later comparison. More specifically, FIG. 15 depicts aspects of the execution of the generation routine 2510 by the processor 2550 of the coordinating device 2500 to provide the GUI 3100. As depicted, the generation routine 2510 may include a model generation component 2511 and/or an experiment generation component 2512. As also depicted, the GUI 3100 may be provided either locally via the display 2580 and the input device 2520 of the coordinating device 2500, or remotely through the network 2999 and via the display 2780 and the input device 2720 of the viewing device 2700.

In executing the generation routine 2510, the processor 2550 may be caused by its execution of the model generation component 2511 to visually present one or more portions of the GUI 3100 to guide an operator through the provision of various parameters that define a model of a studied system. By way or example, such portions of the GUI 3100 may include various menus, staged pop-up messages, a page-by-page "wizard" or other visual technique to prompt an operator to provide indications of such details of a new model as, and not limited to, the model type of the model (e.g., linear or non-linear), the factors and/or responses of the model, the factor type of each factor (e.g., continuous or categorical), the terms formed from the factors, the coefficients of the terms, the order of each factor (e.g., first order, second order, third order, etc.), and/or identifiers for the factors, terms and/or responses.

Also in executing the generation routine 2510, the processor 2550 may be caused by its execution of the experiment generation component 2512 to visually present one or more other portions of the GUI 3100 to guide an operator through the provision of various parameters that define an experiment design associated with the model, and for use in testing the studied system. By way or example, such other portions of the GUI 3100 may prompt the operator to provide indications of such details of an new associated experiment design as, and not limited to, the experiment design generation method used (e.g., orthogonal array, Placket-Burman design, definitive screening design, etc.), the quantity of runs to be performed, testing values for the factors, etc.

Following or during the provision of such parameters, the processor 2550 may be caused to store indications of such parameters and/or other information defining the model and associated experiment design as one of the design profiles 2531 (e.g., as the depicted example design profile 2531a) within the design profile data 2530. Despite this description of the provision and use of the GUI 3100 to generate a new combination of experiment design and associated model that becomes part of those included in the design profile data 2530, embodiments are possible in which the design profile data 2530 may be provided with multiple combinations of experiment designs and associated models from which one may be selected and used to perform tests such that the generation of a new experiment design and associated model may not be necessary.

As previously discussed, the parameters so provided may be at least partially based on one or more constraints desired to be imposed on whatever testing that may be performed on the studied system. By way of example, there may be budgetary, material supply and/or time constraints that limit the quantity of runs of any test that may be performed. As will shortly be explained, such generation of a new experiment design and associated model may be undertaken in order to have available an experiment design that embodies such constraints, and thus, can be used as a reference to which other experiment designs may be compared to determine whether exceeding one or more of such constraints may be justified by the benefits that may be realized.

Figure 16:
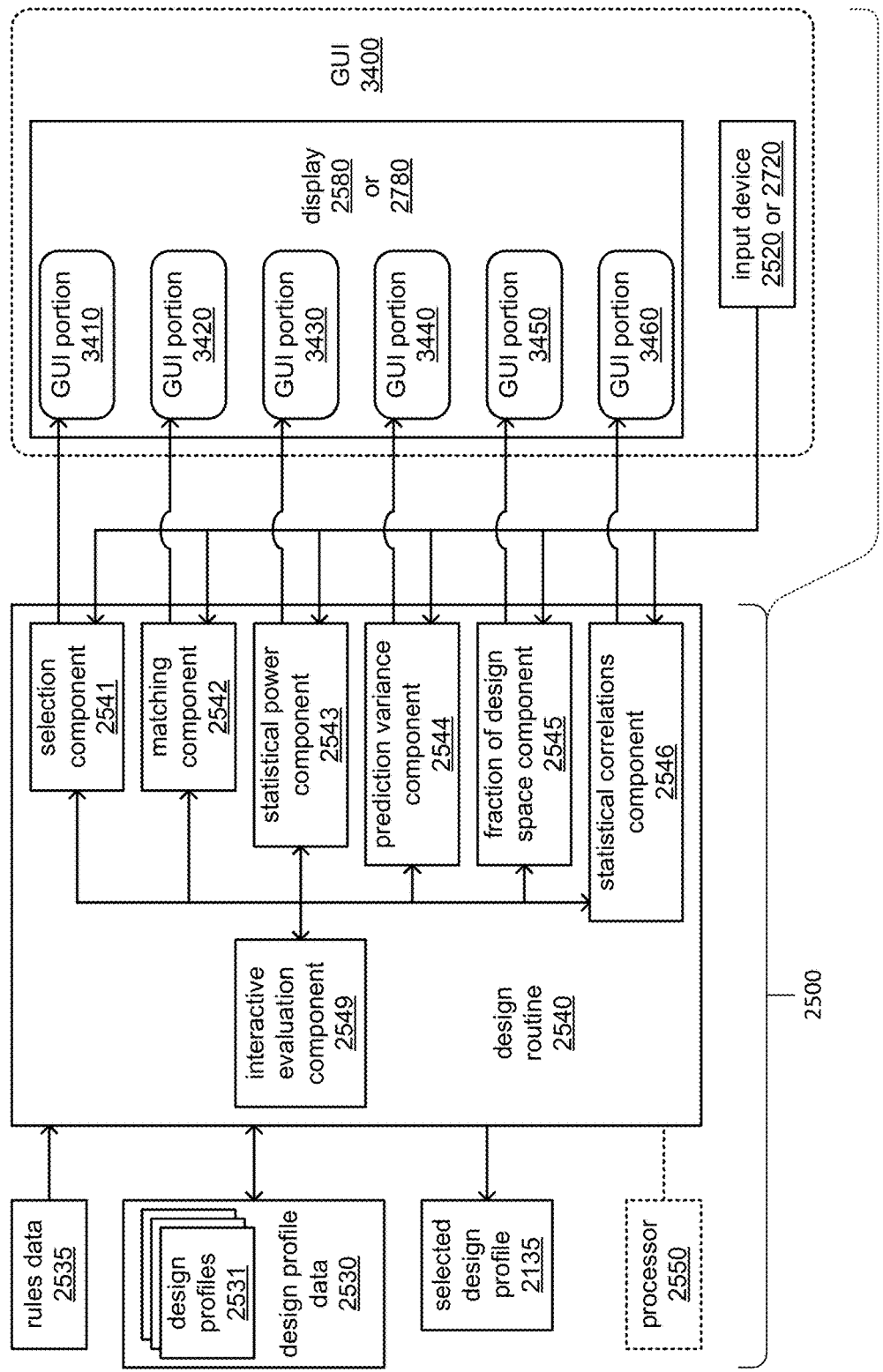
FIG. 16 illustrates an example of guiding the selection of an experiment design from the set of experiment designs of FIG. 15.

FIG. 16 depicts aspects of an example of the provision of the GUI 3400 to guide the comparison of two or more experiment designs. More specifically, FIG. 16 depicts aspects of the execution of the design routine 2540 by the processor 2550 of the coordinating device 2500 to provide the GUI 3400. As depicted, the design routine 2540 may include a selection component 2541, a matching component 2542, a statistical power component 2543, a prediction variance component 2544, a fraction of design space component 2545, a statistical correlation component 2546 and/or an interactive evaluation component 2549. As also depicted, and similar to the earlier discussed provision of the GUI 3100, the GUI 3400 may be provided either locally via the display 2580 and the input device 2520 of the coordinating device 2500, or remotely through the network 2999 and via the display 2780 and the input device 2720 of the viewing device 2700.

In executing the design routine 2540, the processor 2550 may be caused to execute the interactive evaluation component 2549 to recurringly derive numerical values and/or other information as part of providing comparisons between corresponding aspects of each one of multiple experiment designs that are selected for comparison. Also, the processor 2550 may be caused to do so as those experiment designs are selected and/or as various parameters of each of those compared experiment designs are provided. Thus, the processor 2550 may be caused to execute the interactive evaluation component 2549 at least partially in parallel with one or more of the other components 2541-2546.

Figure 17A:
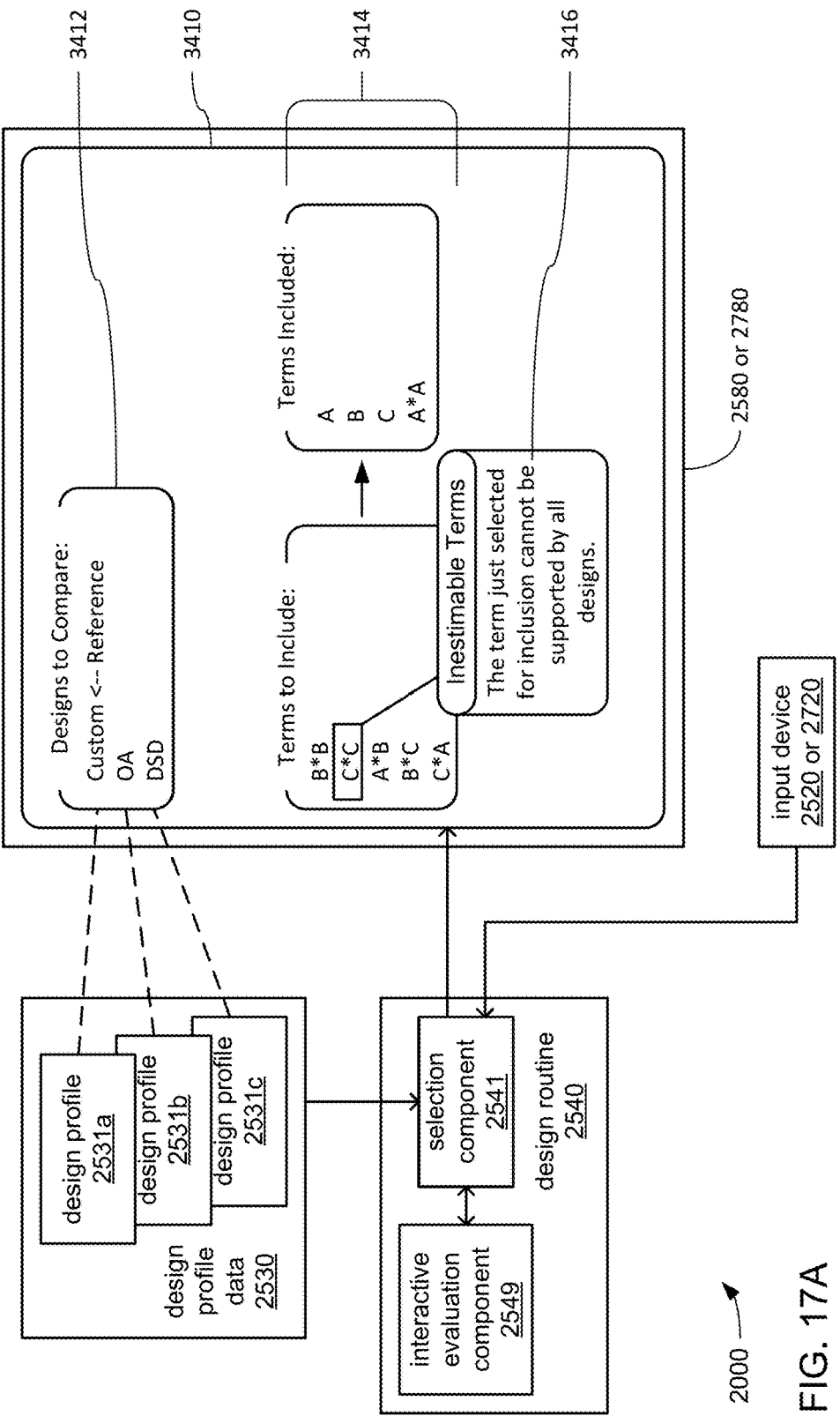

FIG. 17A depicts aspects of the provision of the GUI portion 3410 to guide the selection of the multiple compared designs in greater detail. In executing the selection component 2541, the processor 2550 may be caused to present a selection list 3412 or other similar visual element in the GUI portion 3410 by which an operator may be guided through selecting two or more experiment designs to be compared. As depicted, definitions for each of such experiment designs may be stored as separate design profiles 2531 (e.g., the specifically depicted example design profiles 2531a-c) within the design profile data 2530, thereby enabling definitions of the experiment designs that are selected for comparison to be retrieved by retrieving corresponding ones of the design profiles 2531. In some embodiments, the selection list 3412 may present each of the available experiment designs with a text identifier given to each one, which as depicted, may be descriptive of the experiment design generation method used in each.

As also depicted, the selection list 3412 may include a textual element that indicates which one of the multiple experiment designs that are selected for comparison is designated as a reference. In embodiments in which one of the compared designs is so designated as a reference, one or more of the comparisons of corresponding aspects the compared designs may be organized in a manner in which the comparisons are of the reference to all of the other experiment designs that are selected for comparison.

Also in executing the selection component 2541, the processor 2550 may be caused to present side-by-side selection lists 3414 or other similar visual elements in the GUI portion 3410 by which an operator may be guided through selecting terms of the models associated with the compared experiment designs to be included in the comparisons. As depicted, the side-by-side lists 3414 may include a list of terms not yet selected for inclusion in the comparisons, but available for selection, visually presented adjacent to another list of terms that are already in the set of terms selected for inclusion in the comparisons.

Further in executing the selection component 2541, the processor 2550 may be caused to monitor for the receipt of selections of experiment designs for comparison and/or terms to be included in the comparisons made via an input device (e.g., one of the input devices 2520 or 2570). In some embodiments, a cursor, crosshairs or other visual element (not shown) may be presented to provide a visual indication of the current focal point of a corresponding pointing device (e.g., a mouse, trackpad, joystick, etc.) that may be used by an operator to make such selections in a manner that will be familiar to those skilled in the art. Alternatively or additionally, a text input device (e.g., a keyboard, predictive text keypad, etc.) may be used by an operator to make such selections through entry of text identifiers associated with experiment designs and/or terms. Regardless of the exact mechanism by which an operator provides input indicating selections of experiment designs for comparison, the processor 2550 may be caused to respond to such input by retrieving corresponding ones of the design profile 2531 from the storage 2560. The processor 2550 may also be caused to respond to input indicating selections of terms for inclusion in the comparisons by retrieving parameters corresponding to those selected terms from the retrieved ones of the design profiles 2531 (e.g., parameters defining the one or more factors from which each term is formed, etc.).

In executing the interactive evaluation component 2549 at least partially in parallel with the selection component 2541, the processor 2550 may be caused to respond to each selection of an experiment design to be compared and each selection of a term to be added to the set of terms to be included in the comparison by recurringly performing an analysis of the set of terms with each of the experiment designs selected for comparison. In so doing, the processor 2550 may be caused to recurringly determine whether the set of terms is unsupportable with any of the experiment designs that have been selected for comparison. If so, then the processor 2550 may be caused to present a notice 3416 that the current set of terms selected for inclusion in the comparisons is not able to be supported by one or more of the experiment designs. More specifically, and where such an unsupportable situation is created by the addition of a particular term to the set, the processor 2550 may be caused to present an embodiment of the notice 3416 that indicates that the term most recently selected for inclusion in the set of terms causes the set of terms to be "inestimable" with one or more of the experiment designs selected for comparison. In some embodiments, the processor 2550 may be caused to await the receipt of input from the operator indicating acknowledgement of the notice 3416, and may respond to such input by removing the most recently selected term from the set. In so doing, the processor 2550 may be caused to modify the presentation of the selection lists 3414 to place the just removed term from the list indicating the set of selected terms and into the list of terms that are available for selection, but not yet selected.

FIG. 17B depicts aspects of the provision of the GUI portion 3420 to guide the generation of matches between terms of the models associated with the multiple compared designs in greater detail. In executing the matching component 2542, the processor 2550 may be caused to analyze various characteristics of the factors, terms and/or responses of each model associated with one of the compared experiment designs to identify matches therebetween. Indications of such characteristics may be retrieved by the processor from the design profiles 2531 that are associated with the compared experiment designs. The processor 2550 may also retrieve a set of rules to be followed by the processor 2550 in performing such an analysis and matching from the rules data 2535.

In following such retrieved rules in executing the matching component 2542, the processor 2550 may initially attempt to match factors by the factor type of each factor of each model. By way of example, the processor 2550 may be caused to at least initially identify matches between factors of different models based on whether each factor is of a continuous factor type that may have any value within a continuous range of numerical values, or is of a categorical factor type that may have a value from among a set of discrete values. Following such initial matching of factors by factor type, the processor 2550 may be caused to match factors of the continuous factor type (if there are any) by matching their ranges of values, and/or may be caused to match factors of the categorical type (if there are any) by matching their quantities of levels and/or the values of their levels.

Alternatively or additionally, in following such retrieved rules, the processor 2550 may be caused to identify matches between terms of different models based on their order (e.g., 1st order, 2nd order, 3rd order, etc.). Also alternatively or additionally, the processor 2550 may be caused to identify matches between factors, between terms and/or between responses of different models by matching the texts of their identifiers. By way of example, the processor 2550 may be caused to search and retrieve indications of matches between words based on meaning within the vocabulary data 2533. In some embodiments, the vocabulary data 2533 may include a relatively general thesaurus and/or a field-specific thesaurus (e.g., industry-specific thesaurus, culture-specific thesaurus, technology-specific thesaurus, region-specific thesaurus) that may be deemed to be applicable.

As depicted, upon identifying one or more matches among factors, terms and/or responses, the processor 2550 may be caused by execution of the matching component 2542 to present a listing 3422 or other similar visual element of the identified matches. The processor 2550 may be further caused to monitor for the receipt of input from the operator that indicates that one or more of the matches identified by the processor 2550 is incorrect and/or input from the operator specifying one or more additional matches not successfully made by the processor 2550. In response to such corrective input, the processor 2550 may store indications of matches specified by the operator as learned matches and/or may store indications of incorrect matches made by the processor 2550 within the vocabulary data 2533.

FIG. 17C depicts aspects of the provision of the GUI portion 3430 to guide the generation and consideration of a set of graphs comparing statistical power for terms among the multiple compared designs in greater detail. In executing the statistical power component 2543, the processor 2550 may be caused to analyze the terms that have been selected for inclusion in the comparisons among the compared experiment designs, based on a selected signal-to-noise ratio, and may then generate and present a set of comparative graphs based on the analyses. In so doing, the processor 2550 may also retrieve a set of rules to be followed by the processor 2550 in performing such analyses and/or in generating the comparative graphs from the rules data 2535.

In following such retrieved rules in executing the statistical power component 2543, the processor 2550 may employ a predetermined statistical power calculation and/or an initial value for signal-to-noise ratio by default to derive the statistical power of each term of the set of terms selected for inclusion in the comparisons for each of the compared experiment designs. The processor 2550 may then be caused to generate, for each term of the set of terms, a graph of a set of graphs 3434 of statistical power vs. experiment design. Within each graph of the set of graphs 3434, the statistical power of a term may be plotted as a separate point for each experiment design. In so doing, the processor 2550 may retrieve and employ a template from the rules data 2535 for generating each graph and/or may employ curve-fitting rules for fitting a curve to the plotted points within each graph.

In some embodiments, the rule data 2535 may include a rule that limits the performance of such analyses and the generation of the set of graphs 3434 to situations in which the compared experiment designs differ only in the quantity of runs. Thus, in such situations, the resulting graphs provide a depiction of statistical power vs. quantity of runs for each term. Such an embodiment of the set of graphs 3434 may be so generated and then presented by the processor 2550 as part of guiding the selection of one of the compared experiment designs by providing a graphical comparison of the relative degree of benefit that may be realized for each higher quantity of runs. Where the experiment design selected as the reference is based on constraints of cost, time and/or availability of materials, and is therefore the experiment design with the lowest quantity of runs, such a visual presentation of fitted curves depicting what is often diminishing returns in statistical power with each increase in the quantity of runs may enable the operator to more quickly identify what may be deemed to be an acceptable tradeoff in incurring an increase in cost, time and/or consumption of available materials to perform a particular quantity of runs that may be greater than the quantity associated with the reference.

As depicted, the processor 2550 may be caused to arrange the set of graphs 3434 adjacent to each other in a horizontally extending manner (i.e., side-by-side in a "landscape" orientation). Such an arrangement of the set of graphs may be deemed desirable to advantageously exploit the "landscape" orientation of the binocular vision of the HVS. As will be familiar to those skilled in the art, it is currently believed that the manner in which the HVS functions to both identify what is in the FOV and perceive stereoscopic depth includes the covering of the FOV of each eye in a two-dimensional array of multiple types of feature detector in which each type of feature detector is implemented with a neuron that is sensitive to the presence of a particular feature within a particular portion of the FOV, such as a simple shape (e.g., a line, curve or corner) formed by one or more transitions between adjacent colors and/or transitions between light and dark. It is also believed that there are multiple layers of such coverage of the FOV of each eye in which a form of averaging is employed to reduce the resolution of the images captured by each eye for each successive layer to allow feature detectors in each of the successive layers to detect features across increasingly larger portions of the FOV of each eye. It is further believed that the perception of stereoscopic vision is based on comparisons between what is detected by the feature detectors at each level between the FOVs of the left and right eyes to identify both similarities and differences therebetween.

Efforts to apply such current theories of how the HVS functions to developing binocular image processing systems to identify objects and perceive depths in machines have met with a considerable degree of success, thereby increasing confidence in the correctness of such theories. Thus, the fitted curve within each of the graphs may advantageously provide a small set of simple shapes that form each of the curves that may be readily detected by a relatively small quantity of adjacent feature detectors within the FOV of each eye. Also, the horizontal or "landscape" orientation of the adjacent placement of the graphs in the set of graphs 3434 may advantageously exploit the left-versus-right feature-to-feature comparison at multiple levels within the HVS to enable speedier recognition of similarities in the fitted curves between adjacent ones of the graphs, thereby enabling a speedier identification of an acceptable tradeoff between quantity of runs to perform and the relative degree of increase in statistical power that may be realized, given the likely diminishing returns of each further increase in the quantity of runs.

As also depicted, the processor 2550 may be caused to present a visual indicator 3432 of the signal-to-noise ratio on which the calculations that derived the statistical power values within the set of graphs 3434 are based. In executing the interactive evaluation component 2549 at least partially in parallel with the statistical power component 2543, the processor 2550 may be caused to await receipt of an indication of input received from an operator that is indicative of a change to the displayed signal-to-noise ratio. The processor 2550 may be caused to respond to each such change by recurringly repeating the calculations that derived the statistical power values within the set of graphs 3434, and recurringly regenerating and re-presenting all of the graphs within the set of graphs 3434 to all reflect the same change in the signal-to-noise ratio. In this way, the operator may be interactively provided with answers to "what-if" questions of what would be the various values of statistical power for different signal-to-noise ratios that may be expected and/or known to be applicable to the studied system.

FIG. 17D depicts aspects of the provision of the GUI portion 3440 to guide the generation and consideration of a set of graphs comparing the prediction variance for terms among the multiple compared designs in greater detail. In executing the prediction variance component 2544, the processor 2550 may be caused to analyze the terms that have been selected for inclusion in the comparisons among the compared experiment designs, and may then generate and present a set of comparative graphs based on the analyses. In so doing, the processor 2550 may also retrieve a set of rules to be followed by the processor 2550 in performing such analyses and/or in generating the comparative graphs from the rules data 2535.

In following such retrieved rules in executing the prediction variance component 2544, the processor 2550 may employ a predetermined prediction variance calculation to derive the prediction variance of each term of the set of terms selected for inclusion in the comparisons for each of the compared experiment designs. The processor 2550 may then be caused to generate, for each term of the set of terms and for each of the compared experiment designs, a graph of a set of graphs 3442 of prediction variance. Within each graph of the set of graphs 3442, a vertical line may be included that may be positioned at a default location at a zero value along the horizontal axis within a single design space that is identical across all of the graphs. In some embodiments, such a default location of the vertical line across all of the graphs may be specified as part of a template for generating the graphs that may be retrieved by the processor 2550 from the rules data 2535.

In executing the interactive evaluation component 2549 at least partially in parallel with the prediction variance component 2544, the processor 2550 may be caused to await receipt of an indication of input received from an operator that is indicative of a change to the displayed position of the vertical line along the horizontal axis in one of the graphs of the set of graphs 3442. The processor 2550 may be caused to respond to each such change by recurringly repeating the calculations that derived the prediction variances for each term for each compared design experiment, and recurringly regenerating and re-presenting all of the graphs within the set of graphs 3442 to all reflect the same change in the position of the vertical line along the horizontal axis, and the same type of change in all of the resulting depicted curves for prediction variance across the design space.

Figure 17E:
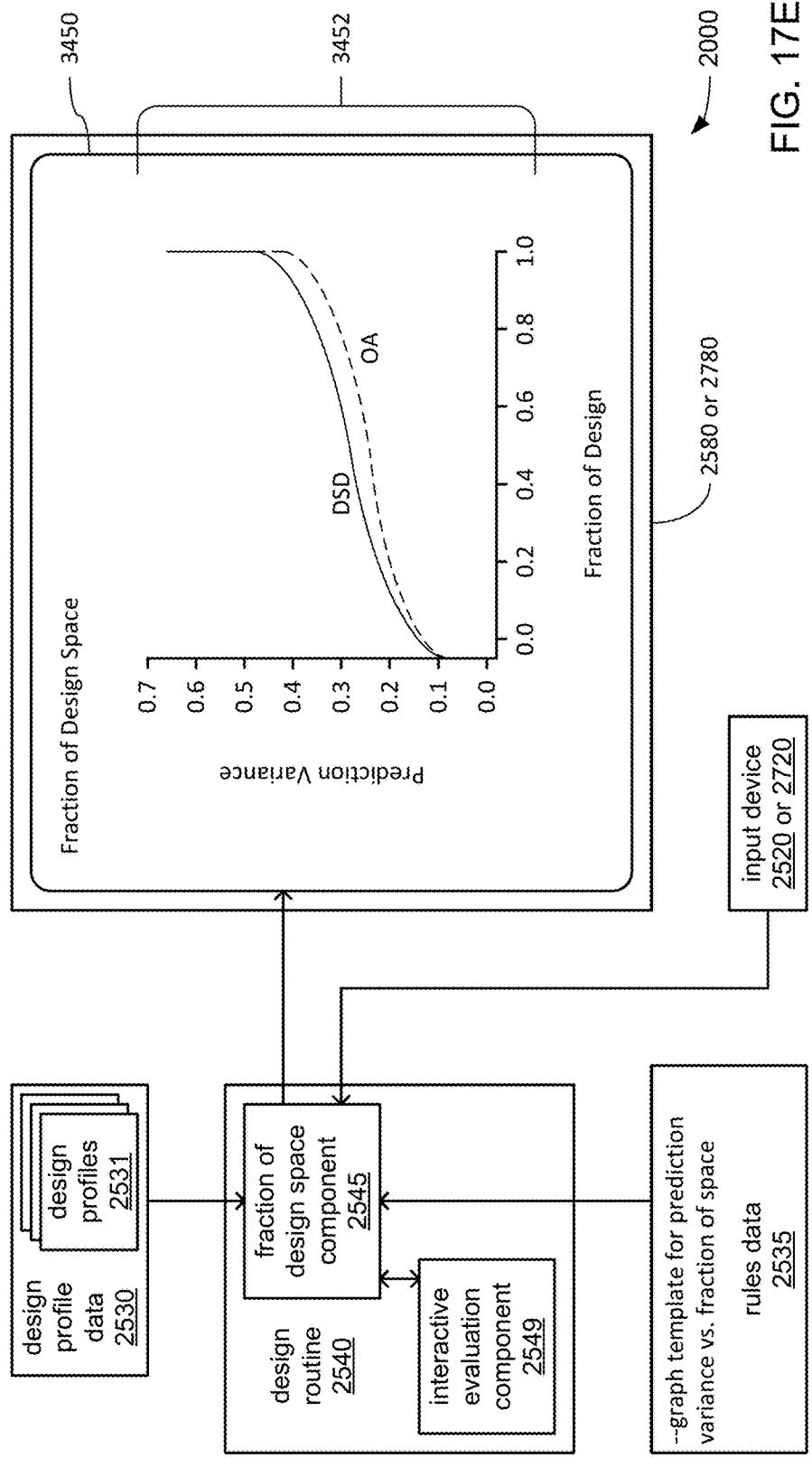

FIG. 17E depicts aspects of the provision of the GUI portion 3450 to guide the generation and consideration of a combined graph comparing the fraction of design space of each of the compared designs in greater detail. In executing the fraction of design space component 2545, the processor 2550 may be caused to analyze each of the compared experiment designs to generate, and then present, a combined graph 3452 of the fraction of design space for all of the compared experiment designs. In so doing, the processor 2550 may also retrieve a set of rules to be followed by the processor 2550 in performing such analyses and/or in generating the combined graph 3452 from the rules data 2535, including a template.

Figure 17F:
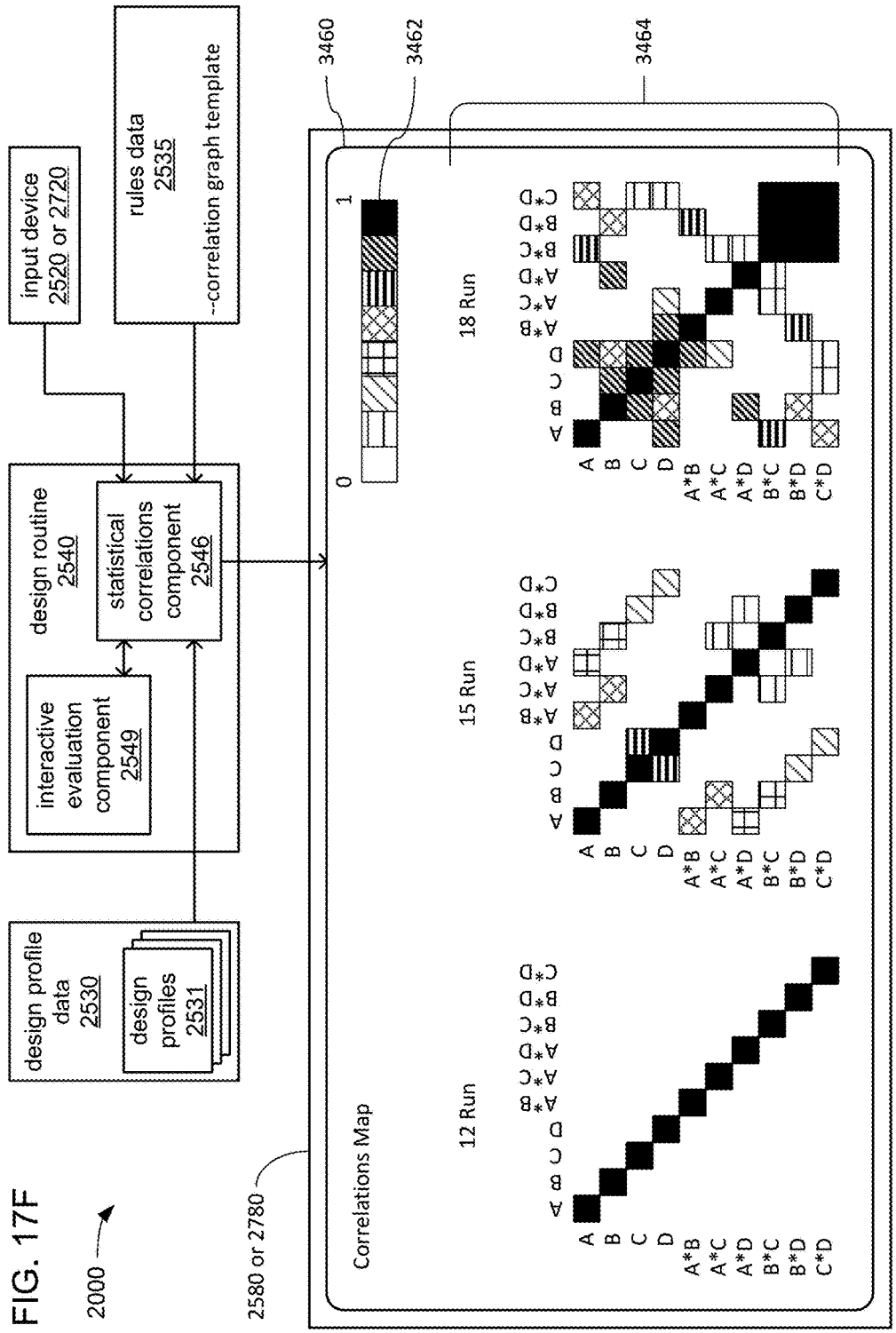

FIG. 17F depicts aspects of the provision of the GUI portion 3460 to guide the generation and consideration of a set of graphs comparing the degree of correlation between terms within each of the compared designs in greater detail.

In executing the statistical correlations component 2546, the processor 2550 may be caused to analyze, within each of the compared designs, the terms that have been selected for inclusion in the comparisons to derive degrees of correlation between each possible pair of terms. The processor 2550 may then, for each of the compared designs, generate a correlation graph with all of the terms arranged in the same order along each of the horizontal and vertical axes, and with visual indications at each intersection visually depicting the derived degree of correlation between the terms of the corresponding pair. The processor may then also be caused to visually present the correlation graph so generated for each of the compared experiments adjacent to each other in a set of correlation graphs 3464. Along with the set of correlation graphs 3464, the processor 2550 may additionally be caused to present a scale of the visual indications of the degree of correlation used in the correlation graphs. In so doing, the processor 2550 may also retrieve a set of rules to be followed by the processor 2550 in performing such analyses and/or in generating the correlation graphs from the rules data 2535, including a correlation graph template.

Again, as depicted, the processor 2550 may be caused to arrange the correlation graphs of the set of correlation graphs 3464 adjacent to each other in a horizontally extending manner (i.e., side-by-side in a "landscape" orientation). As discussed earlier, such a horizontally extending adjacent arrangement of the set of correlation graphs 3464 may again be deemed desirable to advantageously exploit the "landscape" orientation of the binocular vision of the HVS, including the stereoscopic comparisons believed to be routinely performed by the HVS at each level of feature detectors between the FOVs of the left and right eyes to identify both similarities and differences therebetween. Stated differently, such a horizontal side-by-side arrangement of such correlation graphs that use such visual indicators of degrees of correlation allow an operator to quickly identify, almost within a single glance, both degrees of similarity and degrees of difference in the visually indicated degrees of correlation among terms within each of the compared experiment designs.

In some embodiments, the processor 2550 may additionally be caused to present a GUI portion (not shown) that allows for the selection of the scale of visual indicators of degrees of correlation from among multiple different scales of such visual indicators. In some embodiments, different ones of such scales may each include a different form of color coding. Each different form of color coding may include a range of progressively changing proportioned mixtures between two different colors that may, as entirely separate colors, each define one of the minimum and maximum degrees of correlation at the opposite ends of the scale. By way of example, such a scale may include the separate colors red and blue marking the minimum and maximum degrees of correlation, and a progressively changing series of mixtures of different proportions of red and blue forming various different purple colors marking various degrees of correlation between the minimum and maximum degrees of correlation. Alternatively or additionally, different ones of such scales may include different ranges of gray shading of a single color. Also alternatively or additionally, and as specifically depicted, different ones of such scales may include a series of different filling patterns that each provide a different degree of fill of a single color, thereby defining a scale that transitions from no filling to fully filled.

As will be familiar to those skilled in the art, in an experiment design, a high degree of correlation between terms can result in the masking of the influence of a particular factor in controlling one or more responses such that the importance of the particular factor may be overlooked. Alternatively, such a high degree of correlation between terms can cause a misleading inflation of the influence of a particular factor in controlling one or more responses such that valuable time and resources may be wasted in focusing on understanding the particular factor's influence and/or attempting to manipulate the particular factor to control one or more responses. Thus, an experiment design that includes one or more pairs of relatively highly correlated terms may not only provide little or no insight into an important linkage that may exist between factors and responses, but may also provide a misleading impression of there being an important linkage between factors and responses that may not actually exist and/or that may not actually be so important.

The terms may be arranged in the same order along each of the horizontal and vertical axes specifically to cause the diagonal symmetry that can be seen in FIG. 17F in the display of visual indicators of degrees of correlation. One of the results of this diagonal symmetry is the formation of a visually distinct diagonal line of intersections in each graph at which each term is paired with itself, and thus, where it would be expected that there would be complete symmetry. As depicted, each of these intersections along this diagonal line may be marked with an visual indicator that indicates such maximum correlation. Doing so may be deemed desirable to create a simple, easily identified visual reference of the location of each individual correlation graph in relation to the others of the set of correlation graphs 3464 in which the ends of the diagonal line so created denote diagonally opposite corners that quickly define the horizontal and vertical boundaries of each individual correlation graph.

As also depicted, the terms may be arranged along each of the horizontal and vertical axes such that lower order terms are arranged towards one end of the diagonal line and higher order terms are arranged towards the other end of the diagonal line. As will be familiar to those skilled in the art, the fact that many higher order terms are formed by the combining of two or more factors increases the likelihood that higher degrees of correlation will be encountered between higher order terms than between lower order terms. Thus, as depicted, this may produce a region of indications of relatively high degrees of correlation in the corner of one or more of the correlation graphs where the intersections correspond to pairs of higher order terms.

As will be familiar to those skilled in the art, relatively high degrees of correlation between lower order terms that are formed from single factors may be an indication that an experiment design is susceptible to masking and/or misrepresenting the degree of influence that one or more particular factors may have on particular responses, especially if it proves to be the case that a particularly important factor is subject to such high correlation. In contrast, where there is minimal correlation between lower order terms, there is far less risk of not detecting the influence of an important factor or of a factor being given an outsized apparent degree of influence in an experiment design, even if there are higher degrees of correlation between higher order terms.

By arranging the terms along the horizontal and vertical axes based on the order of the terms such that pairs of lower order terms are positioned toward one end of the diagonal line while pairs of higher order terms are positioned toward the other end, the ability is provided to more quickly visually distinguish experiment designs that are more likely to be successful in illuminating linkages between factors and responses from experiment designs that may not be. This also tends to advantageously exploit the aforedescribed multilayer left-right feature comparisons made by the HVS, since regions of clustered visual indications of high degrees of correlations that appear in one corner corresponding to pairs of lower order terms or in the other corner corresponding to pairs of higher order terms become features that are detected by the feature detectors of the HVS. Such features then feed into left-right comparisons at layers where the feature detectors each cover a larger portion of the FOV of each eye such that there is an ability to relatively speedily detect the difference between a correlation graph that shows such a region in one corner (and towards one of the left or right sides) and another correlation graph that shows such a region in the opposite corner (and towards the other of the left or right sides).

As depicted, the entirety of the rectangular area defined by each of the correlation graphs may be entirely filled in with visual indicators of degrees of correlation such that, except for the pairings of each term to itself along the diagonal line, the presentation of visual indicators of degree of correlation for all possible pairs of terms is actually repeated in a manner that is diagonally mirrored on opposite sides of the diagonal line. Alternate embodiments are possible in which such mirrored repetition is avoided by presenting only one set of such visual indicators in a manner that fills a triangular-shaped portion of the rectangular area of each graph on only one side of the diagonal line. However, it may be deemed desirable to provide such mirrored repetition in the presentation of the visual indicators, since doing so provides a greater volume of such indications, and in a manner that still generally advantageously exploits the innate multilayer left-right feature comparisons of the HVS.

In executing the interactive evaluation component 2549 at least partially in parallel with the statistical correlations component 2546, the processor 2550 may be caused to await receipt of an indication of input received from an operator that is indicative of a change to the set of terms selected to be included in the comparisons of the compared experiment designs. The processor 2550 may be caused to respond to each such change by recurringly repeating the analyses that derive correlations between terms and/or recurringly repeating the generation and presentation of the set of correlation graphs 3464 to reflect each changed set of terms.

Figure 18:
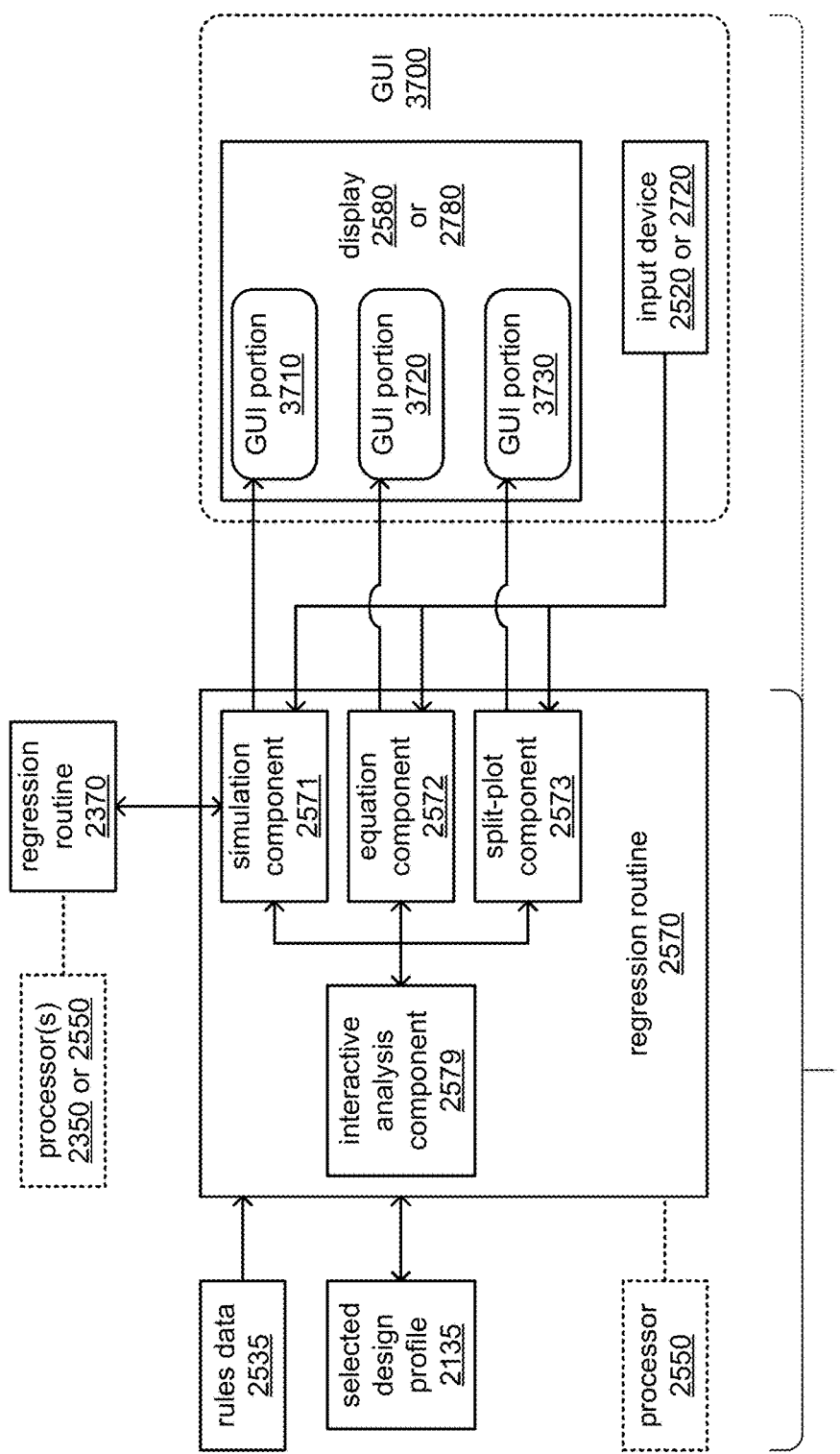
FIG. 18 illustrates an example of guiding the performance of a regression analysis of the experiment design selected via the guidance of FIG. 16.

FIG. 18 depicts aspects of an example of the provision of the GUI 3700 to guide the performance of a regression analysis with a selected experiment design (e.g., an experiment design selected from among those compared through use of the GUI 3400). More specifically, FIG. 18 depicts aspects of the execution of the regression routine 2570 by the processor 2550 of the coordinating device 2500 to provide the GUI 3700. FIG. 18 also depicts aspects of the execution of the regression routine 2370 by at least one processor 2350 of the coordinating device 2500 or of the multiple node devices 2300 to perform the regression analysis, including the generation of simulated data. As depicted, the regression routine 2570 may include a simulation component 2571, an equation component 2572 and/or a split-plot component 2573. As also depicted, and similar to the earlier discussed provision of the GUIs 3100 and 3400, the GUI 3700 may be provided either locally via the display 2580 and the input device 2520 of the coordinating device 2500, or remotely through the network 2999 and via the display 2780 and the input device 2720 of the viewing device 2700.

In executing the regression routine 2570, the processor 2550 may be caused to execute the interactive analysis component 2579 to recurringly derive numerical values and/or generating executable instructions as part of guiding an operator through preparations for and/or performance of the regression analysis with a selected experiment design. Also, the processor 2550 may be caused to do so as various parameters for the performance of the regression analysis are provided. Thus, the processor 2550 may be caused to execute the interactive analysis component 2579 at least partially in parallel with one or more of the other components 2571-2573.

Figure 19A:
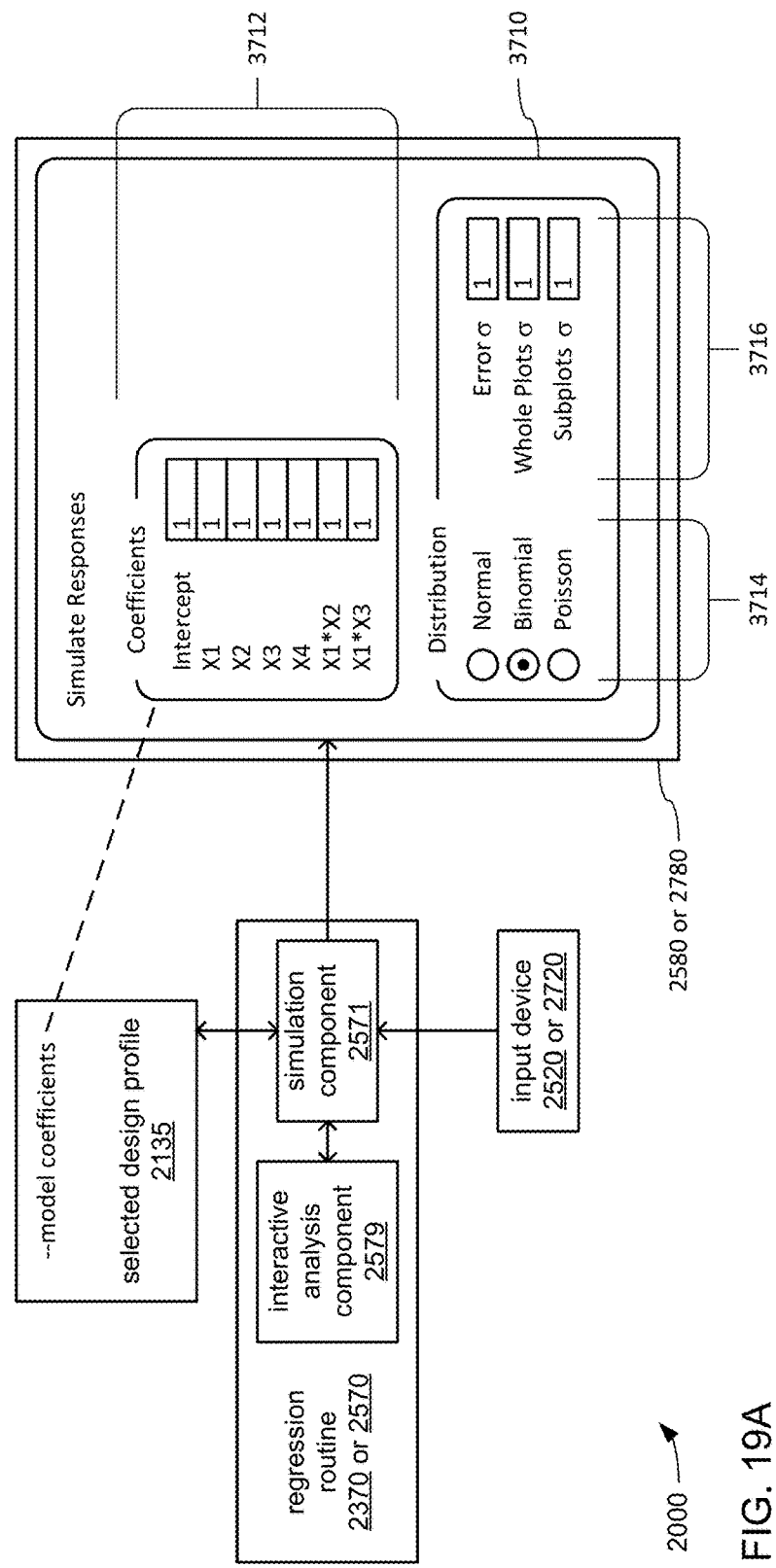

FIG. 19A depicts aspects of the provision of the GUI portion 3710 to guide the provision of various parameters for the performance of the regression analysis with a selected experiment design in greater detail. Where the experiment design on which the regression analysis to be performed is an experiment design that was selected from among the earlier discussed compared experiment designs, the guiding of an operator via the GUI 3400 to select one of the compared experiment designs for regression analysis may have resulted in the processor 2550 being caused to store various parameters that define the selected experiment design as the selected design profile 2135. Alternatively or additionally, the processor 2550 may be caused by execution of the regression routine 2570 to provide an opportunity within the GUI 3700 for the operator to select the experiment design with which regression is to be performed in lieu of or in addition to such an opportunity being provided within the GUI 3400.

In executing the simulation component 2571, the processor 2550 may be caused to present a set of entry boxes 3712 or other similar visual elements in the GUI portion 3710 in which default coefficients of the model associated with the selected experiment design may be visually presented, and/or by which an operator may provide alternate coefficients. In some embodiments, the default coefficients may be retrieved by the processor 2550 from the selected design profile 2135, which may have been copied from one of the design profiles 2531 as a result of one of the compared experiment designs having been selected to be the experiment design with which the regression analysis is to be performed. Thus, the default coefficients may have been introduced during the comparison of the compared experiment designs, where the same coefficients may have been used across all of the compared experiment designs. However, as has been discussed, the default coefficients may have been provided through the use of the GUI 3100 to enter a definition of the experiment design and its associated model, including the coefficients.

Also in executing the simulation component 2571, the processor 2550 may be caused to present prompts for the provision of various parameters for the generation of simulated data. More specifically, the processor 2550 may be caused to present "radio buttons" 3714 or another type of selectable visual element in the GUI portion 3710 by which one of a list of types of distribution for the generation of the simulated data may be selected. Alternatively or additionally, the processor 2550 may be caused to present one or more entry boxes 3716 or other similar visual elements in the GUI portion 3710 in which default parameters for degree of error may be visually presented, and/or by which an operator may provide alternate parameters for degree of error. As depicted, a single entry box may be presented in which a single error parameter may be specified that may be applicable to all factors, or one or more additional entry boxes may also be presented in which one or more separate additional error parameters may be specified for one or more factors that are indicated as difficult to vary in a split-plot or split-split-plot experiment design.

Figure 19B:
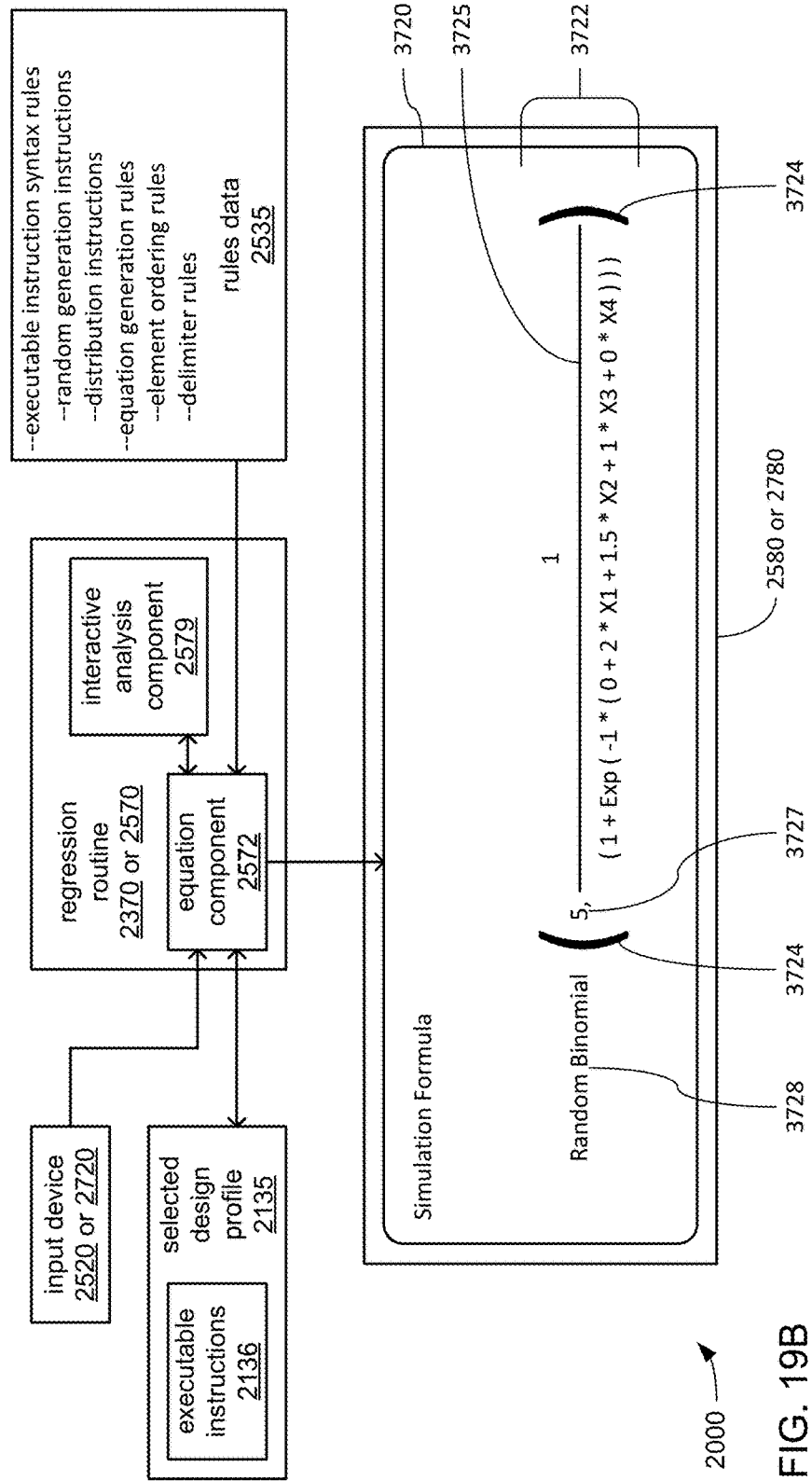

FIG. 19B depicts aspects of the provision of the GUI portion 3720 to guide the generation and consideration of executable instructions that, when executed, control the performance of the regression analysis, including the manner in which simulated data used in the regression analysis is to be generated. In executing the equation component 2572, the processor 2550 may be caused to first generate executable instructions 2136 that may be executed by one or more processors (e.g., the processor 2550 or the one or more processors 2350) to perform the regression analysis with the selected experiment design defined in the selected design profile 2135. In generating the executable instructions 2136, the processor 2550 may be caused to retrieve one or more rules from the rules data 2535 that may include syntax rules to be followed in generating the executable instructions 2136, and such rules may be associated with and/or explicitly specify a pre-selected programming language. Alternatively or additionally, the processor 2550 may be caused to retrieve one or more pre-selected algorithms and/or portions of executable instructions that implement one or more pre-selected algorithms for the random generation of simulated data, including doing so in a manner that results in the simulated data having the type of distribution selected via the previously discussed GUI portion 3710. Also, In generating the executable instructions 2136, the processor 2550 may be caused to incorporate various parameters that may be provided to control the performance of the regression analysis, including and not limited to, the terms of the associated model that have been selected for inclusion in the experiment design, various characteristics of the factors from which the terms are formed, the coefficients for the terms and any intercept value, various characteristics of the responses, the quantity of runs, input values to be given to the factors, and/or a quantity of iterations to be performed of the regression analysis (including iterations of generating simulated data). Following the generation of the executable instructions 2136, the processor 2550 may be caused to store the executable instructions 2136 as part of the selected design profile 2135.

Also in executing the equation component 2572, the processor 2550 may be caused to generate a human readable expression 3722 of a portion of the executable instructions 2136 that includes, and is not limited to including, the terms and/or coefficients of the associated model in mathematical notation, and/or an identifier of the selected type of distribution 3728 for the simulated data and/or of the quantity of iterations 3727 of the regression analysis to be performed. The processor 2550 may then be caused to present the human readable expression 3722. In generating the executable instructions 2136, the processor 2550 may be caused to retrieve one or more rules from the rules data 2535 for generating the human readable expression 3722, such as ordering of various elements, and/or mathematical notation syntax rules concerning delimiters that may be used to separate and organize the various elements. By way of example, in employing mathematical notation syntax rules, the processor 2550 may be caused to separate various elements with pairs of brackets 3724 and/or one or more of a vinculum 3725 (e.g., to separate a numerator from a denominator in expressing a division operation).

In executing the interactive analysis component 2579 at least partially in parallel with the equation component 2742, the processor 2550 may be caused to respond to each provision and/or change in a parameter for performing the regression analysis by recurringly regenerating the executable instructions 2136, and/or by recurringly regenerating and/or re-presenting the human readable expression 3722 of a portion of the executable instructions 2136. The parameters that, upon being provided and/or changed through use of the GUI portion 3710 and/or other GUI portions, may trigger such recurring operations by the processor 2550 may include, and are not limited to, the coefficients, the intercept value, the type of distribution, degree(s) of error and/or the quantity of iterations of the regression to be performed.

Figure 19C:
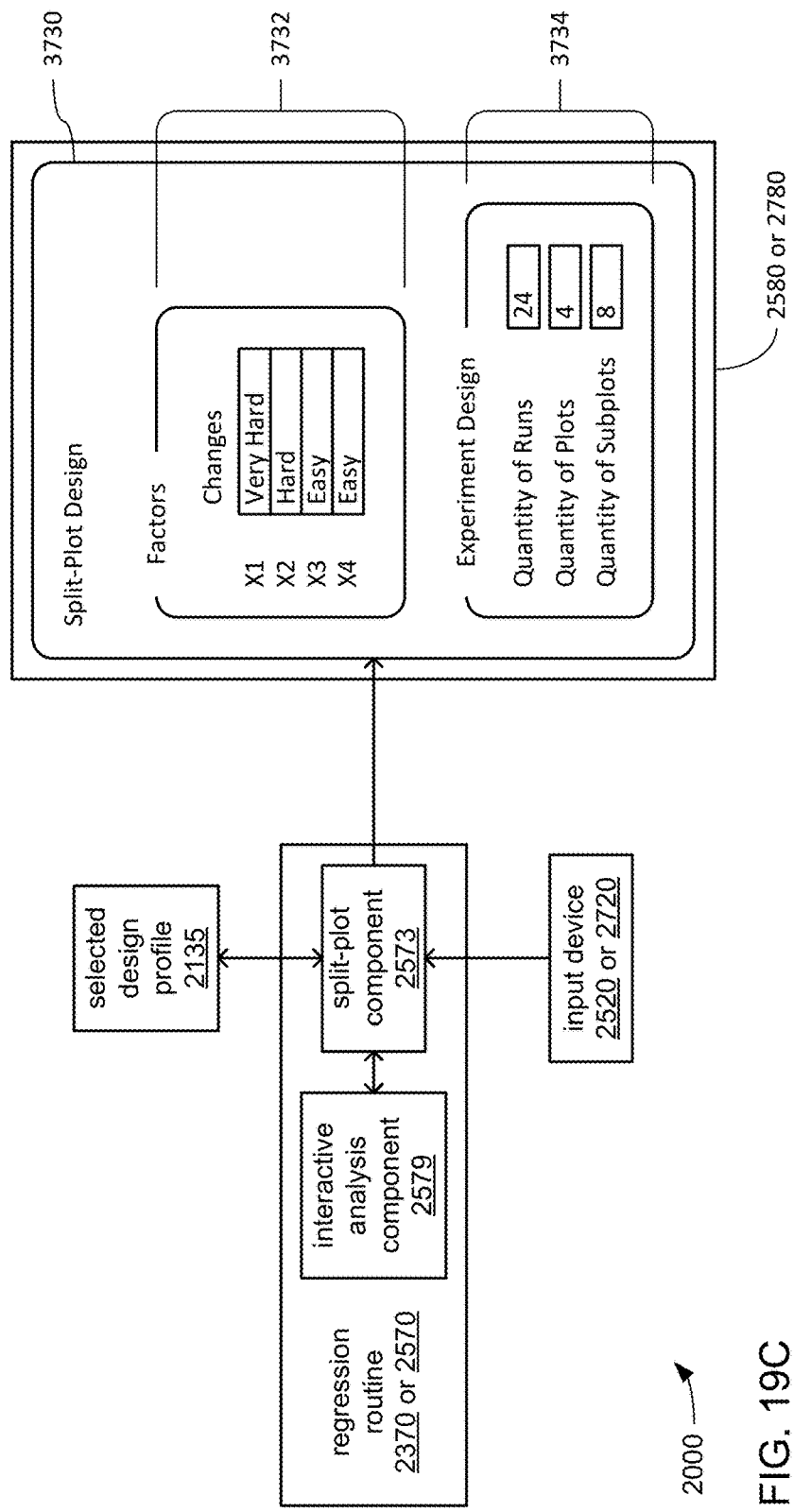

FIGS. 19C and 19D, together, depict aspects of the provision of the GUI portion 3730 to guide the provision of parameters and generation of portions of the executable instructions 2136 associated with the selected experiment design becoming a split-plot or split-split-plot design.

Turning more specifically to FIG. 19C, in executing the split-plot component 2573, the processor 2550 may be caused to present a set of entry boxes 3732 or other similar visual elements in the GUI portion 3730 in which a single default degree of difficulty in varying all factors may be visually presented, but by which an operator may provide one or more alternate indications of degree of difficulty in varying one or more of the factors. Also in executing the split-plot component 2573, the processor 2550 may be caused to present one or more other entry boxes 3734 or other similar visual elements in the GUI portion 3730 in which, at least initially, a default parameter for quantity of runs may be visually presented. However, in response to the entry of one or more degrees of difficulty in varying a factor are entered into one or more of the entry boxes 3732, the processor 2550 may be caused to augment the single entry box 3734 for quantity of runs with one or more additional entry boxes 3734 for quantity of plots and/or subplots, depending on whether the selected experiment design is caused to become a split-plot experiment design or split-split-plot experiment design.

In executing the interactive analysis component 2579 at least partially in parallel with the split-plot component 2743, the processor 2550 may be caused to respond to each provision and/or change in a parameter indicative of a split-plot experiment design or split-split-plot experiment design by recurringly regenerating and re-presenting one or more of the GUI portions 3710, 3720 and 3730 to prompt the operator to provide further parameters. By way of example, the processor 2550 may be caused to regenerate and re-present the GUI portion 3710 with the one or more entry boxes 3716 additionally including an entry box in which a default degree of error for whole plots in at least a split-plot experiment design, and enabling provision of a different degree of error for whole plots by the operator. Also by way of example, the processor 2550 may be caused to augment the GUI portion 3730 to additionally include a table depicting an order in which factors may be varied during the performance of the experiment design to minimize the instances in which one or more particular factors may be varied, such as the table 3736 depicted in FIG. 19D.

Alternatively or additionally, in executing the interactive analysis component 2579 at least partially in parallel with the split-plot component 2743, the processor 2550 may be caused to respond to each provision and/or change in a parameter indicative of a split-plot experiment design or split-split-plot experiment design by recurringly regenerating the executable instructions 2136 to accommodate separate degrees of error for each factor indicated as more difficult to vary and/or to accommodate associated changes in the manner in which simulated data is to be generated. Correspondingly, the processor 2550 may be caused to recurringly regenerate and/or re-present the human readable expression 3722 of a portion of the executable instructions 2136.

Figure 19E:
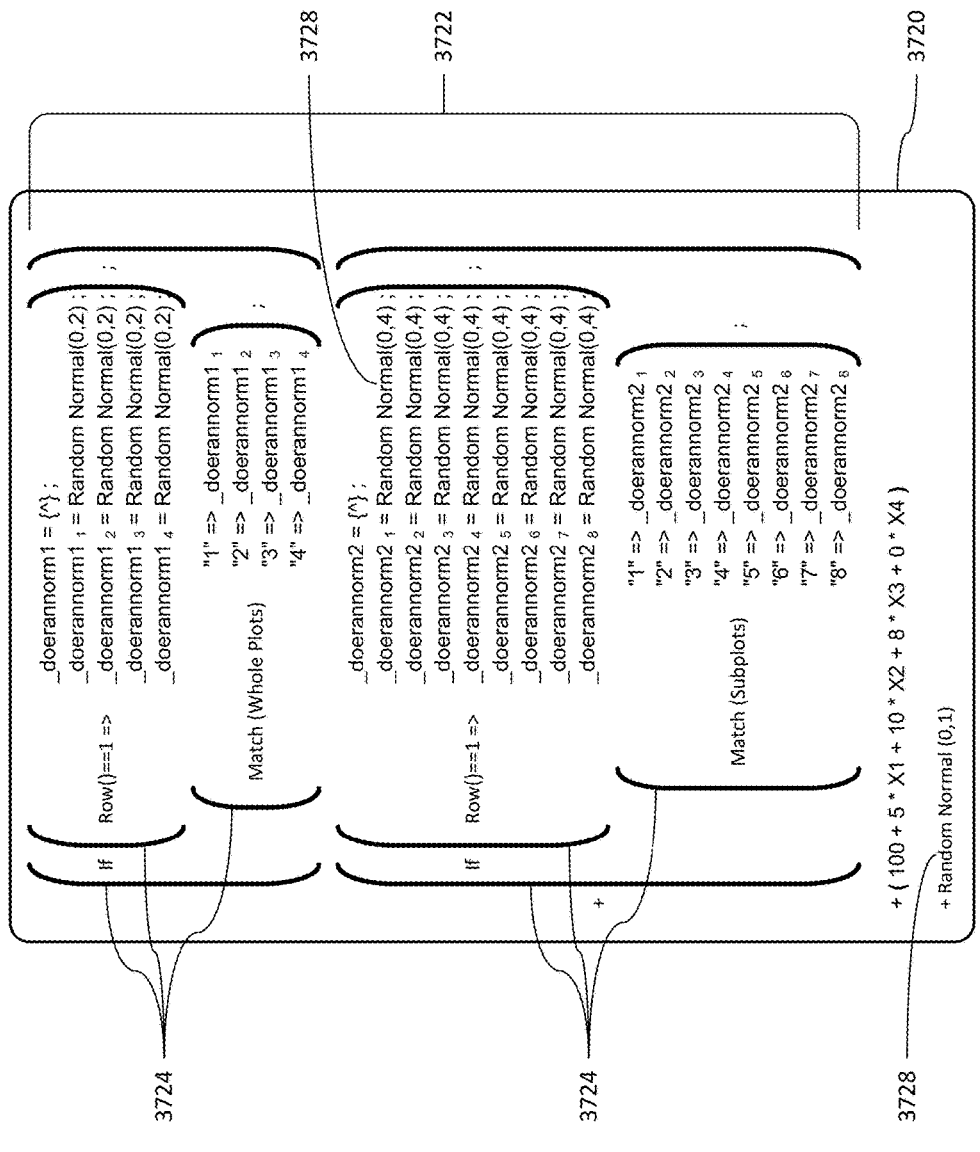

FIG. 19E depicts an example of an alternate human readable expression 3722 that reflects a change of the selected experiment design to a split-split-plot design. As depicted, multiple pairs of brackets 3724 are used to provide clear visual separation of a portion of the executable instructions that minimizes the varying of one factor in whole plots, from another portion that minimizes the varying of another factor in subplots, and from still other portions that implement fully random varying of the remaining factors. Also again, there are explicit identifiers of the type of distribution 3728 selected for the simulated data.

Following completion of the provision of parameters for the performance of the regression analysis with the selected experiment design, and following the generation of the executable instructions 2136 therefrom, the processor 2550 may be caused by further execution of the regression routine 2570 to distribute the executable instructions 2136 to the one or more processors 2350 to cause performance of the regression analysis. Again, in some embodiments, the executable instructions 2136 may be incorporated into or be other accompanied by the selected design profile 2135 such that the selected design profile 2135 may be distributed to the one or more processors 2350. In some embodiments, and in addition to the distribution of the executable instructions 2136, the processor 2550 may be further caused to at least coordinate the distribution of one or more of the data set portions 2131 thereamong. Also again, in various embodiments, the one or more processors 2350 may be incorporated into the multiple node devices 2300 or within the coordinating device. Thus, in differing embodiments, the executable instructions 2136 and/or the one or more data set portions 2131 may be distributed among multiple node devices 2300, or among storage locations within storage 2360 for access by the one or more processors 2350 within the coordinating device 2500.

Regardless of the physical location(s) of the one or more processors 2350, in executing the regression routine 2370, each of the one or more processors 2350, and/or each of the processing cores 2355 of each of the one or more processors 2350, may be caused to execute the executable instructions 2136 distributed thereto, and in so doing, perform at least one iteration of the regression analysis with the selected experiment design. The processor 2550 may be caused by its execution of the regression routine 2570 to coordinate the multiple, and at least partially parallel, performances of the regression analysis. As part of each iteration of each such performance, and as per the executable instructions 2136, simulated data is randomly generated in a manner that meets the specified distribution.

From the iterations of the regression analysis, the results data 2730 may be generated to provide an indication of the results of the regression analysis. As previously discussed, the results data 2730 may be presented by the processor 2550 (e.g., through use of the display 2580 or 2780), or may be transmitted to the viewing device 2700 for presentation to the operator via the processor 2750 thereof. Following the performance of the regression analysis, and in embodiments in which the one or more data devices 2100 control the studied system, the selected design profile 2135 may be transmitted to the one or more data devices 2100 to enable for use thereby in performing the selected experiment design.

Returning to FIGS. 13A and 13B, in various embodiments, each of the processors 2150, 2350, 2550 and 2750 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 2550 of the coordinating device 2500 or the controller 2507 may be selected to efficiently perform an analysis of the multiple experiment designs and/or associated models. Alternatively or additionally, the processor 2350 of each of the node devices 2300 may be selected to efficiently perform a regression analysis while generating simulated data at least partially in parallel. By way of example, the processor 2350 may incorporate a single-instruction multiple-data (SIMD) architecture, may incorporate multiple processing pipelines, and/or may incorporate the ability to support multiple simultaneous threads of execution per processing pipeline.

In various embodiments, each of the routines 2140, 2370, 2510, 2540, 2570 and 2740, including the components of which each is composed, may be selected to be operative on whatever type of processor or processors that are selected to implement applicable ones of the processors 2150, 2350, 2550 and/or 2750 within corresponding ones of the devices 2100, 2300, 2500 and/or 2700. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2150, 2350, 2550 and/or 2750. Where one or more device drivers are included, those device drivers may provide support for any of a variety of other components, whether hardware or software components, of the devices 2100, 2300, 2500 and/or 2700.

In various embodiments, each of the storages 2160, 2360, 2560 and 2760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2360 of one or more of the node devices 2300 that stores one or more of the data set portions 2131 may be implemented with a redundant array of independent discs (RAID) of a RAID level selected to provide fault tolerance to prevent loss of one or more of these datasets and/or to provide increased speed in accessing one or more of these datasets.

In various embodiments, each of the input devices 2520 and 2720 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, each of the displays 2580 and 2780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 2580 of the coordinating device 2500 and/or the display 2780 of the viewing device 2700 may be a touch-screen display such that the input device 2520 may be incorporated into the display 2580 and/or the input device 2720 may be incorporated into the display 2780. In such embodiments, the input device 2520 and/or the input device 2720 may be a touch-sensitive component of the display 2580 and/or the display 2780, respectively.

In various embodiments, the network interfaces 2190, 2390, 2590 and 2790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); the BLUETOOTH® standard; the ZIGBEE® standard; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, the network interface 2390 of one or more of the node devices 2300 that stores one or more of the data set portions 2131 may be implemented with multiple copper-based or fiber-optic based network interface ports to provide redundant and/or parallel pathways in exchanging one or more of the data set portions 2131 with the one or more storage devices 2100.

Figure 20B:
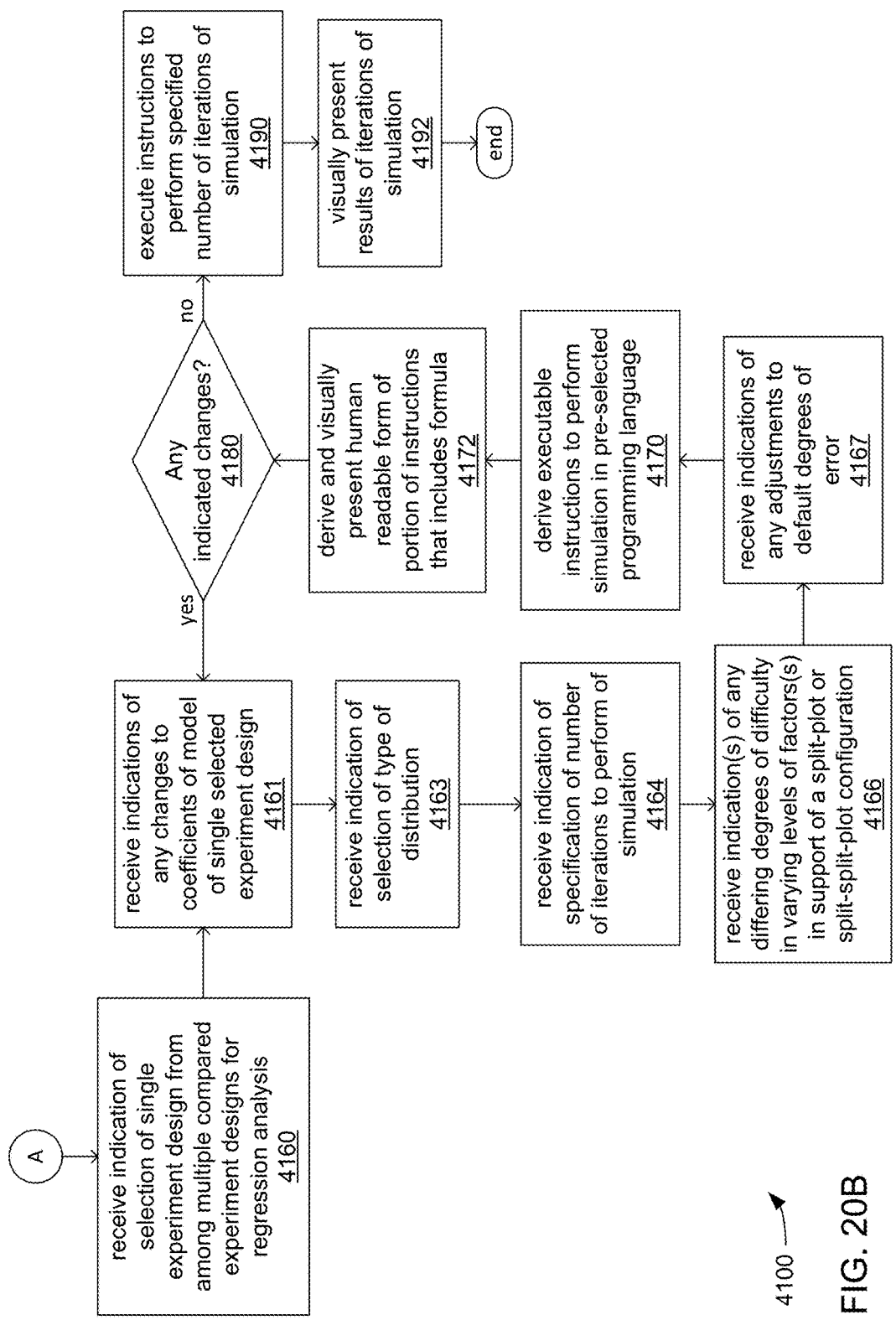

FIGS. 20A and 20B, together, illustrate an example embodiment of a logic flow 4100. The logic flow 4100 may be representative of some or all of the operations executed by one or more embodiments described herein. More specifically, the logic flow 4100 may illustrate operations performed by the processor 2550 and/or the one or more processors 2350, and/or performed by other component(s) of each of the coordinating device 2500 and/or the multiple node devices 2300, respectively, in executing corresponding ones of the design routine 2540, the regression routine 2570 and/or the regression routine 2370 to guide selection of, and the performance of a regression analysis with, an experiment design.

At 4110, a processor of a coordinating device of a distributed processing system (e.g., the processor 2550 of the coordinating device 2500 of the distributed processing system 2000) may receive indications of selections of two or more experiment designs to be compared. As previously discussed, the processor 2550 may present the GUI portion 3410 (see FIG. 17A) to guide an operator of the coordinating device 2500 (either directly or remotely through another device, such as the viewing device 2700) to provide input indicating such selections.

At 4112, the processor of the coordinating device may employ various characteristics of the factors, terms and/or responses of each of the models associated with one of the compared experiment designs to identify and present matches thereamong. At 4114, the processor may receive indications from the operator of corrections to one or more of such automatically identified matches. If any such indications are received, the processor may effect such corrections by changing one or more matches so indicated as being in error. As previously discussed, in addition to effecting such corrections, the processor may also be caused to store indications of such corrections by storing indications of learned matches for future use.

At 4120, the processor of the coordinating device may receive indications of selections of terms that are to be included in the set of terms to be used in the comparisons among the compared experiment designs. At 4122, the processor may be caused to present an indication that the set of terms is not able to be supported by one or more of the compared experiment designs such that one or more of the terms within the set needs to be removed so that the set is able to be supported. At 4124, where such an indication was presented by the processor, the processor may receive indications of an alternate selection of one or more terms for inclusion in the set of terms for comparison. As previously discussed, the processor 2550 may present the GUI portion 3410 to guide the operator to provide input indicating such selections, including generating and visually presenting the notice 3416 (see FIG. 17A) to the effect that the set of terms current selected is not supportable.

At 4130, the processor of the coordinating device may receive indications of an adjustment to the signal-to-noise ratio(s) to which one or more of the terms may be subject. At 4132, the processor may derive the statistical power of each term and for each of the compared experiment designs. The processor may then generate a graph, for each term, that plots the statistical power of that term across all of the compared experiment designs. The processor may further visually present all of the graphs (one per term) adjacent to each other in a manner that may form a horizontally extending row of the graphs (i.e., side-by-side) to exploit the innate left-right feature comparison capabilities of the HVS. As previously discussed, for each such graph of the set of graphs 3434 of statistical power vs. experiment design in GUI portion 3400 (see FIG. 17C), the processor 2550 may be further caused to fit a curve to the plotted points of statistical power vs. experiment design.

At 4140, the processor of the coordinating device may derive the prediction variance of each term and for each of the compared experiment designs. The processor may then generate a graph, for each term and for each experiment design, that plots the prediction variance, and present those graphs in adjacent to each other in multiple horizontal rows where each row corresponds to one of the compared experiment designs. At 4142, the processor may receive indications from the operator of a change to the default horizontal positioning within the design space of a vertical line. At 4144, if such an indication is received, the processor may effect such corrections by regenerating all of the graphs to reflect the new horizontal positioning.

At 4150, the processor of the coordinating device may derive and present a combined graph that overlays the fraction of design space for all of the compared experiment designs. At 4152, the processor may derive the degree of correlation between each possible pair of terms that may be formed from the set of terms selected for use in the comparisons of the compared experiment designs. The processor may then generate and visually present a correlation graph, one each per compared experiment design, where all of the terms are arranged in identical order along each of the horizontal and vertical axes, and in which visual indicators are positioned at each intersection within the graph that corresponds to one of the possible pairs of terms. The processor may further present the correlation graphs adjacent to each other and arranged horizontally in a single row (e.g., side-by-side) to exploit the left-right feature comparison capabilities of the HVS. As previously discussed, the visual indicators used may be selected from a scale of visual indicators that may form a scale of progressive transition from one color to another, a progressive transition between light and dark on a grayscale, etc., that may be presented as part of the GUI portion 3460 (see FIG. 17F).

At 4160, the processor of the coordinating device may receive an indication of a selection of an experiment design that may be from among the multiple compared experiment designs, for regression analysis. At 4161, the processor may receive an indication of a change to default coefficient(s) for one or more of the terms of the model associated with the selected experiment design. At 4163, the processor may receive an indication of a selection of a type of distribution for the random generation of simulated data. At 4164, the processor may receive an indication of a quantity of iterations of the regression analysis to be performed. As previously discussed, the processor 2550 may be caused to present GUI portion 3710 to guide an operator through providing such parameters (see FIG. 19A).

At 4166, the processor of the coordinating device may receive an indication of there being a higher degree of difficulty in varying one or more particular factors than for the other factors. At 4167, the processor may receive an indication of the one or more particular factors having a higher degree of difficulty in being varied also being subject to a different degree of error. As previously discussed, the processor 2550 may be caused to present GUI portion 3730 to guide an operator through providing such parameters (see FIG. 19C). As also previously discussed, following receipt of an indication of there being a different degree of difficulty in varying one or more particular factors, the processor 2550 may be caused to present additional prompts to additionally guide an operator through providing separate additional parameters for whole plots and/or subplots, such as the additional entry boxes 3716 by which separate degrees of error may be provided for whole plots and/or subplots.

At 4170, based on the parameters provided by the operator and/or from any unchanged default parameters, the processor of the coordinating device may be caused to generate a sequence of executable instructions (e.g., the executable instructions 2136) in a pre-selected programming language for performing the regression analysis. At 4172, the processor may also be caused to generate and visually present a human readable form of a portion of the executable instructions that employs the mathematical syntax of a formula to expresses the performance of the regression analysis (e.g., the human readable expression 3722, examples of which are depicted in FIGS. 19B and 19E). As previously discussed, such a human readable expression may include the values of the coefficients and/or any intercept, may specify the selected type of distribution to be achieved in the random generation of simulated data, and/or may specify the quantity of iterations of the regression analysis to be performed.

At 4180, the processor of the coordinating device may check whether any indication has been received of operation of an input device to make changes to one or more of the earlier provided parameters. If so, then the processor may return to receiving and/or acting on the provision of revised versions of various parameters at 4161 through 4167.

However, if at 4180, there are no such indications of changes to parameters, then at 4190, the processor of the coordinating device may proceed with either directly executing the executable instructions to perform the specified quantity of iterations of the regression analysis, or may coordinate the distribution and performance of the iterations of the regression analysis by multiple other processors and/or processor cores (e.g., the one or more processors 2350 and/or processor cores 2355). As previously discussed, such other processors and/or processor cores may be incorporated into multiple node devices with which the coordinating device may communicate via a network (e.g., the multiple node devices 2300 via the network 2999). Alternatively, and as also previously discussed, such other processor(s) and/or processor cores may be incorporated into the coordinating device (e.g., as one or more GPUs).

Upon completion of the specified quantity of iterations of the regression analysis, the processor of the coordinating device may visually present the results thereof at 4192.

FIG. 21 illustrates an example embodiment of a logic flow 4200. The logic flow 4200 may be representative of some or all of the operations executed by one or more embodiments described herein. More specifically, the logic flow 4200 may illustrate operations performed by the processor 2550, and/or performed by other component(s) of the coordinating device 2500 in executing the design routine 2540 to guide selection of an experiment design.

At 4210, a processor of a coordinating device of a distributed processing system (e.g., the processor 2550 of the coordinating device 2500 of the distributed processing system 2000) may receive indications of selections of two or more experiment designs to be compared. Again, as previously discussed, the processor 2550 may present the GUI portion 3410 (see FIG. 17A) to guide an operator of the coordinating device 2500 to provide input indicating such selections.

At 4220, the processor of the coordinating device may employ various characteristics of the factors of each of the models associated with one of the compared experiment designs to identify matches thereamong. Among the characteristics that the processor may be caused to use, at least initially, may include, and are not limited to, type of factor (e.g., continuous or categorical), quantities of levels and/or values of the levels for each categorical factor (if any), ranges of values (e.g., the minimum and maximum values of the range of values) for each continuous factor (if any). Where there remain factors yet to be matched, or where there is otherwise remaining uncertainty in the identification of matches between factors, the processor may also employ the texts and/or the meanings of the texts of the identifiers given to each factor. As has been discussed, the processor may employ vocabulary data that may include a thesaurus (e.g., the vocabulary data 2533) in such text-based identification of matches.

At 4222, the processor of the coordinating device may employ various characteristics of the terms of the models associated with one of the compared experiment designs to identify matches thereamong, including and not limited to, the order of each term (e.g., first order, second order, third order, etc.). Where there remain terms yet to be matched, or where there is otherwise remaining uncertainty in the identification of matches between terms, the processor may also employ the texts and/or the meanings of the texts of the identifiers given to each term.

At 4224, the processor of the coordinating device may employ at least the texts and/or the meanings of the texts of the identifiers given to each response to identify matches thereamong.

At 4230, the processor of the coordinating device may present the matches identified by the processor among factors, terms and/or responses. As previously discussed, the processor 2550 may present such matches through the presentation of the GUI portion 3420 (see FIG. 17B) as part of guiding an operator of the coordinating device 2500 (either directly or remotely through another device, such as the viewing device 2700) to provide input indicating such selections. At 4232, the processor of the coordinating device may monitor one or more input devices for indications of entry of input conveying one or more corrections to the matches identified by the processor at 4220-4224.

At 4234, if such input is received, then the processor of the coordinating device may store an indication of the correction along with and/or as part of the thesaurus. The processor may then repeat some or all of the work of identifying matches at 4220-4224.

Figure 22:
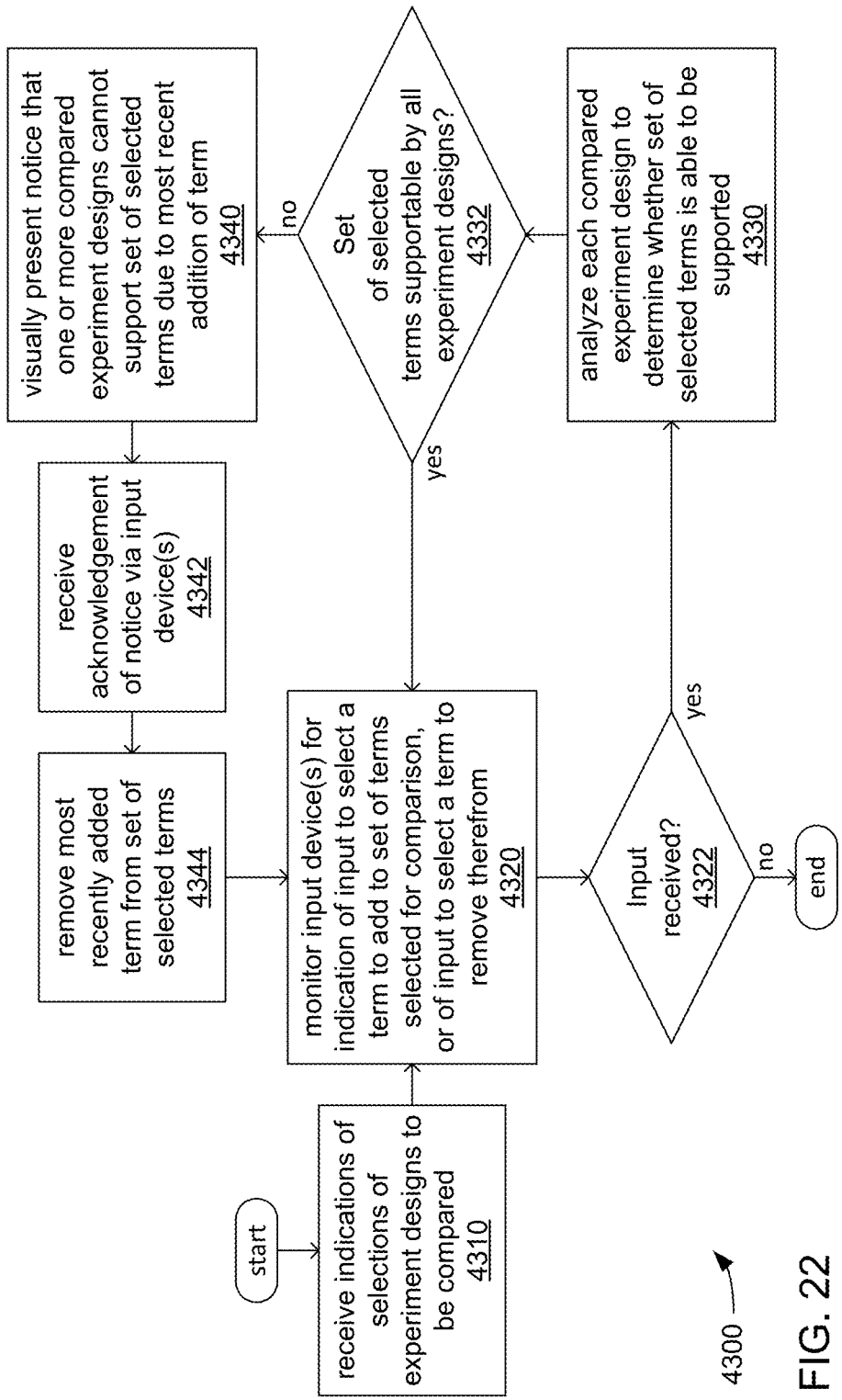
FIG. 22 illustrates an example embodiment of a logic flow of guiding selection of terms in the guidance of selection of an experiment design of FIGS. 20A-B.

FIG. 22 illustrates an example embodiment of a logic flow 4300. The logic flow 4300 may be representative of some or all of the operations executed by one or more embodiments described herein. More specifically, the logic flow 4300 may illustrate operations performed by the processor 2550, and/or performed by other component(s) of the coordinating device 2500 in executing the design routine 2540 to guide selection of an experiment design.

At 4310, a processor of a coordinating device of a distributed processing system (e.g., the processor 2550 of the coordinating device 2500 of the distributed processing system 2000) may receive indications of selections of two or more experiment designs to be compared. Again, as previously discussed, the processor 2550 may present the GUI portion 3410 (see FIG. 17A) to guide an operator of the coordinating device 2500 to provide input indicating such selections.

At 4320, the processor of the coordinating device may monitor one or more input devices for indications of entry of input indicative of a selection of a term to add to the set of terms to be included in the comparison.

At 4322, if such input is received, then at 4330, the processor of the coordinating device may analyze each of the compared experiment designs to determine whether one or more of them are unable to support the set of terms selected for inclusion in the comparison following the addition of the just selected term to the set. If, at 4332, the resulting set of terms is supportable by all of the compared experiment designs, then the processor may return to monitoring one or more input devices at 4320.

However, if at 4332, the set of terms selected for inclusion in the comparison is not supportable by all of the compared experiment designs, then at 4340, the processor may be caused to present a notice that the set of terms is not able to be supported by one or more of the compared experiment designs. At 4342, the processor may receive an indication of reception of input indicating an acknowledgement of the notice. In response, the processor may remove the term most recently selected for addition to the set at 4344, and return to monitoring one or more input devices at 4320.

Figure 23:
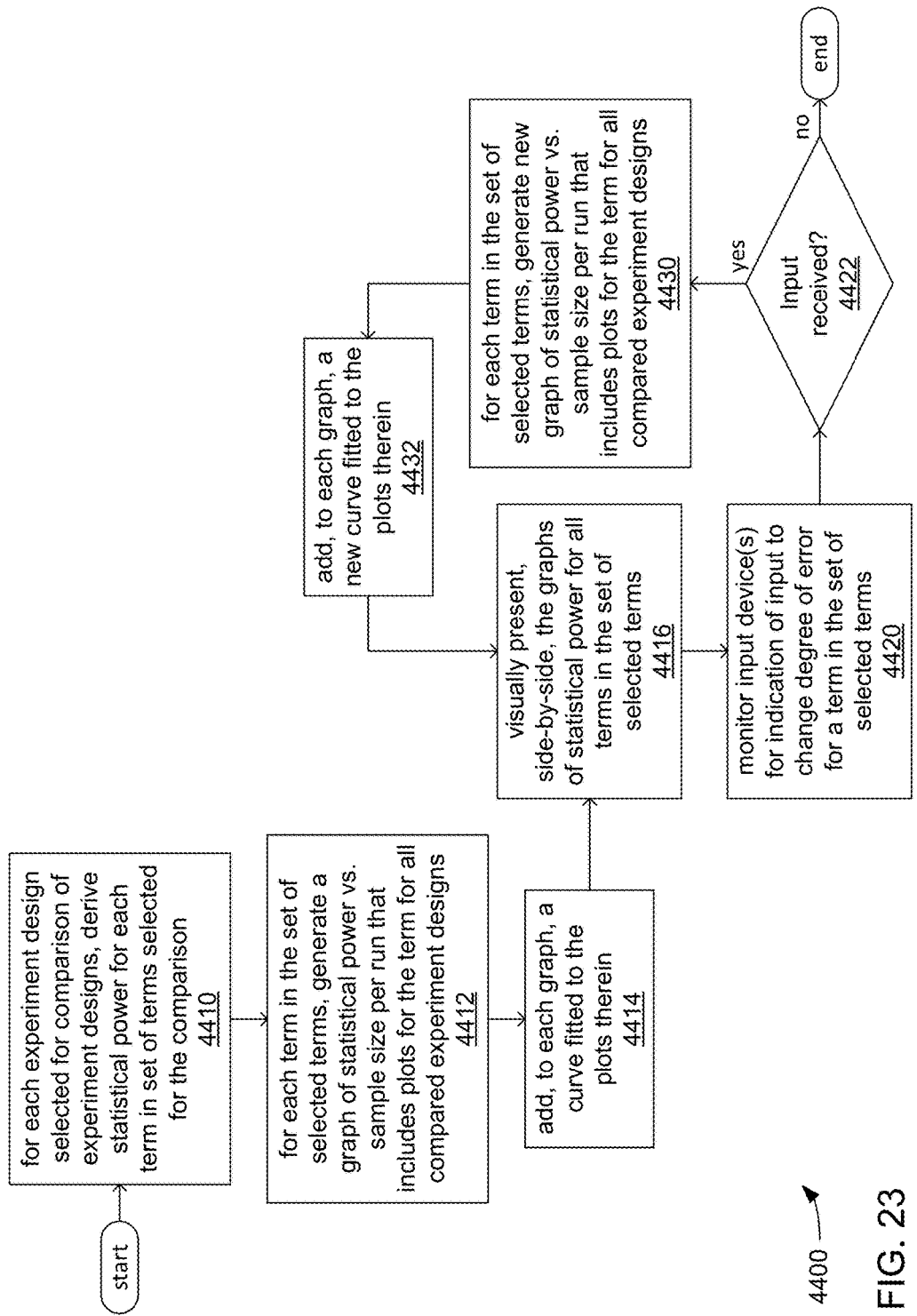
FIG. 23 illustrates an example embodiment of a logic flow of deriving and presenting statistical power in the guidance of selection of an experiment design of FIGS. 20A-B.

FIG. 23 illustrates an example embodiment of a logic flow 4400. The logic flow 4400 may be representative of some or all of the operations executed by one or more embodiments described herein. More specifically, the logic flow 4400 may illustrate operations performed by the processor 2550, and/or performed by other component(s) of the coordinating device 2500 in executing the design routine 2540 to guide selection of an experiment design.

At 4410, a processor of a coordinating device of a distributed processing system (e.g., the processor 2550 of the coordinating device 2500 of the distributed processing system 2000) may derive a statistical power for each term in a set of terms to be included in a comparison of multiple experiment designs, and separately for each one of the compared experiment designs. At 4412, the processor may then generate, for each term of the set of terms, a graph that plots the statistical power of that term across all of the compared experiment designs. At 4414, within each of the graphs, the processor may then fit a curve to the plots of the corresponding term for all of the compared experiment designs. At 4416, the processor may visually present all of the graphs (again, each one corresponding to one of the terms of the set) adjacent to each other in a manner that may form a horizontally extending row of the graphs (i.e., side-by-side) to exploit the innate left-right feature comparison capabilities of the HVS.

At 4420, the processor of the coordinating device may monitor one or more input devices for indications of entry of input indicative of a change to a degree of error for a term in the set of terms. If, at 4422, such input is received, then at 4430, the processor may generate, for each term of the set of terms, a new graph that plots the statistical power of that term across all of the compared experiment designs. At 4432, within each of the new graphs, the processor may then fit a new curve to the new plots of the corresponding term for all of the compared experiment designs.

Figure 24:
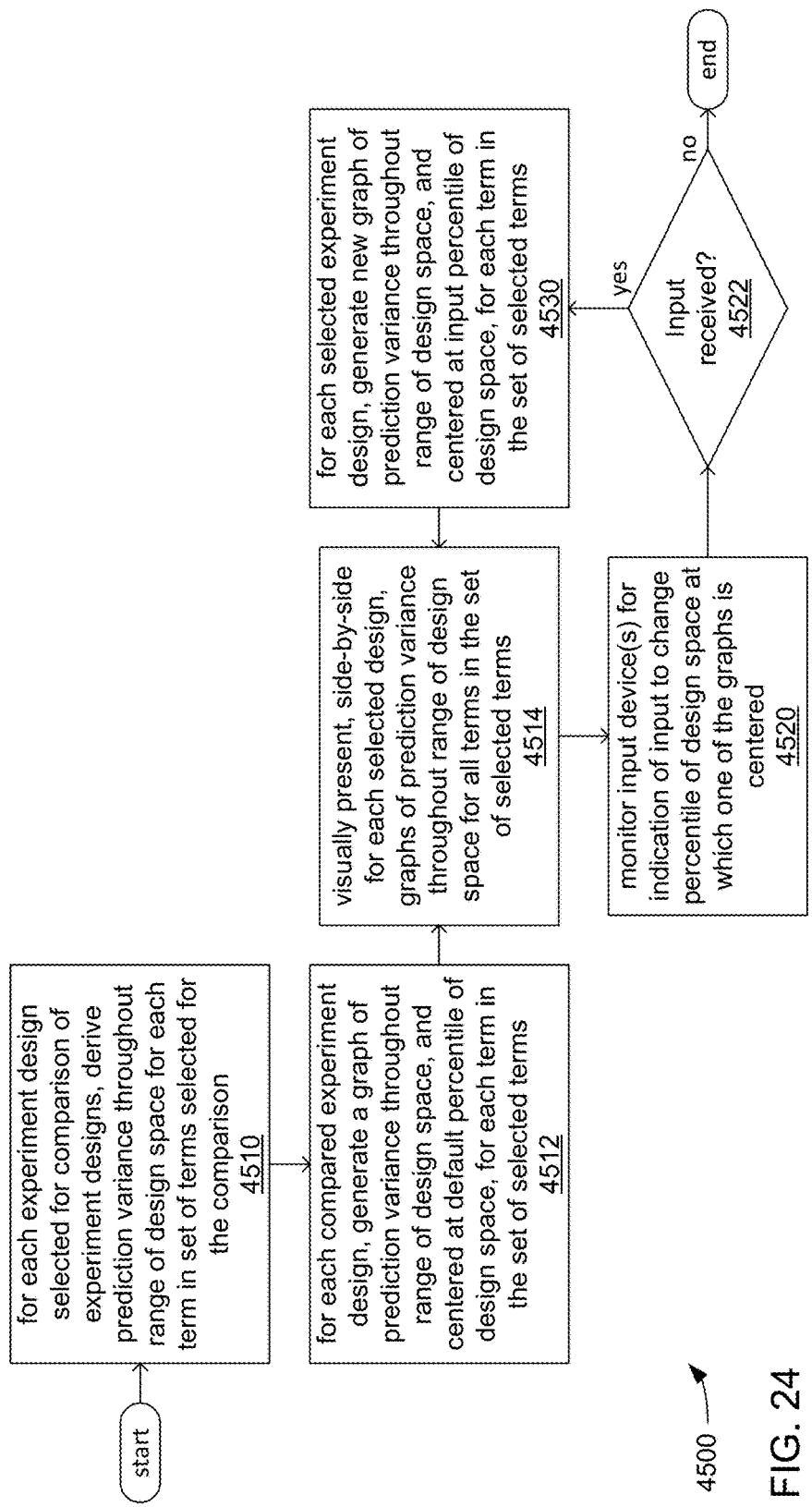
FIG. 24 illustrates an example embodiment of a logic flow of deriving and presenting prediction variance in the guidance of selection of an experiment design of FIGS. 20A-B.

FIG. 24 illustrates an example embodiment of a logic flow 4500. The logic flow 4500 may be representative of some or all of the operations executed by one or more embodiments described herein. More specifically, the logic flow 4500 may illustrate operations performed by the processor 2550, and/or performed by other component(s) of the coordinating device 2500 in executing the design routine 2540 to guide selection of an experiment design.

At 4510, a processor of a coordinating device of a distributed processing system (e.g., the processor 2550 of the coordinating device 2500 of the distributed processing system 2000) may derive a prediction variance for each term in a set of terms to be included in a comparison of multiple experiment designs, and separately for each one of the compared experiment designs. At 4512, the processor may then generate, for each term and for each experiment design, a graph of the prediction variance throughout the range of design space, and centered at a default percentile of the design space that may be marked by a vertical line positioned along the horizontal axis. At 4514, the processor may present those graphs in adjacent to each other in multiple horizontal rows where each row corresponds to one of the compared experiment designs.

At 4520, the processor of the coordinating device may monitor one or more input devices for indications of entry of input indicative of a change in the percentile of the design space at which the graph is centered. As previously discussed, such an indication may be as a result of use of a pointing device to horizontally change the position of the vertical line along the horizontal axis. If, at 4522, such input is received, then at 4530, the processor may generate, for each term and for each experiment design, a new graph of the prediction variance throughout the range of design space, and centered at a new percentile of the design space that may be marked by the vertical line at a new position along the horizontal axis. At 4514, the processor may present the new graphs in adjacent to each other in multiple horizontal rows where each row corresponds to one of the compared experiment designs.

Figure 25:
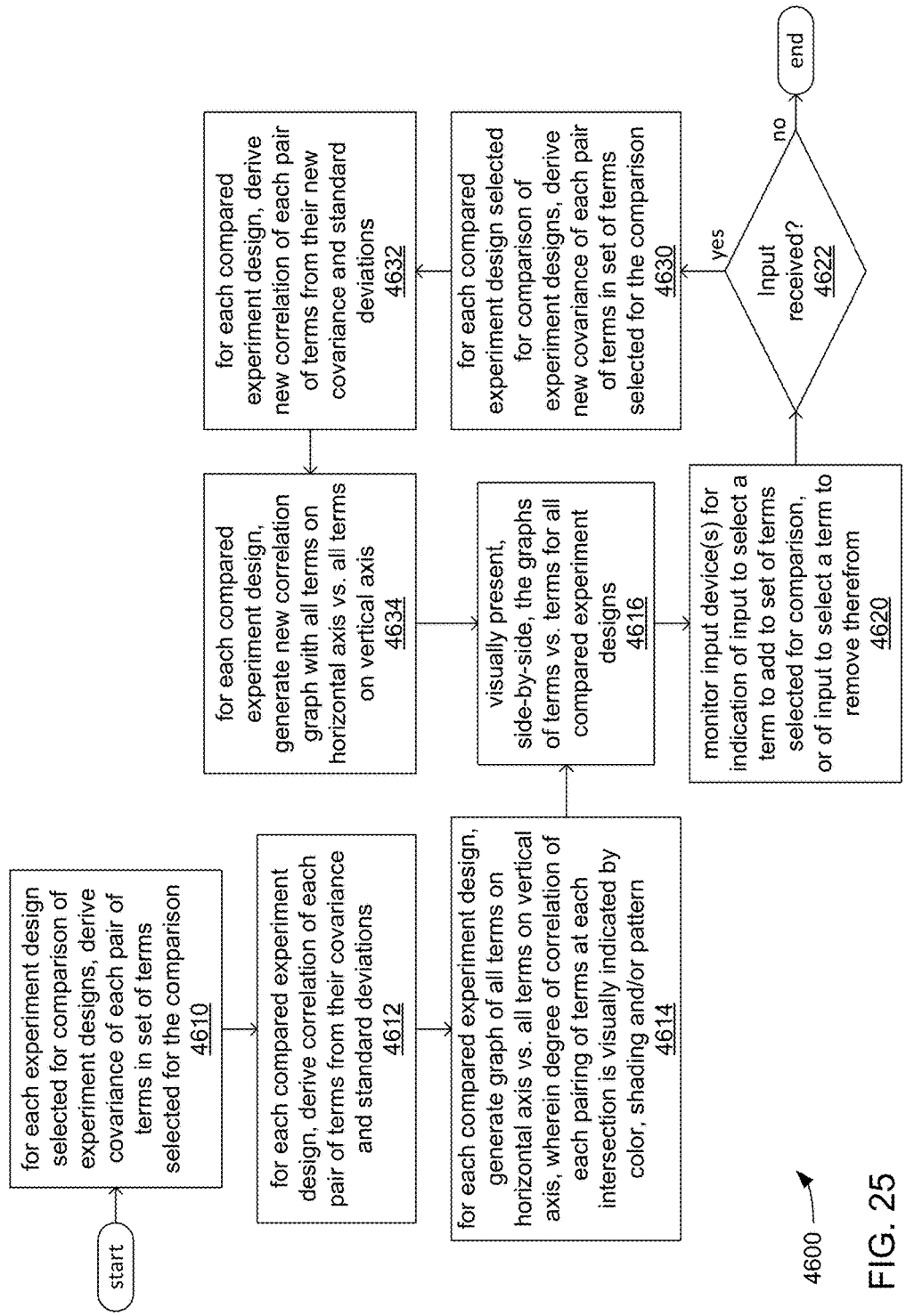
FIG. 25 illustrates an example embodiment of a logic flow of deriving and presenting correlations between terms in the guidance of selection of an experiment design of FIGS. 20A-B.

FIG. 25 illustrates an example embodiment of a logic flow 4600. The logic flow 4600 may be representative of some or all of the operations executed by one or more embodiments described herein. More specifically, the logic flow 4600 may illustrate operations performed by the processor 2550, and/or performed by other component(s) of the coordinating device 2500 in executing the design routine 2540 to guide selection of an experiment design.

At 4610 and 4612, a processor of a coordinating device of a distributed processing system (e.g., the processor 2550 of the coordinating device 2500 of the distributed processing system 2000) may derive the degree of correlation between each possible pair of terms that may be formed from a set of terms to be included in a comparison of multiple experiment designs. More specifically, in some embodiments, the processor may derive the covariance of each possible pair of terms, and then derive the degree of correlation for each of those pairs based on their derived covariance and standard deviations.

At 4614, the processor of the coordinating device may then generate a correlation graph, one each per compared experiment design, where all of the terms are arranged in identical order along each of the horizontal and vertical axes, and in which visual indicators are positioned at each intersection within the graph that corresponds to one of the possible pairs of terms. As previously discussed, the visual indicators used may be selected from a scale of visual indicators that may form a scale of progressive transition from one color to another, a progressive transition between light and dark on a grayscale, and/or a progressive transition through a series of patterns that transition between no fill and being fully filled in. At 4616, the processor may further present the correlation graphs adjacent to each other and arranged horizontally in a single row (e.g., side-by-side) to exploit the left-right feature comparison capabilities of the HVS.

At 4620, the processor of the coordinating device may monitor one or more input devices for indications of entry of input indicative of a change to the set of terms to either add a term thereto or remove a term therefrom. If, at 4622, such input is received, then at 4630 and 4632, the may again derive the degree of correlation between each possible pair of terms that may be formed from the set of terms. Again, more specifically in some embodiments, the processor may derive the covariance of each possible pair of terms, and then derive the degree of correlation for each of those pairs based on their derived covariance and standard deviations.

At 4634, the processor of the coordinating device may generate a new correlation graph, one each per compared experiment design, where all of the terms are arranged in identical order along each of the horizontal and vertical axes, and in which visual indicators are positioned at each intersection within the graph that corresponds to one of the possible pairs of terms. At 4616, the processor may then present the new correlation graphs adjacent to each other and arranged horizontally in a single row (e.g., side-by-side) to exploit the left-right feature comparison capabilities of the HVS.

Figure 26A:
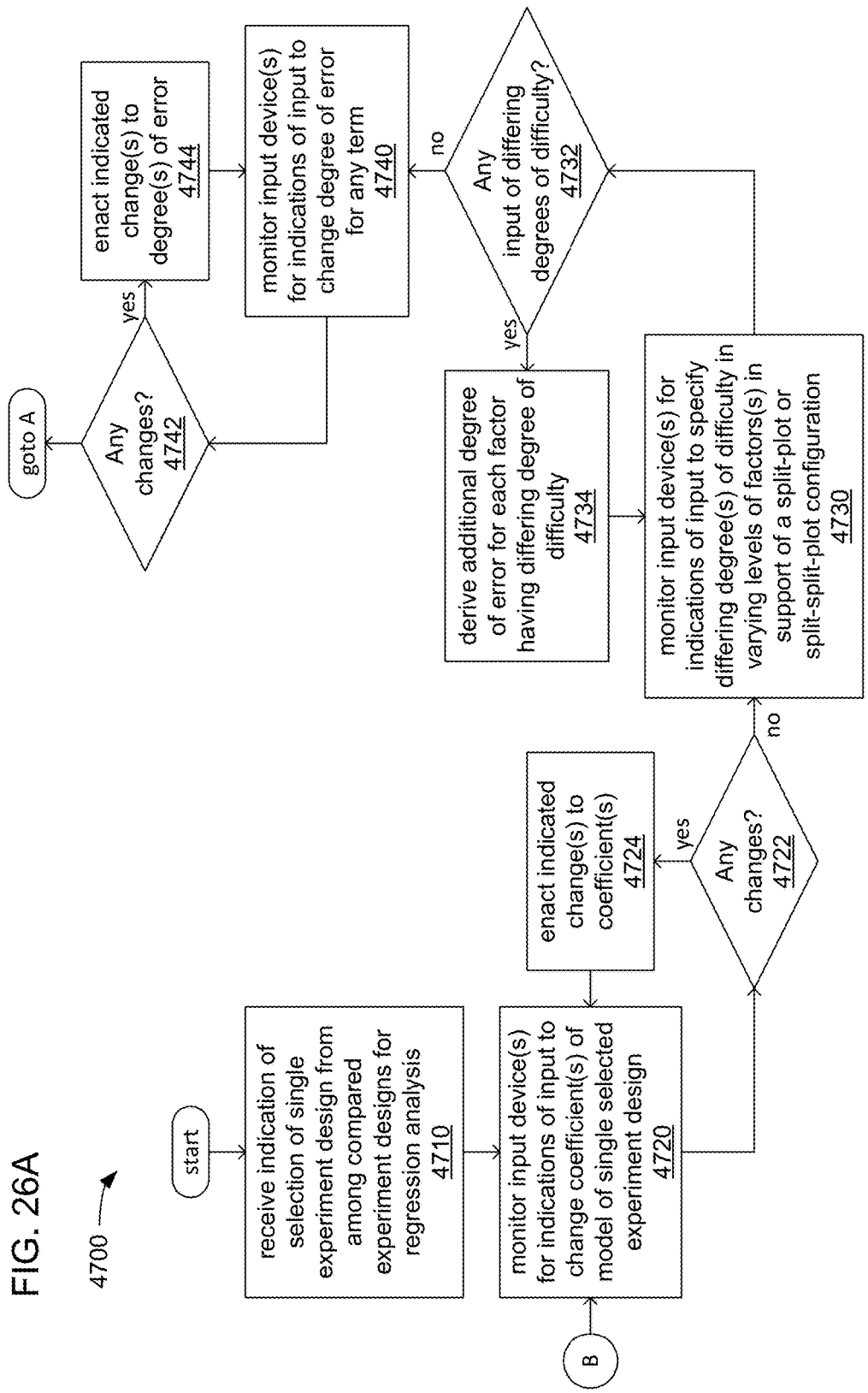
FIGS. 26A and 26B, together, illustrate an example embodiment of a logic flow of the guidance of performance of a regression analysis of FIGS. 20A-B.
Figure 26B:
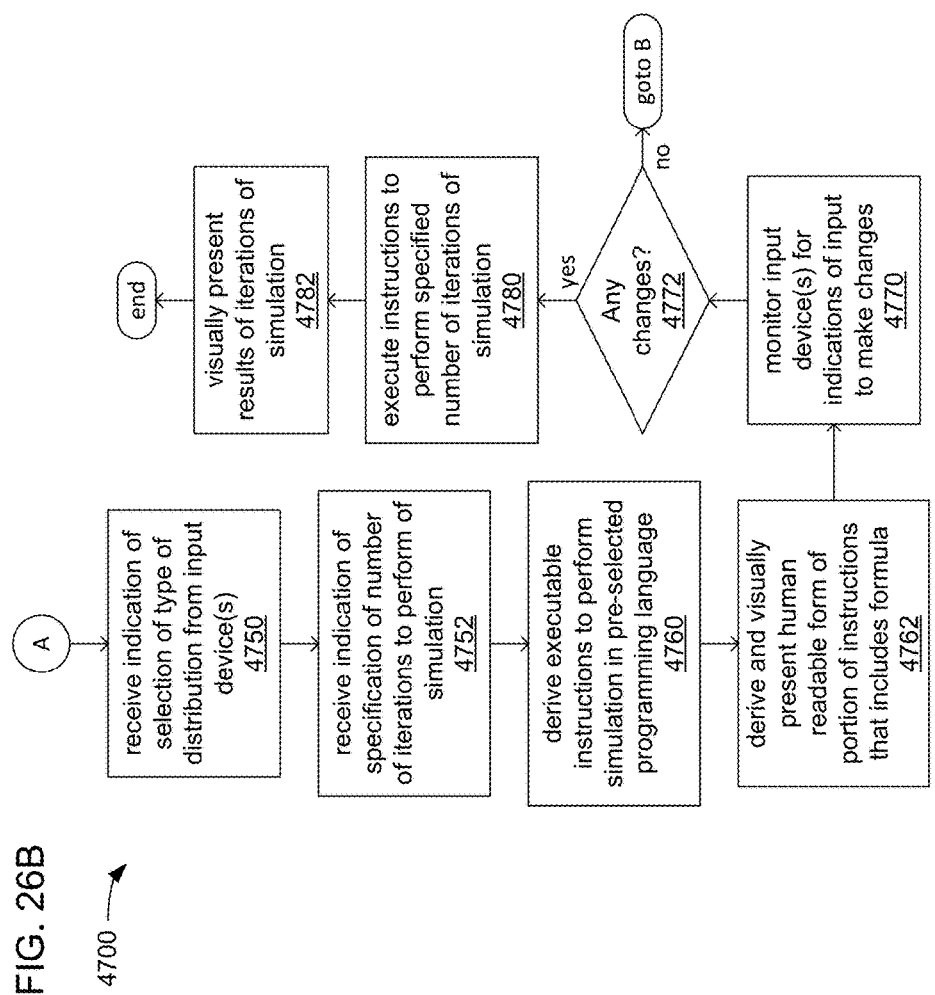

FIGS. 26A and 26B, together, illustrate an example embodiment of a logic flow 4700. The logic flow 4700 may be representative of some or all of the operations executed by one or more embodiments described herein. More specifically, the logic flow 4700 may illustrate operations performed by the processor 2550 and/or the one or more processors 2350, and/or performed by other component(s) of each of the coordinating device 2500 and/or the multiple node devices 2300, respectively, in executing corresponding ones of the regression routines 2570 and/or 2370 to guide the performance of a regression analysis with, a selected experiment design.

At 4710, a processor of a coordinating device of a distributed processing system (e.g., the processor 2550 of the coordinating device 2500 of the distributed processing system 2000) may receive an indication of a selection of an experiment design that may be from among the multiple compared experiment designs, for regression analysis.

At 4720, the processor of the coordinating device may monitor one or more input devices for indications of entry of input indicative of a change to default coefficient(s) for one or more of the terms of the model associated with the selected experiment design. If, at 4722, such input is received, then at 4724, the processor may enact such change(s) to the default coefficient(s), and may return to monitoring for more of such input at 4720.

At 4730, the processor of the coordinating device may monitor the one or more input devices for indications of entry of input indicative of there being a higher degree of difficulty in varying one or more particular factors than for the other factors such that the processor receives an indication that the selected experiment design is to have a split-plot or a split-split-plot configuration. If, at 4732, such input is received, then at 4734, the processor may derive an additional degree of error to which each such factor is to be subject, may present an indication of the additional default degree of error to prompt input indicating a change thereto, and may return to monitoring for more of such input at 4730. Again, as also previously discussed, following receipt of an indication of there being a different degree of difficulty in varying one or more particular factors, the processor 2550 may be caused to present additional prompts to additionally guide an operator through providing separate additional parameters for whole plots and/or subplots, such as the additional entry boxes 3716 by which separate degrees of error may be provided for whole plots and/or subplots.

At 4740, the processor of the coordinating device may monitor the one or more input devices for indications of entry of input indicative of a change to default a degree of error to which one or more of the factors may be subject, such as the separate degree of error that one or more factors indicated as being more difficult to vary may be subject. If, at 4742, such input is received, then at 4744, the processor may enact such change(s) to default degree(s) of error, and may return to monitoring for more of such input at 4740.

At 4750, the processor of the coordinating device may receive an indication of a selection of a type of distribution for the random generation of simulated data. At 4752, the processor may receive an indication of a quantity of iterations of the regression analysis, including the generation of simulated data, is to be performed.

At 4760, based on the parameters provided by the operator and/or from any unchanged default parameters, the processor of the coordinating device may be caused to generate a sequence of executable instructions (e.g., the executable instructions 2136) in a pre-selected programming language for performing the specified quantity of iterations of the regression analysis. At 4762, the processor may also be caused to generate and visually present a human readable form of a portion of the executable instructions that employs mathematical notation to expresses the performance of the regression analysis (e.g., the human readable expression 3722). As previously discussed, such a human readable expression may include the values of the coefficients and/or any intercept, may specify the selected type of distribution to be achieved in the random generation of simulated data, and/or may specify the quantity of iterations of the regression analysis to be performed.

At 4770, the processor of the coordinating device may monitor the one or more input devices for indications of entry of input indicative of a change to one or more of the parameters and/or default parameters upon which the generation of the executable instructions was based. If, at 4772, such input is received, then the processor may return to receiving and/or acting on the provision of revised ones of those parameters at 4720 through 4752.

However, if at 4772, there are no such input, then at 4780, the processor of the coordinating device may proceed with either directly executing the executable instructions to perform the specified quantity of iterations of the regression analysis, or may coordinate the distribution and performance of the iterations of the regression analysis by multiple other processors and/or processor cores (e.g., the one or more processors 2350 and/or processor cores 2355). As previously discussed, such other processors and/or processor cores may be incorporated into multiple node devices with which the coordinating device may communicate via a network (e.g., the multiple node devices 2300 via the network 2999). Alternatively, and as also previously discussed, such other processor(s) and/or processor cores may also be incorporated into the coordinating device (e.g., as one or more GPUs).

Upon completion of the specified quantity of iterations of the regression analysis, the processor of the coordinating device may visually present the results thereof at 4782.

In various embodiments, the division of processing and/or storage resources among the devices, and/or the API architectures supporting communications among the devices, may be configured to and/or selected to conform to any of a variety of standards for distributed processing, including without limitation, IEEE P2413, the ALLJOYN® standard, the IOTIVITY™ standard, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data set portions of data set(s) are not dependent on, nor constrained by, existing API architectures and/or supporting communications protocols. More broadly, there is nothing in the manner in which data set(s) may be organized in storage, transmission and/or distribution via a network that is bound to existing API architectures or protocols.

Some systems may use the HADOOP® framework, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node HADOOP® cluster, as understood by a person of skill in the art. The APACHE™ HADOOP® framework is an open-source software framework for distributed computing.

Implementing some examples at least in part by using machine-learning models can reduce the total number of processing iterations, time, memory, electrical power, or any combination of these consumed by a computing device when analyzing data. Some machine-learning approaches may be more efficiently and speedily executed and processed with machine-learning specific processors (e.g., not a generic CPU). For example, some of these processors can include a graphical processing unit (GPU), an application-specific integrated circuit (ASIC), a field-programmable gate array (FPGA), a Tensor Processing Unit (TPU) by Google, and/or some other machine-learning specific processor that implements one or more neural networks using semiconductor (e.g., silicon (Si), gallium arsenide (GaAs)) devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising a processor and a storage to store instructions that, when executed by the processor, cause the processor to perform operations comprising:
   receive, from an input device communicatively coupled to the processor, indications of selection of a plurality of experiment designs to be compared, wherein:
      each experiment design of the plurality of experiment designs specifies a quantity of runs of a test to perform a designed experiment;
      each experiment design is associated with a model of a system under evaluation;

the model associated with each experiment design comprises multiple terms as inputs to the model;

each term comprises at least one factor of multiple factors that are each an input to the system;

each factor of the multiple factors is identified by a factor identifier comprising text;

each term of the multiple terms is identified by a term identifier comprising text;

the text of the factor identifiers of the multiple factors of the model associated with a first experiment design of the plurality of experiment designs differs from the text of the factor identifiers of the multiple factors of the model associated with a second experiment design of the plurality of experiment designs; and the text of the term identifiers of the multiple terms of the model associated with the first experiment design differs from the text of the term identifiers of the multiple terms of the model associated with the second experiment design;

for each factor of the multiple factors of the model associated with the first experiment design, identify a matching factor of the multiple factors of the model associated with the second experiment design based on a factor type of each factor, wherein the factor type is selected from the group consisting of a categorical factor and a continuous factor;

for each categorical factor of the multiple factors of the model associated with the first experiment design, identify a matching factor of the multiple factors of the model associated with the second experiment design additionally based on quantity of levels of each factor;

for each term of the multiple terms of the model associated with the first experiment design, identify a matching term of the multiple terms of the model associated with the second experiment design based on an order of each term; and present, on a display communicatively coupled to the processor, the identified matches between the multiple terms of the first and second experiment designs and the identified matches between the multiple factors of the first and second experiment designs, wherein:

for each factor of the multiple factors of the model associated with the first experiment design, the factor identifier of the factor is presented adjacent to the factor identifier of the matched factor of the second experiment design; and for each term of the multiple terms of the model associated with the first experiment design, the term identifier of the term is presented adjacent to the term identifier of the matched term of the second experiment design.

2. The apparatus of claim 1, wherein:

the order of each term of the first and second experiment designs is selected from a group consisting of:
a first order main effect term;
a second order term; and
a third order term; and the processor is caused to perform operations comprising:
monitor the input device to enable reception of input that indicates a correction to the identified matches between the multiple terms of the first and second experiment designs;
analyze the indicated correction to determine whether the indicated correction specifies a match between terms of dissimilar order; and
in response to a determination that the indicated correction specifies a match between terms of dissimilar order, present an indication of incorrect input on the display.

3. The apparatus of claim 1, wherein the processor is caused to perform operations comprising identify a match between a categorical factor of the model associated with the first experiment design and a categorical factor of the model associated with the second experiment design additionally based on matches between the levels.

4. The apparatus of claim 1, wherein the processor is caused to perform operations comprising identify a match between a continuous factor of the model associated with the first experiment design and a continuous factor of the model associated with the second experiment design additionally based on minimum and maximum values of continuous ranges of numerical values.

5. The apparatus of claim 1, wherein the processor is caused to perform operations comprising:
monitor the input device to enable reception of input that indicates a correction to the identified matches between the multiple terms of the first and second experiment designs;
analyze the indicated correction to determine whether the indicated correction entails a match between factors of dissimilar factor type; and
in response to a determination that the indicated correction entails a match between factors of dissimilar factors type, present an indication of incorrect input on the display.

6. The apparatus of claim 1, wherein the processor is caused to perform operations comprising, for each factor of the multiple factors of the model associated with the first experiment design, identify a matching factor of the multiple factors of the model associated with the second experiment design additionally based on the text of the factor identifier of each factor, and vocabulary data comprising a thesaurus of matches among words based on meanings associated with the words.

7. The apparatus of claim 1, wherein the processor is caused to perform operations comprising, for each term of the multiple terms of the model associated with the first experiment design, identify a matching term of the multiple terms of the model associated with the second experiment design additionally based on the text of the term identifier of each term, and vocabulary data comprising a thesaurus of matches among words based on meanings associated with the words.

8. The apparatus of claim 7, wherein the processor is caused to perform operations comprising:
monitor the input device to enable reception of input that indicates a correction to the identified matches between the multiple terms of the first and second experiment designs; and
in response to a receipt, from the input device, of input indicating a correction to the identified matches between the multiple terms of the first and second experiment designs, perform operations comprising:
store within the vocabulary data and as an exception to a match among words of the thesaurus, an indication of at least one match between texts specified by the indicated correction;
enact the indicated correction; and
present, on the display, the identified matches between the multiple terms of the first and second experiment designs and the identified matches between the multiple responses of the first and second experiment designs after enactment of the indicated correction.

9. The apparatus of claim 1, wherein:
the model associated with each experiment design comprises multiple responses as outputs of the model;
each response of the multiple responses is identified by a response identifier; and
the processor is caused to perform operations comprising, for each response of the multiple responses of the model associated with the first experiment design, identify a matching response of the multiple responses of the model associated with the second experiment design additionally based on the text of the response identifier of each response, and vocabulary data comprising a thesaurus of matches among words based on meanings associated with the words.

10. The apparatus of claim 1, wherein the processor is caused to perform operations comprising:
receive, from the input device, indications of a selection of a term matched between the first and second experiment designs to add to a set of terms to be included in the comparison between the first and second experiment designs;
analyze the models associated with the first and second experiment designs to determine whether the addition of the indicated selected term to the set of terms causes the set of terms to become unsupportable by either of the first and second experiment designs; and
in response to a determination that the addition of the indicated selected term to the set of terms causes the set of terms to become unsupportable by either of the first and second experiment designs, perform operations comprising:
present an indication of ineligible input on the display; and
remove the indicated selected term from the set of terms to cause the set of terms to become supportable by both of the first and second experiment designs.

11. A computer-program product tangibly embodied in a non-transitory machine-readable
storage medium, the computer-program product including instructions operable to cause a processor to perform operations comprising:
receive, from an input device communicatively coupled to the processor, indications of selection of a plurality of experiment designs to be compared, wherein:
each experiment design of the plurality of experiment designs specifies a quantity of runs of a test to perform a designed experiment;
each experiment design is associated with a model of a system under evaluation;
the model associated with each experiment design comprises multiple terms as inputs to the model;
each term comprises at least one factor of multiple factors that are each an input to the system;
each factor of the multiple factors is identified by a factor identifier comprising text;
each term of the multiple terms is identified by a term identifier comprising text;
the text of the factor identifiers of the multiple factors of the model associated with a first experiment design of the plurality of experiment designs differs from the text of the factor identifiers of the multiple factors of the model associated with a second experiment design of the plurality of experiment designs; and
the text of the term identifiers of the multiple terms of the model associated with the first experiment design differs from the text of the term identifiers of the multiple terms of the model associated with the second experiment design;
for each factor of the multiple factors of the model associated with the first experiment design, identify a matching factor of the multiple factors of the model associated with the second experiment design based on a factor type of each factor, wherein the factor type is selected from the group consisting of a categorical factor and a continuous factor;
for each categorical factor of the multiple factors of the model associated with the first experiment design, identify a matching factor of the multiple factors of the model associated with the second experiment design additionally based on quantity of levels of each factor;
for each term of the multiple terms of the model associated with the first experiment design, identify a matching term of the multiple terms of the model associated with the second experiment design based on an order of each term; and
present, on a display communicatively coupled to the processor, the identified matches between the multiple terms of the first and second experiment designs and the identified matches between the multiple factors of the first and second experiment designs, wherein:
for each factor of the multiple factors of the model associated with the first experiment design, the factor identifier of the factor is presented adjacent to the factor identifier of the matched factor of the second experiment design; and
for each term of the multiple terms of the model associated with the first experiment design, the term identifier of the term is presented adjacent to the term identifier of the matched term of the second experiment design.

12. The computer-program product of claim 11, wherein:
the order of each term of the first and second experiment designs is selected from a group consisting of:
a first order main effect term;
a second order term; and
a third order term; and
the processor is caused to perform operations comprising:
monitor the input device to enable reception of input that indicates a correction to the identified matches between the multiple terms of the first and second experiment designs;
analyze the indicated correction to determine whether the indicated correction specifies a match between terms of dissimilar order; and
in response to a determination that the indicated correction specifies a match between terms of dissimilar order, present an indication of incorrect input on the display.

13. The computer-program product of claim 11, wherein the processor is caused to perform operations comprising identify a match between a categorical factor of the model associated with the first experiment design and a categorical factor of the model associated with the second experiment design additionally based on matches between the levels.

14. The computer-program product of claim 11, wherein the processor is caused to perform operations comprising identify a match between a continuous factor of the model associated with the first experiment design and a continuous factor of the model associated with the second experiment design additionally based on minimum and maximum values of continuous ranges of numerical values.

15. The computer-program product of claim 11, wherein the processor is caused to perform operations comprising:
monitor the input device to enable reception of input that indicates a correction to the identified matches between the multiple terms of the first and second experiment designs;
analyze the indicated correction to determine whether the indicated correction entails a match between factors of dissimilar factor type; and
in response to a determination that the indicated correction entails a match between factors of dissimilar factor type, present an indication of incorrect input on the display.

16. The computer-program product of claim 11, wherein the processor is caused to perform operations comprising, for each factor of the multiple factors of the model associated with the first experiment design, identify a matching factor of the multiple factors of the model associated with the second experiment design additionally based on the text of the factor identifier of each factor, and vocabulary data comprising a thesaurus of matches among words based on meanings associated with the words.

17. The computer-program product of claim 11, wherein the processor is caused to perform operations comprising, for each term of the multiple terms of the model associated with the first experiment design, identify a matching term of the multiple terms of the model associated with the second experiment design additionally based on the text of the term identifier of each term, and vocabulary data comprising a thesaurus of matches among words based on meanings associated with the words.

18. The computer-program product of claim 17, wherein the processor is caused to perform operations comprising:
monitor the input device to enable reception of input that indicates a correction to the identified matches between the multiple terms of the first and second experiment designs; and
in response to a receipt, from the input device, of input indicating a correction to the identified matches between the multiple terms of the first and second experiment designs, perform operations comprising:
store within the vocabulary data and as an exception to a match among words of the thesaurus, an indication of at least one match between texts specified by the indicated correction;
enact the indicated correction; and
present, on the display, the identified matches between the multiple terms of the first and second experiment designs and the identified matches between the multiple responses of the first and second experiment designs after enactment of the indicated correction.

19. The computer-program product of claim 11, wherein:
the model associated with each experiment design comprises multiple responses as outputs of the model;
each response of the multiple responses is identified by a response identifier; and
the processor is caused to perform operations comprising, for each response of the multiple responses of the model associated with the first experiment design, identify a matching response of the multiple responses of the model associated with the second experiment design additionally based on the text of the response identifier of each response, and vocabulary data comprising a thesaurus of matches among words based on meanings associated with the words.

20. The computer-program product of claim 11, wherein the processor is caused to perform operations comprising:
for each experiment design of the plurality of experiment designs, derive a statistical power for each term of the set of terms;
for each term of the set of terms, generate a graph of statistical power versus quantity of runs that includes a plot of the term for each experiment design of the plurality of experiment designs;
for each graph of statistical power versus quantity of runs, fit a curve to the plots therein; and
present the graphs of statistical power versus quantity of runs generated for all of the terms of the set of terms at adjacent locations on the display.

21. A computer-implemented method comprising:
receiving, at a coordinating device from an input device, indications of selection of a plurality of experiment designs to be compared, wherein:
each experiment design of the plurality of experiment designs specifies a quantity of runs of a test to perform a designed experiment;
each experiment design is associated with a model of a system under evaluation;
the model associated with each experiment design comprises multiple terms as inputs to the model;
each term comprises at least one factor of multiple factors that are each an input to the system;
each factor of the multiple factors is identified by a factor identifier comprising text;
each term of the multiple terms is identified by a term identifier comprising text;
the text of the factor identifiers of the multiple factors of the model associated with a first experiment design of the plurality of experiment designs differs from the text of the factor identifiers of the multiple factors of the model associated with a second experiment design of the plurality of experiment designs; and
the text of the term identifiers of the multiple terms of the model associated with the first experiment design differs from the text of the term identifiers of the multiple terms of the model associated with the second experiment design;
for each factor of the multiple factors of the model associated with the first experiment design, identifying a matching factor of the multiple factors of the model associated with the second experiment design based on a factor type of each factor, wherein the factor type is selected from the group consisting of a categorical factor and a continuous factor;
for each categorical factor of the multiple factors of the model associated with the first experiment design, identify a matching factor of the multiple factors of the model associated with the second experiment design additionally based on quantity of levels of each factor;
for each term of the multiple terms of the model associated with the first experiment design, identifying a matching term of the multiple terms of the model associated with the second experiment design based on an order of each term; and
presenting, on a display communicatively coupled to the coordinating device, the identified matches between the multiple terms of the first and second experiment designs and the identified matches between the multiple factors of the first and second experiment designs, wherein:

for each factor of the multiple factors of the model associated with the first experiment design, the factor identifier of the factor is presented adjacent to the factor identifier of the matched factor of the second experiment design; and for each term of the multiple terms of the model associated with the first experiment design, the term identifier of the term is presented adjacent to the term identifier of the matched term of the second experiment design.

22. The computer-implemented method of claim 21, wherein:

the order of each term of the first and second experiment designs is selected from a group consisting of:
a first order main effect term;
a second order term; and
a third order term; and the method comprises:
monitoring the input device to enable reception of input that indicates a correction to the identified matches between the multiple terms of the first and second experiment designs;
analyzing the indicated correction to determine whether the indicated correction specifies a match between terms of dissimilar order; and
in response to a determination that the indicated correction specifies a match between terms of dissimilar order, presenting an indication of incorrect input on the display.

23. The computer-implemented method of claim 21, comprising identifying a match between a categorical factor of the model associated with the first experiment design and a categorical factor of the model associated with the second experiment design additionally based on matches between the levels.

24. The computer-implemented method of claim 21, comprising identifying a match between a continuous factor of the model associated with the first experiment design and a continuous factor of the model associated with the second experiment design additionally based on minimum and maximum values of continuous ranges of numerical values.

25. The computer-implemented method of claim 21, comprising:

monitoring the input device to enable reception of input that indicates a correction to the identified matches between the multiple terms of the first and second experiment designs;
analyzing the indicated correction to determine whether the indicated correction entails a match between factors of dissimilar factor type; and
in response to a determination that the indicated correction entails a match between factors of dissimilar factor type, presenting an indication of incorrect input on the display.

26. The computer-implemented method of claim 21, comprising, for each factor of the multiple factors of the model associated with the first experiment design, identifying a matching factor of the multiple factors of the model associated with the second experiment design additionally based on the text of the factor identifier of each factor, and vocabulary data comprising a thesaurus of matches among words based on meanings associated with the words.

27. The computer-implemented method of claim 21, comprising, for each term of the multiple terms of the model associated with the first experiment design, identifying a matching term of the multiple terms of the model associated with the second experiment design additionally based on the text of the term identifier of each term, and vocabulary data comprising a thesaurus of matches among words based on meanings associated with the words.

28. The computer-implemented method of claim 27, comprising:

monitoring the input device to enable reception of input that indicates a correction to the identified matches between the multiple terms of the first and second experiment designs; and
in response to a receipt, from the input device, of input indicating a correction to the identified matches between the multiple terms of the first and second experiment designs, performing operations comprising:
storing within the vocabulary data and as an exception to a match among words of the thesaurus, an indication of at least one match between texts specified by the indicated correction;
enacting the indicated correction; and
presenting, on the display, the identified matches between the multiple terms of the first and second experiment designs and the identified matches between the multiple responses of the first and second experiment designs after enactment of the indicated correction.

29. The computer-implemented method of claim 21, wherein:

the model associated with each experiment design comprises multiple responses as outputs of the model;
each response of the multiple responses is identified by a response identifier; and
the method comprises, for each factor of the multiple factors of the model associated with the first experiment design, identifying a matching response of the multiple responses of the model associated with the second experiment design additionally based on the text of the response identifier of each response, and vocabulary data comprising a thesaurus of matches among words based on meanings associated with the words.

30. The computer-implemented method of claim 21, comprising:

for each experiment design of the plurality of experiment designs, generating a graph of all terms of the set of terms along a horizontal axis versus all terms of the set of terms along a vertical axis, wherein a degree of correlation of the pair of terms associated with each intersection within the graph is visually indicated; and
the visual indication of degree of correlation is selected from a group consisting of:
a color;
a degree of gray shading; and
a pattern; and
presenting, on the display, the graphs generated for all of the terms of the experiment designs of the plurality of experiment designs at adjacent locations on the display.

* * * * *